(12) United States Patent
Quddus et al.

(10) Patent No.: US 12,466,810 B2
(45) Date of Patent: Nov. 11, 2025

(54) N-(5-(6-ETHOXYPYRAZIN-2-YL)PYRIDIN-2-YL)-4-(2-(METHYLSULFONAMIDO)PYRIMIDIN-4-YL)TETRAHYDRO-2H-PYRAN-4-CARBOXAMIDE DERIVATIVES AND RELATED COMPOUNDS AS HUMAN CTPS1 INHIBITORS FOR THE TREATMENT OF PROLIFERATIVE DISEASES

(71) Applicant: Step Pharma S.A.S., Paris (FR)

(72) Inventors: Abdul Quddus, Nottingham (GB); Andrew Novak, Nottingham (GB); David Cousin, Nottingham (GB); Emma Blackham, Nottingham (GB); Geraint Jones, Nottingham (GB); Joseph Wrigglesworth, Nottingham (GB); Lorna Duffy, Nottingham (GB); Louise Birch, Nottingham (GB); Pascal George, Paris (FR); Saleh Ahmed, Nottingham (GB)

(73) Assignee: Step Pharma S.A.S., Paris (FR)

( * ) Notice: Subject to any disclaimer, the term of this patent is extended or adjusted under 35 U.S.C. 154(b) by 803 days.

(21) Appl. No.: 17/615,873

(22) PCT Filed: Jun. 4, 2020

(86) PCT No.: PCT/IB2020/000559
§ 371 (c)(1),
(2) Date: Dec. 2, 2021

(87) PCT Pub. No.: WO2020/245664
PCT Pub. Date: Dec. 10, 2020

(65) Prior Publication Data
US 2022/0324837 A1 Oct. 13, 2022

(30) Foreign Application Priority Data

Jun. 4, 2019 (EP) .................................. 19305713
Sep. 20, 2019 (EP) .................................. 19306144

(51) Int. Cl.
*C07D 401/14* (2006.01)
*C07D 239/38* (2006.01)
(Continued)

(52) U.S. Cl.
CPC ......... *C07D 401/14* (2013.01); *C07D 239/38* (2013.01); *C07D 239/42* (2013.01);
(Continued)

(58) Field of Classification Search
CPC .................................................. C07D 401/14
See application file for complete search history.

(56) References Cited

U.S. PATENT DOCUMENTS 9,181,235 B2   11/2015  Cheng et al.
2003/0158218 A1  8/2003  Nantermet et al.
(Continued)

FOREIGN PATENT DOCUMENTS

CN   104262071   1/2015
EP   1659113     5/2006
(Continued)

OTHER PUBLICATIONS

Lampson "The Development and Current Use of BCL-2 Inhibitors for the Treatment of Chronic Lymphocytic Leukemia" Curr Hematol Malig Rep (2017) 12:11-19.*
(Continued)

*Primary Examiner* — David K O'Dell
(74) *Attorney, Agent, or Firm* — Morgan, Lewis & Bockius LLP

(57) ABSTRACT

Compounds of formula (I) as human cytidine triphosphate synthase 1 (CTPS1) inhibitors for the treatment of proliferative diseases, such as e.g. cancer, such as e.g. leukemia and lymphoma, e.g. inflammatory skin diseases such as psoriasis, or e.g. multiple sclerosis. The present description discloses the synthesis and characterisation of exemplary compounds as well as pharmacological data thereof (e.g. pages 64 to 80; examples; biological examples 1 and 2; e.g. compounds P140, P231 to P263; tables 1 to 10). Specific examples are e.g.: N-(5-(6-ethoxypyrazin-2-yl)pyridin-2-yl)-4-(2-(methylsulfonamido) pyrimidin-4-yl)tetrahydro-2H-pyran-4-carboxamide (Formula (II)), or 1-(2-(cyclopropanesulfonamido)pyrimidin-4-yl)-N-(5-(6-ethoxypyrazin-2-yl)pyridin-2-yl)cyclohexane-1-carboxamide (Formula (III)).

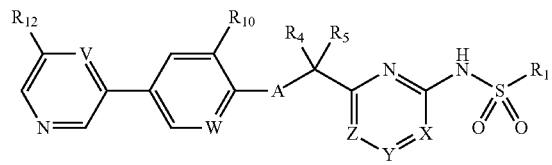

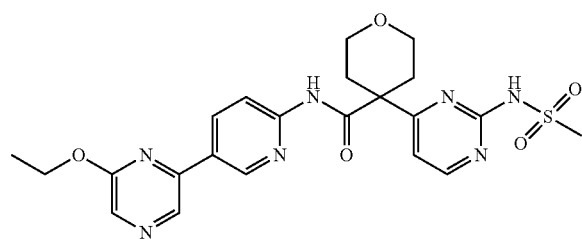

(Continued)

-continued (III)

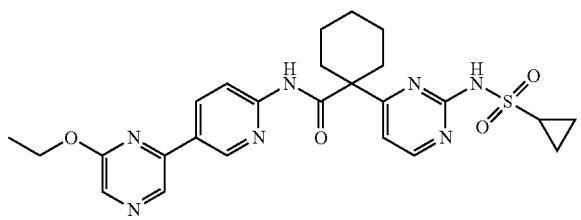

5 Claims, No Drawings

Specification includes a Sequence Listing.

(51) Int. Cl.
C07D 239/42 (2006.01)
C07D 401/04 (2006.01)
C07D 405/04 (2006.01)
C07D 405/14 (2006.01)
C07D 409/14 (2006.01)

(52) U.S. Cl.
CPC ......... *C07D 401/04* (2013.01); *C07D 405/04* (2013.01); *C07D 405/14* (2013.01); *C07D 409/14* (2013.01)

(56) References Cited

U.S. PATENT DOCUMENTS

| | | |
|---|---|---|
| 2016/0152583 A1 | 6/2016 | Arisawa et al. |
| 2021/0002269 A1 | 1/2021 | Quddus et al. |
| 2021/0024507 A1 | 1/2021 | Quddus et al. |
| 2021/0380575 A1 | 12/2021 | Novak et al. |
| 2021/0387965 A1 | 12/2021 | Quddus et al. |
| 2023/0002352 A1 | 1/2023 | Novak et al. |
| 2023/0020663 A1 | 1/2023 | Novak et al. |
| 2023/0086703 A1 | 3/2023 | Quddus et al. |
| 2023/0183229 A1 | 6/2023 | Novak et al. |
| 2023/0192673 A1 | 6/2023 | Quddus et al. |
| 2024/0010645 A1 | 1/2024 | Quddus et al. |
| 2025/0066324 A1 | 2/2025 | Quddus et al. |

FOREIGN PATENT DOCUMENTS

| | | |
|---|---|---|
| EP | 2292603 | 3/2011 |
| WO | WO 02/16318 | 2/2002 |
| WO | WO 02/24665 | 3/2002 |
| WO | WO 2006/010751 | 2/2006 |
| WO | WO 2009/075874 | 6/2009 |
| WO | 2012082817 A1 | 6/2012 |
| WO | WO 2014/170435 | 10/2014 |
| WO | WO 2015/094119 | 6/2015 |
| WO | 2016055786 A1 | 4/2016 |
| WO | WO 2019/179652 | 9/2019 |
| WO | WO 2022/087634 | 4/2022 |
| WO | WO 2023/166076 A1 | 9/2023 |
| WO | WO 2023/166077 A1 | 9/2023 |
| WO | WO 2023/166078 A1 | 9/2023 |
| WO | WO 2023/166080 A1 | 9/2023 |
| WO | 2023205475 A1 | 10/2023 |
| WO | WO 2024/133721 A1 | 6/2024 |
| WO | WO 2024/133730 A1 | 6/2024 |
| WO | 2024153247 A1 | 7/2024 |

OTHER PUBLICATIONS

Asnagli, et al., "Inhibition of CTP Synthase 1 (CTPS1) blocks T- and B-cell proliferation in vitro and the inflammatory response in vivo in a delayed-type hypersensitivity model," Autoimmunity Congress 2021, 10 pages, May 28, 2021.
Asnagli, et al., "STP938, a novel, potent and selective inhibitor of CTP Synthase 1 (CTPS1) demonstrates efficacy in rodent models of inflammation and arthritis," European Alliance of Associations for Rheumatology 2021, 11 pages, Jun. 2, 2021.
Asnagli, et al., "Selective Small Molecule Inhibition of CTP Synthase 1 (CTPS1) Suppresses T Cell Proliferation and Cytokine Release, Highlighting a Novel Therapeutic Target for Graft-Versus-Host Disease," European Hematology Association 2022 (abstract and poster II), 4 pages, Jun. 9, 2022.
Asnagli, et al., "CTP Synthase 1 Is a Novel Target in T Cell Cancers, With Small Molecule Inhibition Inducing Death of Neoplastic Human T Cells In Vitro and Inhibition of Their Growth in an In Vivo Xenotransplant Model," European Hematology Association 2022 (abstract and poster I), 4 pages, Jun. 9, 2022.
Asnagli, et al., "CTP Synthase 1 Is a Novel Therapeutic Target in Lymphoma," HemaSphere, vol. 7, No. 4, 10 pages, 2023.
Beer, et al., "STP938, a clinic ready, first in class inhibitor of CTP Synthase 1 (CTPS1), demonstrates efficacy in preclinical models of human T cell neoplasia," Lymphoma forum 2022 (abstract, poster and slides), Jun. 23, 2022.
Chiron, et al., "STP938, a selective CTPS1 inhibitor, shows single agent activity and synergy with BCL2 inhibition in preclinical models of mantle cell lymphoma," American Society of Hematology, (ASH 2022 (abstract and poster)), 5 pages, Dec. 10, 2022.
McCluskey, et al., "Exploring the Potent Inhibition of CTP Synthase by Gemcitabine-5'-Triphosphate," ChemBioChem, vol. 17, pp. 2240-2249, Nov. 2016.
Minet, et al., "Differential roles of CTP synthetases CTPS1 and CTPS2 in cell proliferation," Life Science Alliance, vol. 6, No. 9, 14 pages, 2023.
Novak, et al., ACS San Francisco Poster 2023 (slides), 30 pages, Aug. 13, 2023.
Novak, et al., "Discovery and Optimisation of Potent and Orally Available CTP Synthetase Inhibitors," 4th Alpine Winter Conference on Medicinal and Synthetic Chemistry 2024 (poster), Jan. 31, 2024.
Parker, et al., "Inhibition of CTP Synthase 1 (CTPS1) is a Targeted Therapy for Metabolic Vulnerability in de novo Nucleotide Synthesis for Lymphomas and Leukemias," American Society of Hematology, Abstract & Slides, 10 pages, Dec. 11, 2021.
Parker, et al., "Combined CTPS1 + DDR pathway inhibition delivers synergistic anti-cancer activity," DDR Inhibitors Summit 2023 (poster), 1 page, Jan. 24, 2023.
Pfeiffer, "Tackling pyrimidine biosynthesis—CTP Synthase 1 is a novel target in the treatment of multiple myeloma," International Myeloma Society Workshop, (abstract and poster), 5 pages, Sep. 8, 2021.
Pfeiffer, et al., "CTPS1 is a Novel Therapeutic Target in Myeloma—Selective Small Molecule Inhibition Delivers Single Agent Activity and Synergises With ATR Inhibition," European Hematology Association 2022 (abstract and poster), 4 pages, Jun. 9, 2022.
Pfeiffer, et al., "CTPS1 Is a Novel Therapeutic Target in Multiple Myeloma That Synergizes with Inhibition of ATR, CHEK1 or WEE1," American Society of Hematology, (ASH 2022 (abstract and poster)), 10 pages, Dec. 10, 2022.
Pfeiffer, et al., "CTPS1 is a novel therapeutic target in multiple myeloma which synergizes with inhibition of CHEK1, ATR or WEE1," Leukemia, vol. 38, pp. 181-192, Oct. 10, 2023.
Tang, et al., "CTP synthase 1, a smooth muscle-sensitive therapeutic target for effective vascular repair," Arterioscler Thromb Vasc Biol., vol. 33, No. 10, 19 pages, Oct. 2013.
Walther, et al., "Prodrugs in medicinal chemistry and enzyme prodrug therapies," Advance Drug Delivery Reviews, vol. 1, pp. 65-77, Sep. 2017.
Novak, et al., "Delivered and Optimization of Potent and Orally Available CTP Synthetase Inhibitors for Use in Treatment of Disease Driven by Aberrant Immune Cell Proliferation," Journal of Medicinal Chemistry, 2022, pubs.acs.org/jmc, 11 pages.

(56) References Cited

OTHER PUBLICATIONS

Schimmel, et al., "Cyclopentenyl Cytosine (CPEC): An Overview of its in vitro and in vivo Activity," Current Cancer Drug Targets, 2007, vol. 7, pp. 504-509.
U.S. Appl. No. 17/760,886, Novak et al.
Lynch et al., "Structural basis for isoform-specific inhibition of human CTPS1," PNAS, 118 (40): e2107968118 (2021).
Klapars et al., "Copper-Catalyzed Halogen Exchange in Aryl Halides: An Aromatic Finkelstein Reaction," Journal of the American Chemical Society, 124: 14844-14845 (2002).
Ananthakrishnanadar et al., "The Effects of Substituents on the Rate of Saponification of Biphenyl-4-carboxylates," Journal of the Chemical Society, Perkin Transactions 2, 11 (1): 35-37 (1984).
Meng et al., "Carboxylation of Aromatic and Aliphatic Bromides and Triflates with CO2 by Dual Visible-Light-Nickel Catalysis," Angewandt Chemie International Edition, 56: 13426-13430 (2017).
Zhao et al., "Design, synthesis and evaluation of aromatic heterocyclic derivatives as potent antifungal agents," European Journal of Medicinal Chemistry, 137: 96-107 (2017).
Lai et al., "A biocompatible inverse electron demand Diels-Alder reaction of aldehyde and tetrazine promoted by proline," New Journal of Chemistry, 40: 8194-8197 (2016).
Thirumoorthi et al., "A practical metal-free homolytic aromatic alkylation protocol for the synthesis of 3-(pyrazin-2-yl)bicyclo[1.1.1]pentane-1-carboxylic acid," Organic & Biomolecular Chemistry, 14: 9485-9489 (2016).
Wang et al., "Diamondoid-structured polymolybdate-based metal-organic frameworks as high-capacity anodes for lithium-ion batteries," ChemComm, 53: 5204-5207 (2017).
Sandosham et al., "Synthesis of Pyrimidinyl Triflates and Palladium-Catalyzed Coupling with Organotin and Organozinc Reagents," Heterocycles, 37 (1): 501-514 (1994).

* cited by examiner

SEQUENCE LISTING

<160> NUMBER OF SEQ ID NOS: 2

<210> SEQ ID NO 1
<211> LENGTH: 20
<212> TYPE: PRT
<213> ORGANISM: Artificial Sequence
<220> FEATURE:
<223> OTHER INFORMATION: synthetic

<400> SEQUENCE: 1

Gly Gly Asp Tyr Lys Asp Asp Asp Lys Gly Gly His His His His
1               5                   10                  15

His His His His
            20

<210> SEQ ID NO 2
<211> LENGTH: 29
<212> TYPE: PRT
<213> ORGANISM: Artificial Sequence
<220> FEATURE:
<223> OTHER INFORMATION: synthetic

```
<400> SEQUENCE: 2

Asp Tyr Lys Asp Asp Asp Lys His His His His His Gly Leu
1               5                   10                  15

Asn Asp Ile Phe Glu Ala Gln Lys Ile Glu Trp His Glu
            20                  25
```

N-(5-(6-ETHOXYPYRAZIN-2-YL)PYRIDIN-2-YL)-4-(2-(METHYLSULFONAMIDO)PYRIMIDIN-4-YL)TETRAHYDRO-2H-PYRAN-4-CARBOXAMIDE DERIVATIVES AND RELATED COMPOUNDS AS HUMAN CTPS1 INHIBITORS FOR THE TREATMENT OF PROLIFERATIVE DISEASES

RELATED APPLICATIONS

This application is a U.S. National Phase Application under 35 U.S.C. § 371 of International Application No. PCT/IB2020/000559, filed Jun. 4, 2020, which claims priority to, and the benefit of, European Application No. 19305713.0, filed Jun. 4, 2019, and European Application No. 19306144.7, filed Sep. 20, 2019. The contents of each of these applications are incorporated herein by reference in their entirety.

SEQUENCE LISTING SUBMISSION VIA EFS-WEB

A computer readable text file, entitled "SequenceListing.txt" created on Nov. 17, 2021 with a file size of 878 bytes contains the sequence listing for this application and is hereby incorporated by reference in its entirety.

FIELD OF THE INVENTION

The invention relates to novel compounds, processes for the manufacture of such compounds, related intermediates, compositions comprising such compounds and the use of such compounds as cytidine triphosphate synthase 1 inhibitors, particularly in the treatment or prophylaxis of disorders associated with cell proliferation.

BACKGROUND OF THE INVENTION

Nucleotides are a key building block for cellular metabolic processes such as deoxyribonucleic acid (DNA) and ribonucleic acid (RNA) synthesis. There are two classes of nucleotides, that contain either purine or pyrimidine bases, both of which are important for metabolic processes.

Based on this, many therapies have been developed to target different aspects of nucleotide synthesis, with some inhibiting generation of purine nucleotides and some pyrimidine nucleotides or both.

The pyrimidine nucleotide cytidine 5' triphosphate (CTP) is a precursor required not just for the anabolism of DNA and RNA but also phospholipids and sialyation of proteins. CTP originates from two sources: a salvage pathway and a de novo synthesis pathway that depends on two enzymes, the CTP synthases (or synthetases) 1 and 2 (CTPS1 and CTPS2) (Evans and Guy 2004; Higgins, et al. 2007; Ostrander, et al. 1998).

CTPS1 and CTPS2 catalyse the conversion of uridine triphosphate (UTP) and glutamine into cytidine triphosphate (CTP) and L-glutamate:

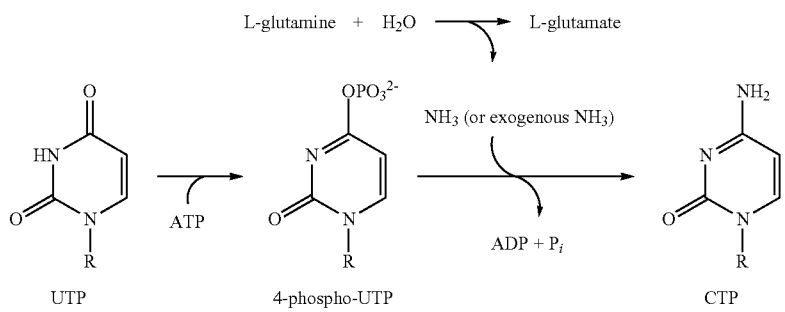

Both enzymes have two domains, an N-terminal synthetase domain and a C-terminal glutaminase domain (Kursula, et al. 2006). The synthetase domain transfers a phosphate from adenosine triphosphate (ATP) to the 4-position of UTP to create an activated intermediate, 4-phospho-UTP. The glutaminase domain generates ammonia from glutamine, via a covalent thioester intermediate with a conserved active site cysteine, generating glutamate. This ammonium is transferred from the glutaminase domain to the synthetase domain via a tunnel or can be derived from external ammonium. This ammonium is then used by the synthetase domain to generate CTP from the 4-phospho-UTP (Lieberman, 1956).

Although CTPS exists as two isozymes in humans and other eukaryotic organisms, CTPS1 and CTPS2, functional differences between the two isozymes are not yet fully elucidated (van Kuilenburg, et al. 2000).

The immune system provides protection from infections and has therefore evolved to rapidly respond to the wide variety of pathogens that the individual may be exposed to. This response can take many forms, but the expansion and differentiation of immune populations is a critical element and is hence closely linked to rapid cell proliferation. Within this, CTP synthase activity appears to play an important role in DNA synthesis and the rapid expansion of lymphocytes following activation (Fairbanks, et aL. 1995; van den Berg, et aL. 1995).

Strong clinical validation that CTPS1 is the critical enzyme in human lymphocyte proliferation came with the identification of a loss-of-function homozygous mutation (rs145092287) in this enzyme that causes a distinct and life-threatening immunodeficiency, characterized by an impaired capacity of activated T- and B-cells to proliferate in response to antigen receptor-mediated activation. Activated CTPS1-deficient cells were shown to have decreased levels of CTP. Normal T-cell proliferation was restored in CTPS1-deficient cells by expressing wild-type CTPS1 or by addition of cytidine. CTPS1 expression was found to be low in resting lymphocytes, but rapidly upregulated following activation of these cells. Expression of CTPS1 in other tissues was generally low. CTPS2 seems to be ubiquitously expressed in a range of cells and tissues but at low levels, and the failure of CTPS2, which is still intact in the patients, to compensate for the mutated CTPS1, supports CTPS1 being the critical enzyme for the immune populations affected in the patients (Martin, et aL. 2014).

Overall, these findings suggest that CTPS1 is a critical enzyme necessary to meet the demands for the supply of CTP required by several important immune cell populations.

Normally the immune response is tightly regulated to ensure protection from infection, whilst controlling any response targeting host tissues. In certain situations, the control of this process is not effective, leading to immune-mediated pathology. A wide range of human diseases are thought to be due to such inappropriate responses mediated by different elements of the immune system.

Given the role that cell populations, such as T and B lymphocytes, are thought to play in a wide range of auto-immune and other diseases, CTPS1 represents a target for a new class of immunosuppressive agents. Inhibition of CTPS1 therefore provides a novel approach to the inhibition of activated lymphocytes and selected other immune cell populations such as Natural Killer cells, Mucosal-Associated Invariant T (MAIT) and Invariant Natural Killer T cells, highlighted by the phenotype of the human mutation patients (Martin, et aL. 2014).

Cancer can affect multiple cell types and tissues but the underlying cause is a breakdown in the control of cell division. This process is highly complex, requiring careful coordination of multiple pathways, many of which remain to be fully characterised. Cell division requires the effective replication of the cell's DNA and other constituents. Interfering with a cell's ability to replicate by targeting nucleic acid synthesis has been a core approach in cancer therapy for many years.

Examples of therapies acting in this way are 6-thioguanine, 6-mecaptopurine, 5-fluorouracil, cytarabine, gemcitabine and pemetrexed.

As indicated above, pathways involved in providing the key building blocks for nucleic acid replication are the purine and pyrimidine synthesis pathways, and pyrimidine biosynthesis has been observed to be up-regulated in tumors and neoplastic cells.

CTPS activity is upregulated in a range of tumour types of both haematological and non-haematological origin, although heterogeneity is observed among patients. Linkages have also been made between high enzyme levels and resistance to chemotherapeutic agents.

Currently, the precise role that CTPS1 and CTPS2 may play in cancer is not completely clear.

Several non-selective CTPS inhibitors have been developed for oncology indications up to phase I/II clinical trials, but were stopped due to toxicity and efficacy issues.

Most of the developed inhibitors are nucleoside-analogue prodrugs (3-deazauridine, CPEC, carbodine), which are converted to the active triphosphorylated metabolite by the kinases involved in pyrimidine biosynthesis: uridine/cytidine kinase, nucleoside monophosphate-kinase (NMP-kinase) and nucleoside diphosphatekinase (NDP-kinase). The remaining inhibitors (acivicin, DON) are reactive analogues of glutamine, which irreversibly inhibit the glutaminase domain of CTPS. Gemcitibine is also reported to have some inhibitory activity against CTPS (McClusky et al., 2016).

CTPS therefore appears to be an important target in the cancer field. The nature of all of the above compounds is such that effects on other pathways are likely to contribute to the efficacy they show in inhibiting tumours.

Selective CTPS inhibitors therefore offer an attractive alternative approach for the treatment of tumours. Compounds with different potencies against CTPS1 and CTPS2 may offer important opportunities to target different tumours depending upon their relative dependence on these enzymes.

CTPS1 has also been suggested to play a role in vascular smooth muscle cell proliferation following vascular injury or surgery (Tang, et aL. 2013).

As far as is known to date, no selective CTPS1 inhibitors have been developed. Recently, the CTPS1 selective inhibitory peptide CTpep-3 has been identified. The inhibitory effects of CTpep-3 however, were seen in cell free assays but not in the cellular context. This was not unexpected though, since the peptide is unlikely to enter the cell and hence is not easily developable as a therapeutic (Sakamoto, et al. 2017).

In summary, the available information and data strongly suggest that inhibitors of CTPS1 will reduce the proliferation of a number of immune and cancer cell populations, with the potential for an effect on other selected cell types such as vascular smooth muscle cells as well. Inhibitors of CTPS1 may therefore be expected to have utility for treatment or prophylaxis in a wide range of indications where the pathology is driven by these populations.

CTPS1 inhibitors present a novel approach for inhibiting selected components of the immune system in various tissues, and the related pathologies or pathological conditions such as, in general terms, rejection of transplanted cells and tissues, Graft-related diseases or disorders, allergies and autoimmune diseases. In addition, CTPS1 inhibitors offer therapeutic potential in a range of cancer indications and in enhancing recovery from vascular injury or surgery and reducing morbidity and mortality associated with neointima and restenosis.

International patent applications WO2019/106156, WO2019/106146, WO2019/179652, WO2019/180244 and WO2020/083975 disclose CTPS1 inhibitors.

SUMMARY OF THE INVENTION

The invention provides a compound of formula (I):

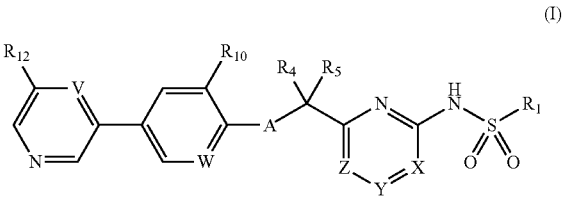

wherein
(a) when A, V, W, X, Y, Z, $R_1$, $R_{10}$ and $R_{12}$ are as follows:

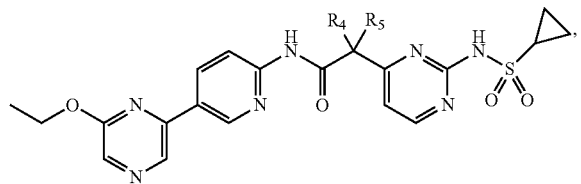

then $R_4$ and $R_5$ together with the carbon atom to which they attached form:
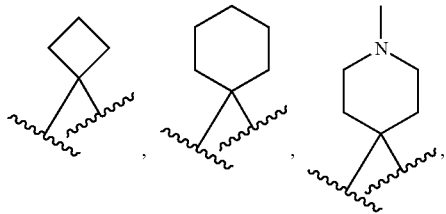
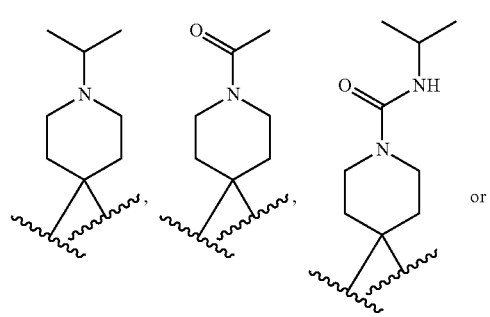
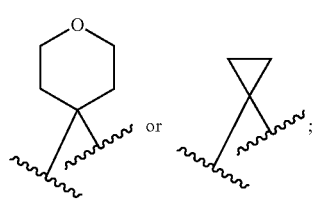
or
(b) when A, V, W, X, Y, Z, $R_1$, $R_{10}$ and $R_{12}$ are as follows:
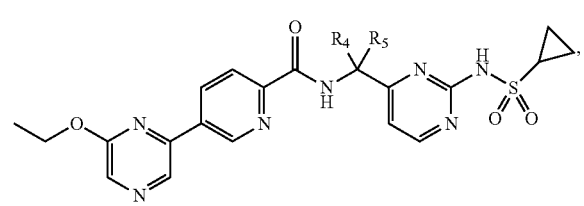
then $R_4$ and $R_5$ together with the carbon atom to which they are attached form:
(c) when A, V, W, X, Y, Z, $R_4$, $R_5$, $R_{10}$ and $R_{12}$ are as follows:
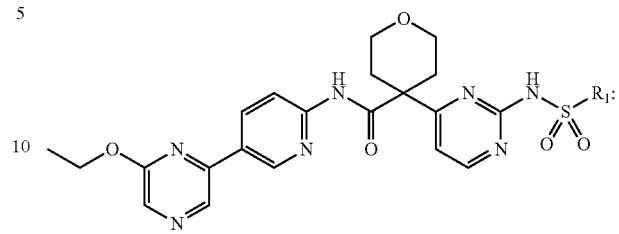
then $R_1$ is
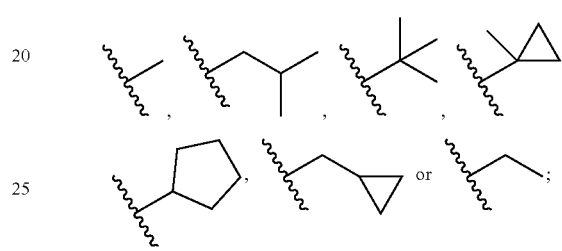
or
(d) when A, V, W, X, Y, Z, $R_4$, $R_5$, $R_{10}$ and $R_{12}$ are as follows:
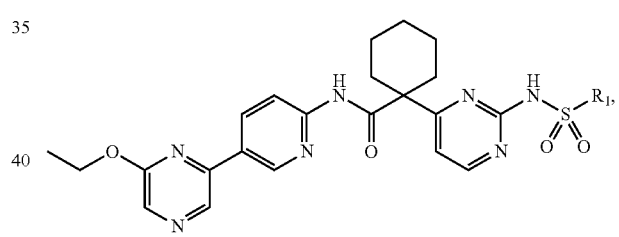
then $R_1$ is
or
(e) when A, X, Y, Z, $R_1$, $R_4$ and $R_5$ are as follows:
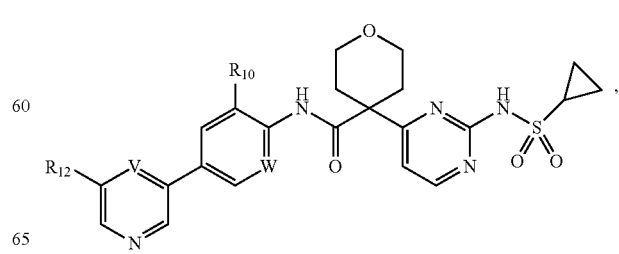

then V, W, R₁₀ and R₁₂ are:

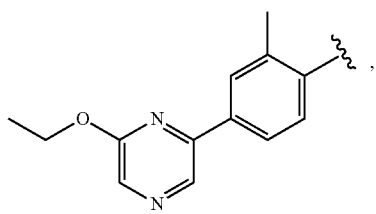

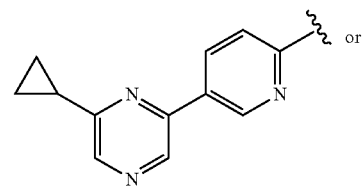

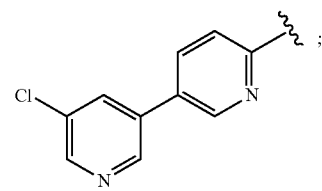

or (f) when A, V, W, R₁, R₄, R₅, R₁₀ and R₁₂ are as follows:

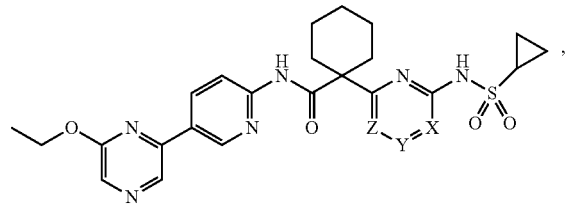

then Z, X and Y are

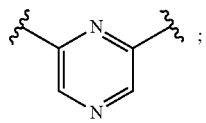

or (g) when A, V, W, R₁, R₄, R₅, R₁₀ and R₁₂ are as follows:

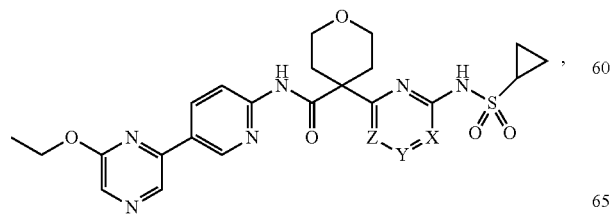

then Z, X and Y are

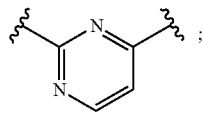

or (h) when A, V, W, R₁, R₄, R₅, R₁₀ and R₁₂ are as follows

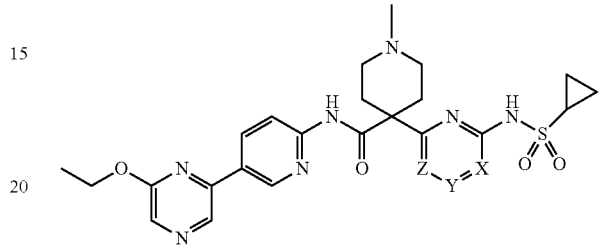

then Z, X and Y are

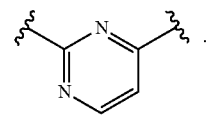

The invention also provides a compound of formula (I):

(I)

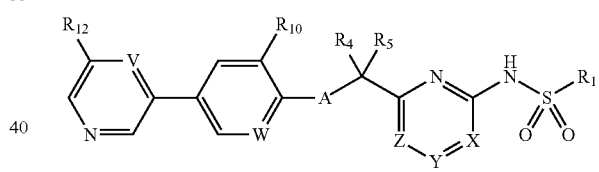

wherein (a) when A, V, W, X, Y, Z, R₁, R₁₀ and R₁₂ are as follows:

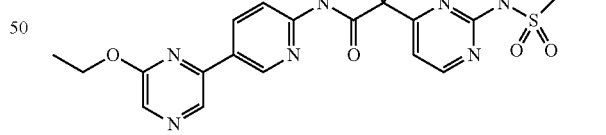

then R₄ and R₅ together with the carbon atom to which they are attached form:

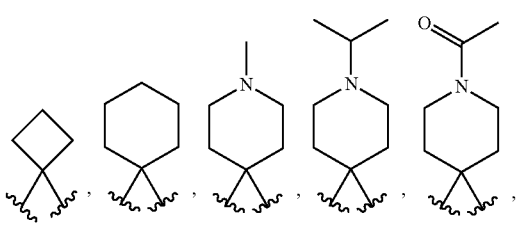

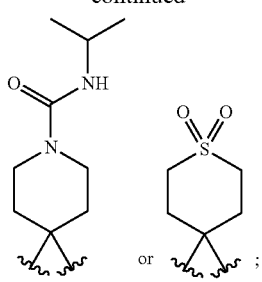 or ;
or
(b) when A, V, W, X, Y, Z, $R_1$, $R_{10}$ and $R_{12}$ are as follows:
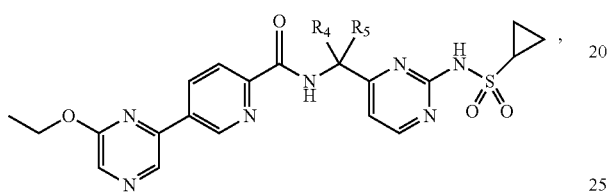
then $R_4$ and $R_5$ together with the carbon atom to which they are attached form:
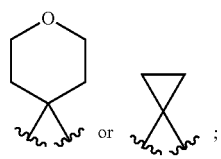 ;
or
(c) when A, V, W, X, Y, Z, $R_4$, $R_5$, $R_{10}$ and $R_{12}$ are as follows:
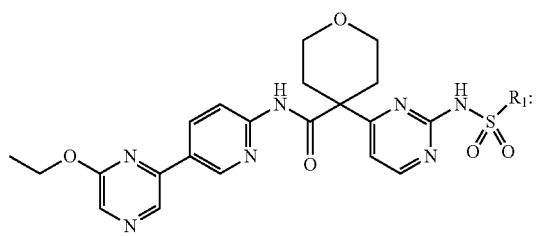
then $R_1$ is
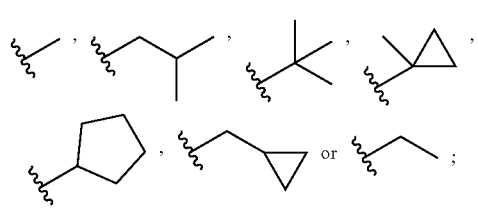
or
(d) when A, V, W, X, Y, Z, $R_4$, $R_5$, $R_{10}$ and $R_{12}$ are as follows:
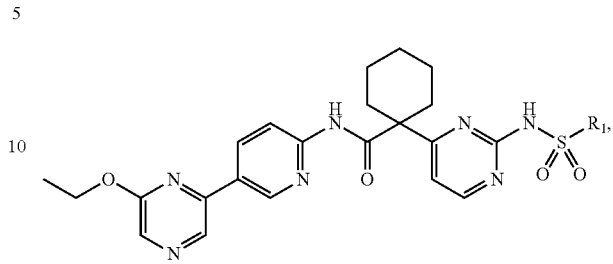
then $R_1$ is
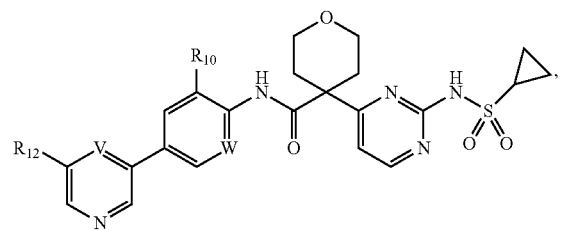 ;
(e) when A, X, Y, Z, $R_1$, $R_4$ and $R_5$ are as follows:
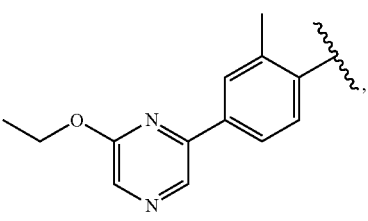
then V, W, $R_{10}$ and $R_{12}$ are:
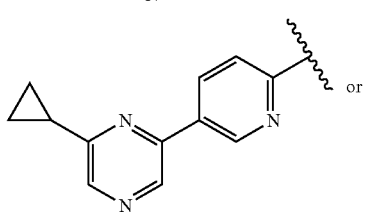
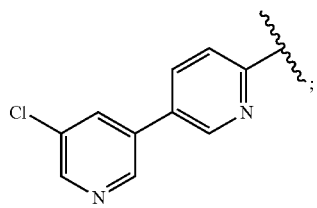

or (f) when A, V, W, $R_1$, $R_4$, $R_5$, $R_{10}$ and $R_{12}$ are as follows:

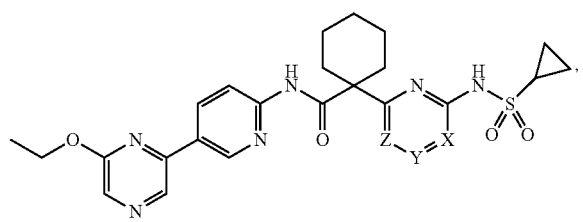

then Z, X and Y are

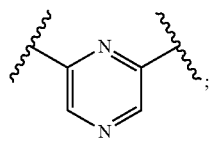 [SMILES: *c1cncc(*)n1]

or (g) when A, V, W, $R_1$, $R_4$, $R_5$, $R_{10}$ and $R_{12}$ are as follows:

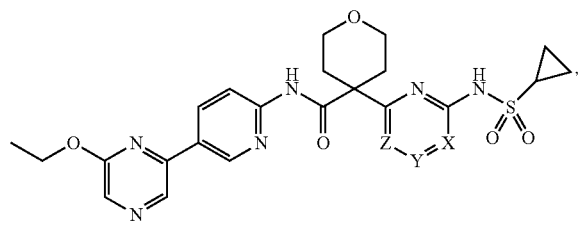

then Z, X and Y are

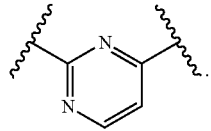 [SMILES: *c1ccnc(*)n1]

A compound of formula (I) may be provided in the form of a salt and/or solvate thereof and/or derivative thereof. Suitably, the compound of formula (I) may be provided in the form of a pharmaceutically acceptable salt and/or solvate thereof and/or derivative thereof. In particular, the compound of formula (I) may be provided in the form of a pharmaceutically acceptable salt and/or solvate, such as a pharmaceutically acceptable salt.

Also provided is a compound of formula (I), or a pharmaceutically acceptable salt and/or solvate thereof and/or derivative thereof, for use as a medicament, in particular for use in the inhibition of CTPS1 in a subject or the prophylaxis or treatment of associated diseases or disorders, such as those in which a reduction in T-cell and/or B-cell proliferation would be beneficial.

Further, there is provided a method for the inhibition of CTPS1 in a subject or the prophylaxis or treatment of associated diseases or disorders, such as those in which a reduction in T-cell and/or B-cell proliferation would be beneficial, by administering to a subject in need thereof a compound of formula (I) or a pharmaceutically acceptable salt and/or solvate thereof and/or derivative thereof.

Additionally provided is the use of a compound of formula (I), or a pharmaceutically acceptable salt and/or solvate thereof and/or derivative thereof, in the manufacture of a medicament for the inhibition of CTPS1 in a subject or the prophylaxis or treatment of associated diseases or disorders, such as those in which a reduction in T-cell and/or B-cell proliferation would be beneficial.

Suitably the disease or disorder is selected from: inflammatory skin diseases such as psoriasis or lichen planus; acute and/or chronic GVHD such as steroid resistant acute GVHD; acute lymphoproliferative syndrome (ALPS); systemic lupus erythematosus, lupus nephritis or cutaneous lupus; and transplantation. In addition, the disease or disorder may be selected from myasthenia gravis, multiple sclerosis, and scleroderma/systemic sclerosis.

Also provided is a compound of formula (I), or a pharmaceutically acceptable salt and/or solvate thereof and/or derivative thereof, for use in the treatment of cancer.

Further, there is provided a method for treating cancer in a subject, by administering to a subject in need thereof a compound of formula (I) or a pharmaceutically acceptable salt and/or solvate thereof and/or derivative thereof.

Additionally provided is the use of a compound of formula (I), or a pharmaceutically acceptable salt and/or solvate thereof and/or derivative thereof, in the manufacture of a medicament for the treatment of cancer in a subject.

Also provided is a compound of formula (I), or a pharmaceutically acceptable salt and/or solvate thereof and/or derivative thereof, for use in enhancing recovery from vascular injury or surgery and reducing morbidity and mortality associated with neointima and restenosis in a subject.

Further, there is provided a method for enhancing recovery from vascular injury or surgery and reducing morbidity and mortality associated with neointima and restenosis in a subject, by administering to a subject in need thereof a compound of formula (I) or a pharmaceutically acceptable salt and/or solvate thereof and/or derivative thereof.

Additionally provided is the use of a compound of formula (I), or a pharmaceutically acceptable salt and/or solvate thereof and/or derivative thereof, in the manufacture of a medicament for enhancing recovery from vascular injury or surgery and reducing morbidity and mortality associated with neointima and restenosis in a subject.

Also provided are pharmaceutical compositions containing a compound of formula (I), or a pharmaceutically acceptable salt and/or solvate thereof and/or derivative thereof, and a pharmaceutically acceptable carrier or excipient.

Also provided are processes for preparing compounds of formula (I) and novel intermediates of use in the preparation of compounds of formula (I).

DETAILED DESCRIPTION OF THE INVENTION

The invention provides a compound of formula (I) as described above, or a pharmaceutically acceptable salt and/or solvate thereof.

The invention also provides a compound of formula (I):

(I)

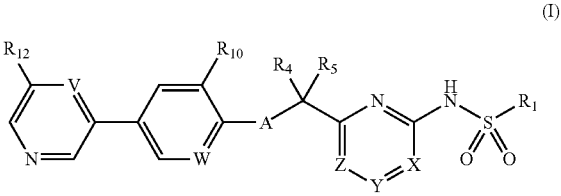

wherein (a) when A, V, W, X, Y, Z, $R_1$, $R_{10}$ and $R_{12}$ are as follows:

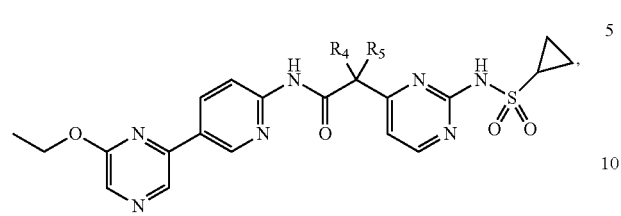

then $R_4$ and $R_5$ together with the carbon atom to which they attached form:

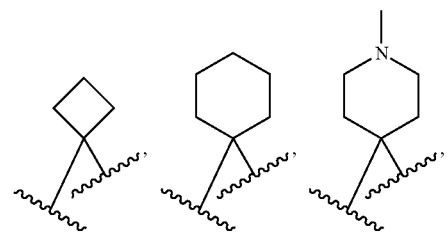

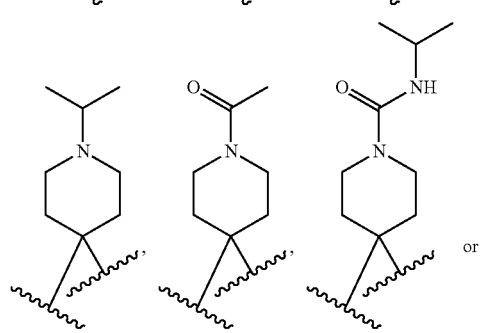

or

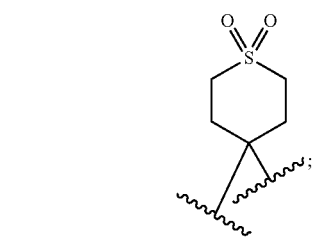

or (b) when A, V, W, X, Y, Z, $R_1$, $R_{10}$ and $R_{12}$ are as follows:

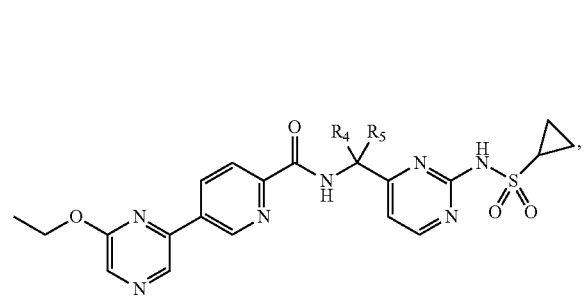

then $R_4$ and $R_5$ together with the carbon atom to which they are attached form:

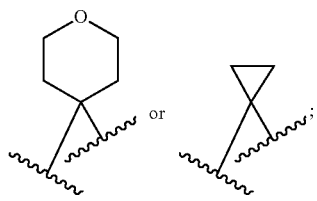 [SMILES: *C1(*)CCOCC1 ; *C1(*)CC1]

or (c) when A, V, W, X, Y, Z, $R_4$, $R_5$, $R_{10}$ and $R_{12}$ are as follows:

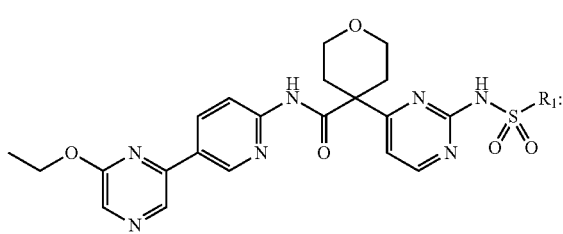

then $R_1$ is

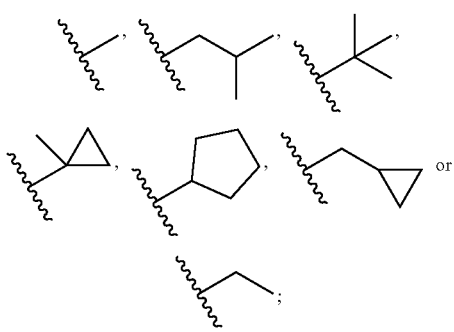

or (d) when A, V, W, X, Y, Z, $R_4$, $R_5$, $R_{10}$ and $R_{12}$ are as follows:

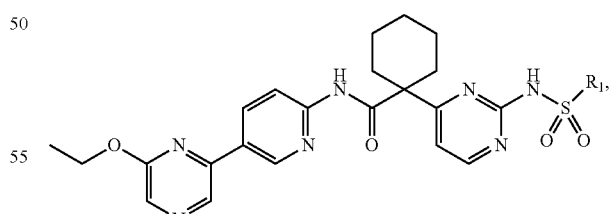

then $R_1$ is;

or (e) when A, X, Y, Z, R$_1$, R$_4$ and R$_5$ are as follows:

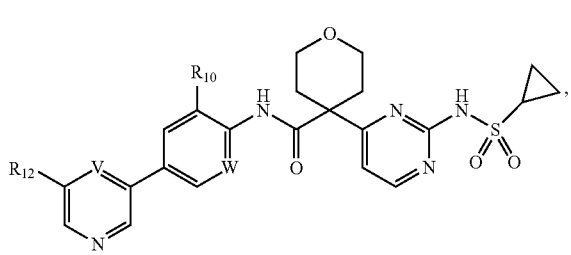

then V, W, R$_{10}$ and R$_{12}$ are:

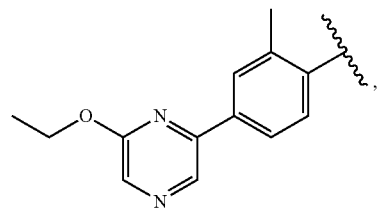

or (f) when A, V, W, R$_1$, R$_4$, R$_5$, R$_{10}$ and R$_{12}$ are as follows:

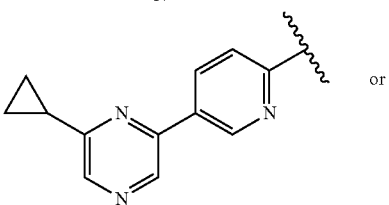

then Z, X and Y are

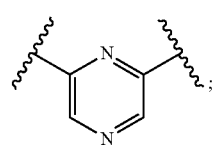 [SMILES: *c1cncc(*)n1]

or (g) when A, V, W, R$_1$, R$_4$, R$_5$, R$_{10}$ and R$_{12}$ are as follows:

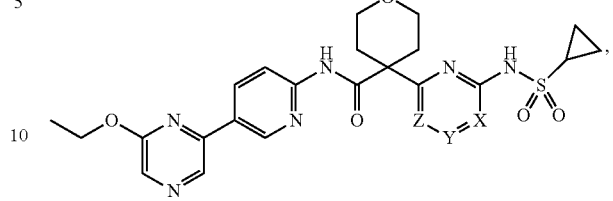

then Z, X and Y are

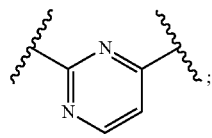 [SMILES: *c1ccnc(*)n1]

or a pharmaceutically acceptable salt and/or solvate thereof.
The present invention provides the following compounds:
N-(5-(6-ethoxypyrazin-2-yl)pyridin-2-yl)-4-(2-(methylsulfonamido)pyrimidin-4-yl)tetrahydro-2H-pyran-4-carboxamide;
1-(2-(cyclopropanesulfonamido)pyrimidin-4-yl)-N-(5-(6-ethoxypyrazin-2-yl)pyridin-2-yl)cyclohexane-1-carboxamide;
N-(5-(6-ethoxypyrazin-2-yl)pyridin-2-yl)-1-(2-(methylsulfonamido)pyrimidin-4-yl)cyclohexane-1-carboxamide;
1-(6-(cyclopropanesulfonamido)pyrazin-2-yl)-N-(5-(6-ethoxypyrazin-2-yl)pyridin-2-yl)cyclohexane-1-carboxamide;
4-(2-(cyclopropanesulfonamido)pyrimidin-4-yl)-N-(4-(6-ethoxypyrazin-2-yl)-2-methylphenyl)tetrahydro-2H-pyran-4-carboxamide;
1-(2-(cyclopropanesulfonamido)pyrimidin-4-yl)-N-(5-(6-ethoxypyrazin-2-yl)pyridin-2-yl)cyclobutane-1-carboxamide;
4-(4-(cyclopropanesulfonamido)pyrimidin-2-yl)-N-(5-(6-ethoxypyrazin-2-yl)pyridin-2-yl)tetrahydro-2H-pyran-4-carboxamide;
4-(2-(cyclopentanesulfonamido)pyrimidin-4-yl)-N-(5-(6-ethoxypyrazin-2-yl)pyridin-2-yl)tetrahydro-2H-pyran-4-carboxamide;
N-(5-(6-ethoxypyrazin-2-yl)pyridin-2-yl)-4-(2-((1-methylcyclopropane)-1-sulfonamido)pyrimidin-4-yl)tetrahydro-2H-pyran-4-carboxamide;
4-(2-(Cyclopropanesulfonamido)pyrimidin-4-yl)-N-(5-(6-ethoxypyrazin-2-yl)pyridin-2-yl)-1-methylpiperidine-4-carboxamide;
4-(2-(Cyclopropanesulfonamido)pyrimidin-4-yl)-N-(5-(6-ethoxypyrazin-2-yl)pyridin-2-yl)-1-isopropylpiperidine-4-carboxamide;
4-(2-(Cyclopropanesulfonamido)pyrimidin-4-yl)-N4-(5-(6-ethoxypyrazin-2-yl)pyridin-2-yl)-N1-isopropylpiperidine-1,4-dicarboxamide;
4-(2-((1,1-dimethylethyl)sulfonamido)pyrimidin-4-yl)-N-(5-(6-ethoxypyrazin-2-yl)pyridin-2-yl)tetrahydro-2H-pyran-4-carboxamide;
N-(4-(2-(cyclopropanesulfonamido)pyrimidin-4-yl)tetrahydro-2H-pyran-4-yl)-5-(6-ethoxypyrazin-2-yl)picolinamide;
1-Acetyl-4-(2-(cyclopropanesulfonamido)pyrimidin-4-yl)-N-(5-(6-ethoxypyrazin-2-yl)pyridin-2-yl)piperidine-4-carboxamide;

N-(5-(6-ethoxypyrazin-2-yl)pyridin-2-yl)-4-(2-((2-methylpropyl)sulfonamido)pyrimidin-4-yl)tetrahydro-2H-pyran-4-carboxamide;

4-(2-(cyclopropanesulfonamido)pyrimidin-4-yl)-N-(5-(6-cyclopropylpyrazin-2-yl)pyridin-2-yl)tetrahydro-2H-pyran-4-carboxamide;

N-(5'-chloro-[3,3'-bipyridin]-6-yl)-4-(2-(cyclopropanesulfonamido)pyrimidin-4-yl)tetrahydro-2H-pyran-4-carboxamide;

N-(1-(2-(cyclopropanesulfonamido)pyrimidin-4-yl)cyclopropyl)-5-(6-ethoxypyrazin-2-yl)picolinamide;

4-(2-(cyclopropanesulfonamido)pyrimidin-4-yl)-N-(5-(6-ethoxypyrazin-2-yl)pyridin-2-yl)tetrahydro-2H-thiopyran-4-carboxamide 1,1-dioxide;

N-(5-(6-ethoxypyrazin-2-yl)pyridin-2-yl)-4-(2-(ethylsulfonamido)pyrimidin-4-yl)tetrahydro-2H-pyran-4-carboxamide; and 4-(2-(cyclopropylmethylsulfonamido) pyrimidin-4-yl)-N-(5-(6-ethoxypyrazin-2-yl)pyridin-2-yl)tetrahydro-2H-pyran-4-carboxamide.

The present invention also provides the following compound:

4-(4-(cyclopropanesulfonamido)pyrimidin-2-yl)-N-(5-(6-ethoxypyrazin-2-yl)pyridin-2-yl)-1-methylpiperidine-4-carboxamide.

The compounds of the invention may be provided in the form of a pharmaceutically acceptable salt and/or solvate thereof and/or derivative thereof. In particular, the compound of formula (I) may be provided in the form of a pharmaceutically acceptable salt and/or solvate, such as a pharmaceutically acceptable salt.

Compounds of the invention of particular interest are those demonstrating an $IC_{50}$ of 1 uM or lower, especially 100 nM or lower, in respect of CTPS1 enzyme, using the methods of the examples (or comparable methods).

Compounds of the invention of particular interest are those demonstrating a selectivity for CTPS1 over CTPS2 of 2-30 fold, suitably >30-60 fold or more suitably >60 fold, using the methods of the examples (or comparable methods). Desirably the selectivity is for human CTPS1 over human CTPS2.

It will be appreciated that for use in medicine the salts of the compounds of formula (I) should be pharmaceutically acceptable. Non-pharmaceutically acceptable salts of the compounds of formula (I) may be of use in other contexts such as during preparation of the compounds of formula (I). Suitable pharmaceutically acceptable salts will be apparent to those skilled in the art.

Pharmaceutically acceptable salts include those described by Berge et al. (1977). Such pharmaceutically acceptable salts include acid and base addition salts. Pharmaceutically acceptable acid additional salts may be formed with inorganic acids e.g. hydrochloric, hydrobromic, sulphuric, nitric or phosphoric acid and organic acids e.g. succinic, maleic, acetic, fumaric, citric, tartaric, benzoic, p-toluenesulfonic, methanesulfonic or naphthalenesulfonic acid.

Other salts e.g. oxalates or formates, may be used, for example in the isolation of compounds of formula (I) and are included within the scope of this invention.

Certain of the compounds of formula (I) may form acid or base addition salts with one or more equivalents of the acid or base. The present invention includes within its scope all possible stoichiometric and non-stoichiometric forms.

The compounds of formula (I) may be prepared in crystalline or non-crystalline form and, if crystalline, may optionally be solvated, e.g. as the hydrate. This invention includes within its scope stoichiometric solvates (e.g. hydrates) as well as compounds containing variable amounts of solvent (e.g. water).

It will be understood that the invention includes pharmaceutically acceptable derivatives of compounds of formula (I) and that these are included within the scope of the invention.

As used herein "pharmaceutically acceptable derivative" includes any pharmaceutically acceptable prodrug such as an ester or salt of such ester of a compound of formula (I) which, upon administration to the recipient is capable of providing (directly or indirectly) a compound of formula (I) or an active metabolite or residue thereof.

It is to be understood that the present invention encompasses all isomers of formula (I) and their pharmaceutically acceptable derivatives, including all geometric, tautomeric and optical forms, and mixtures thereof (e.g. racemic mixtures). Where additional chiral centres are present in compounds of formula (I), the present invention includes within its scope all possible diastereoisomers, including mixtures thereof. The different isomeric forms may be separated or resolved one from the other by conventional methods, or any given isomer may be obtained by conventional synthetic methods or by stereospecific or asymmetric syntheses.

The present disclosure includes all isotopic forms of the compounds of the invention provided herein, whether in a form (i) wherein all atoms of a given atomic number have a mass number (or mixture of mass numbers) which predominates in nature (referred to herein as the "natural isotopic form") or (ii) wherein one or more atoms are replaced by atoms having the same atomic number, but a mass number different from the mass number of atoms which predominates in nature (referred to herein as an "unnatural variant isotopic form"). It is understood that an atom may naturally exist as a mixture of mass numbers. The term "unnatural variant isotopic form" also includes embodiments in which the proportion of an atom of given atomic number having a mass number found less commonly in nature (referred to herein as an "uncommon isotope") has been increased relative to that which is naturally occurring e.g. to the level of >20%, >50%, >75%, >90%, >95% or >99% by number of the atoms of that atomic number (the latter embodiment referred to as an "isotopically enriched variant form"). The term "unnatural variant isotopic form" also includes embodiments in which the proportion of an uncommon isotope has been reduced relative to that which is naturally occurring. Isotopic forms may include radioactive forms (i.e. they incorporate radioisotopes) and non-radioactive forms. Radioactive forms will typically be isotopically enriched variant forms.

An unnatural variant isotopic form of a compound may thus contain one or more artificial or uncommon isotopes such as deuterium ($^{2}H$ or D), carbon-11 ($^{11}C$), carbon-13 ($^{13}C$), carbon-14 ($^{14}C$), nitrogen-13 ($^{13}N$), nitrogen-15 ($^{15}N$), oxygen-15 ($^{15}O$), oxygen-17 ($^{17}O$), oxygen-18 ($^{18}O$) phosphorus-32 ($^{32}P$), sulphur-35 ($^{35}S$), chlorine-36 ($^{36}Cl$), chlorine-37 (37Cl), fluorine-18 ($^{18}F$) iodine-123 ($^{123}I$), iodine-125 ($^{125}I$) in one or more atoms or may contain an increased proportion of said isotopes as compared with the proportion that predominates in nature in one or more atoms.

Unnatural variant isotopic forms comprising radioisotopes may, for example, be used for drug and/or substrate tissue distribution studies. The radioactive isotopes tritium, i.e. $^{3}H$, and carbon-14, i.e. $^{14}C$, are particularly useful for this purpose in view of their ease of incorporation and ready means of detection. Unnatural variant isotopic forms which incorporate deuterium i.e. $^{2}H$ or D may afford certain therapeutic advantages resulting from greater metabolic stability, for example, increased in vivo half-life or reduced dosage requirements, and hence may be preferred in some circumstances. Further, unnatural variant isotopic forms may be prepared which incorporate positron emitting isotopes, such as $^{11}C^{18}F$, $^{15}O$ and $^{13}N$, and would be useful in Positron Emission Topography (PET) studies for examining substrate receptor occupancy.

In one embodiment, the compounds of the invention are provided in a natural isotopic form.

In one embodiment, the compounds of the invention are provided in an unnatural variant isotopic form. In a specific embodiment, the unnatural variant isotopic form is a form in which deuterium (i.e. $^2H$ or D) is incorporated where hydrogen is specified in the chemical structure in one or more atoms of a compound of the invention. In one embodiment, the atoms of the compounds of the invention are in an isotopic form which is not radioactive. In one embodiment, one or more atoms of the compounds of the invention are in an isotopic form which is radioactive. Suitably radioactive isotopes are stable isotopes. Suitably the unnatural variant isotopic form is a pharmaceutically acceptable form.

In one embodiment, a compound of the invention is provided whereby a single atom of the compound exists in an unnatural variant isotopic form. In another embodiment, a compound of the invention is provided whereby two or more atoms exist in an unnatural variant isotopic form.

Unnatural isotopic variant forms can generally be prepared by conventional techniques known to those skilled in the art or by processes described herein e.g. processes analogous to those described in the accompanying Examples for preparing natural isotopic forms. Thus, unnatural isotopic variant forms could be prepared by using appropriate isotopically variant (or labelled) reagents in place of the normal reagents employed in the Examples. Since the compounds of formula (I) are intended for use in pharmaceutical compositions it will readily be understood that they are each preferably provided in substantially pure form, for example at least 60% pure, more suitably at least 75% pure and preferably at least 85%, especially at least 98% pure (% are on a weight for weight basis). Impure preparations of the compounds may be used for preparing the more pure forms used in the pharmaceutical compositions.

In general, the compounds of formula (I) may be made according to the organic synthesis techniques known to those skilled in this field, as well as by the representative methods set forth below, those in the Examples, and modifications thereof.

General Routes:

Generic routes by which compound examples of the invention may be conveniently prepared are summarised below.

Scheme 1
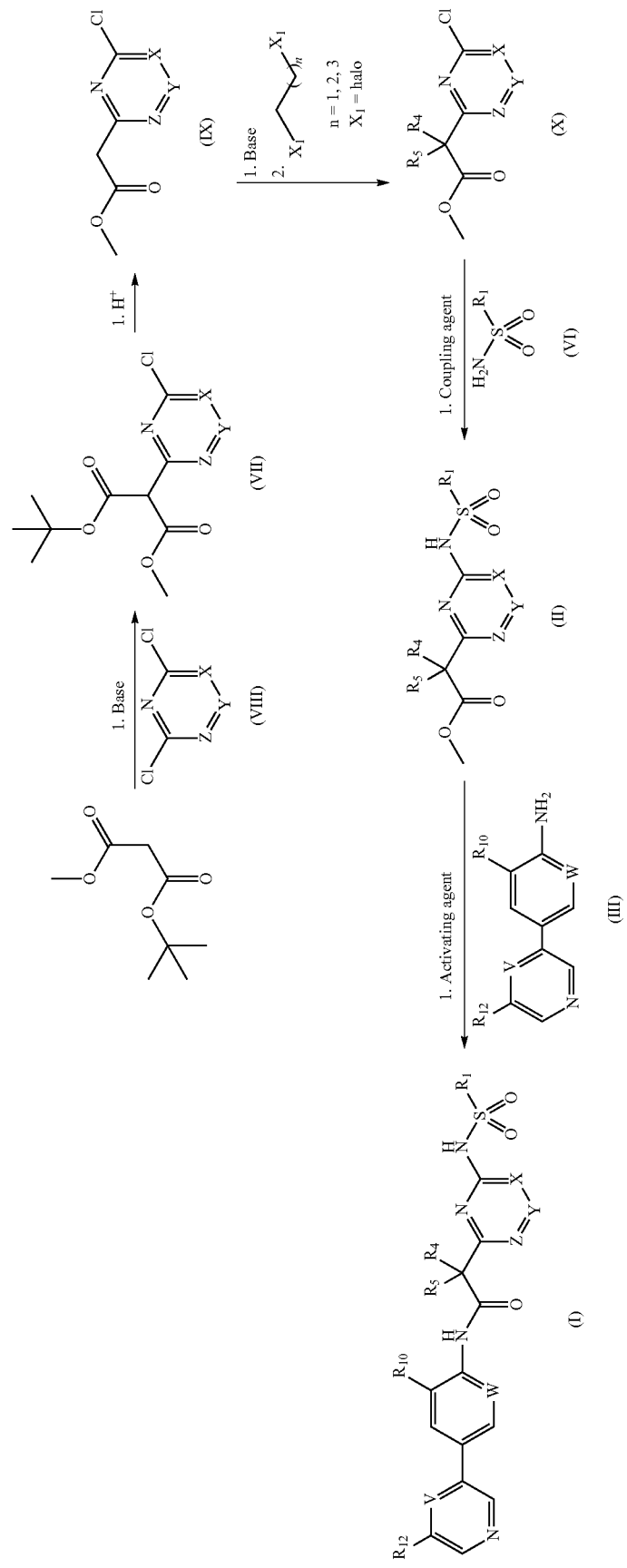

In general, and as illustrated in Scheme 1, compounds of general formula (I) may be obtained by a five step process from a compound of general formula (VIII). For example, compounds P236, P237, P238, P239, P240, P252, and P253 may be made using methods disclosed in this route. Firstly, the compound (VIII) can be reacted with an unsymmetrical malonate ester as shown in Scheme 1. For example, the unsymmetrical malonate ester can be treated with a base such as $Cs_2CO_3$ in the presence of (VIII) in a solvent such as DMF and heated to an elevated temperature such as 80° C., followed by an aqueous work-up to obtain compounds of formula (VII). This intermediate compound can then be deprotected at this stage via a decarboxylation, initiated by the use of a strong acid such as TFA to yield intermediate derivative (IX). Certain intermediates such as (IX) where Z=CH, are commercially available. Reaction of a compound of general formula (IX) with an inorganic base such as potassium carbonate, in the presence of an alkylating agent leads to alkylation alpha to the ester. For compounds of formula (I) wherein $R_4$ and $R_5$ are connected to form a $C_6$cycloalkyl ring as defined above, such compounds may be prepared by double alkylation with a dihaloalkane, such as 1,2-dibromoethane or 1,3-dibromobutane in the presence of an inorganic base such as sodium hydroxide. For compounds of general formula (I) wherein $R_4$ and $R_5$ together with the carbon to which they are attached form a $C_6$heterocycloalkyl, double alkylation of intermediates (IX) using a di-haloheteroalkane (such as $BrCH_2CH_2OCH_2CH_2Br$) in the presence of a base such as $Cs_2CO_3$ in a solvent such as MeCN at an elevated temperature such as 60° C. followed by direct column chromatography can be used to provide compounds of formula (X).

Palladium catalysed sulfamination of intermediate (X) may be achieved using a catalyst such as [t-BuXPhosPd (allyl)]OTf or t-BuXPhos-Pd-G3 and substituted sulfonamide nucleophile (VI), in the presence of an inorganic base, for example potassium carbonate to form intermediate derivative (II). Alternatively, sulfamination of intermediate (X) may be achieved using a substituted sulfonamide nucleophile (VI), in the presence of an inorganic base, for example $Cs_2CO_3$ and a solvent such as N-methyl pyrrolidinone to form intermediates (II) which may be obtained by precipitation following dilution in aqueous 4M HCl.

Final transformation to compounds of general formula (I) can be prepared by conversion of intermediate (II) by activation of the ester moiety using trimethylaluminium (usually a 2.0 M solution in toluene or heptane) and addition of amine (III) (commercially available or prepared as in Scheme 2 below). Alternatively, compounds of formula (I) may be obtained by a strong base-mediated amide formation between compounds (II) and (III) at room temperature using bases such as iPrMgCl, LiHMDS or KOtBu.

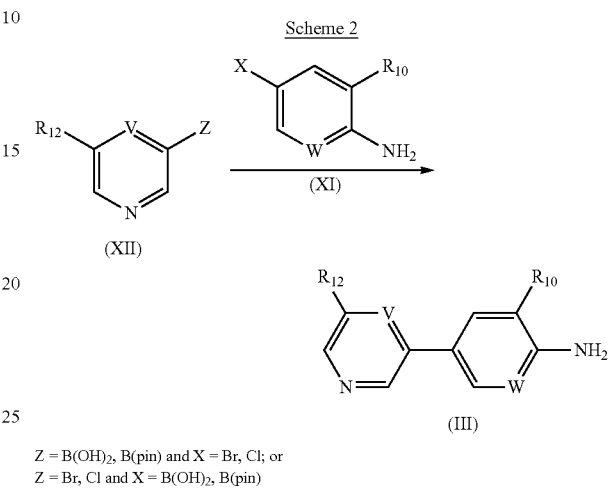

Scheme 2

$Z = B(OH)_2$, B(pin) and X = Br, Cl; or
$Z = Br$, Cl and X = $B(OH)_2$, B(pin)

Intermediates of formula (III) wherein W, V, $R_{10}$ and $R_{12}$ are defined above may be synthesised by coupling under Suzuki conditions of a boronate of general formula (XII), wherein Z represents a dihydroxyboryl or dialkyloxyboryl group, usually a 4,4,5,5-tetramethyl-1,3,3,2-dioxaborolan-2-yl group, to a compound of formula (XI) where X denotes a halide. Alternatively, X represents a dihydroxyboryl or dialkyloxyboryl group, usually a 4,4,5,5-tetramethyl-1,3,3,2-dioxaborolan-2-yl group and Z represents a halide. The couplings according to the Suzuki method are performed, for example, by heating in the presence of a catalyst such as [1,1'-bis(diphenylphosphino)ferrocene]dichloropalladium (II) complex with dichloromethane and an inorganic base such as potassium carbonate in a solvent mixture of dioxane and water.

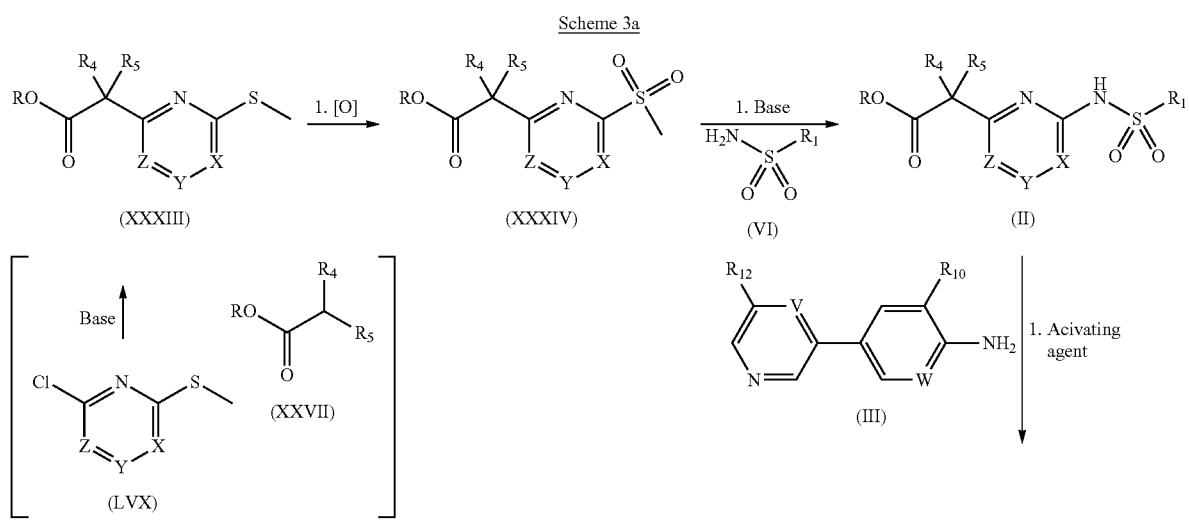

Scheme 3a

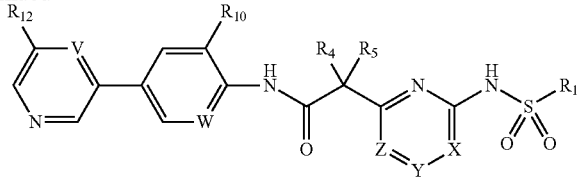

R is H, $C_{1-4}$alkyl (e.g. methyl and ethyl) or benzyl. In general, and as illustrated in Scheme 3a, compounds of formula (I) wherein $R_1$, X, Y, Z, V, W, $R_{10}$ and $R_{12}$ are as defined above, and for example, $R_4$ and $R_5$ together with the carbon atom to which they are attached form a $C_{3-6}$ heterocycloalkyl ring or a $C_4$cycloalkyl ring may be prepared in four steps from compounds of formula (LVX). For example, compounds P241, P243 and P259 may be made using this route.

An intermediate of formula (XXXVII) may be coupled to a compound of formula (LVX) in the presence of a base such as LiHMDS to give a compound of formula (XXXIII). Thioethers of the general formula (XXXIII) may be transformed to sulfones (XXXIV) in the presence of an oxidising agent such as mCPBA. Displacement of the sulfone group with a primary sulfonamide (VI) in the presence of a base such as $Cs_2CO_3$ and a solvent such as N-methyl pyrrolidone gives compounds of formula (II). Compounds of formula (I) may be obtained by a strong base-mediated amide formation between compounds (II) and (III) at room temperature using bases such as iPrMgCl, LiHMDS or KOtBu.

Scheme 3b

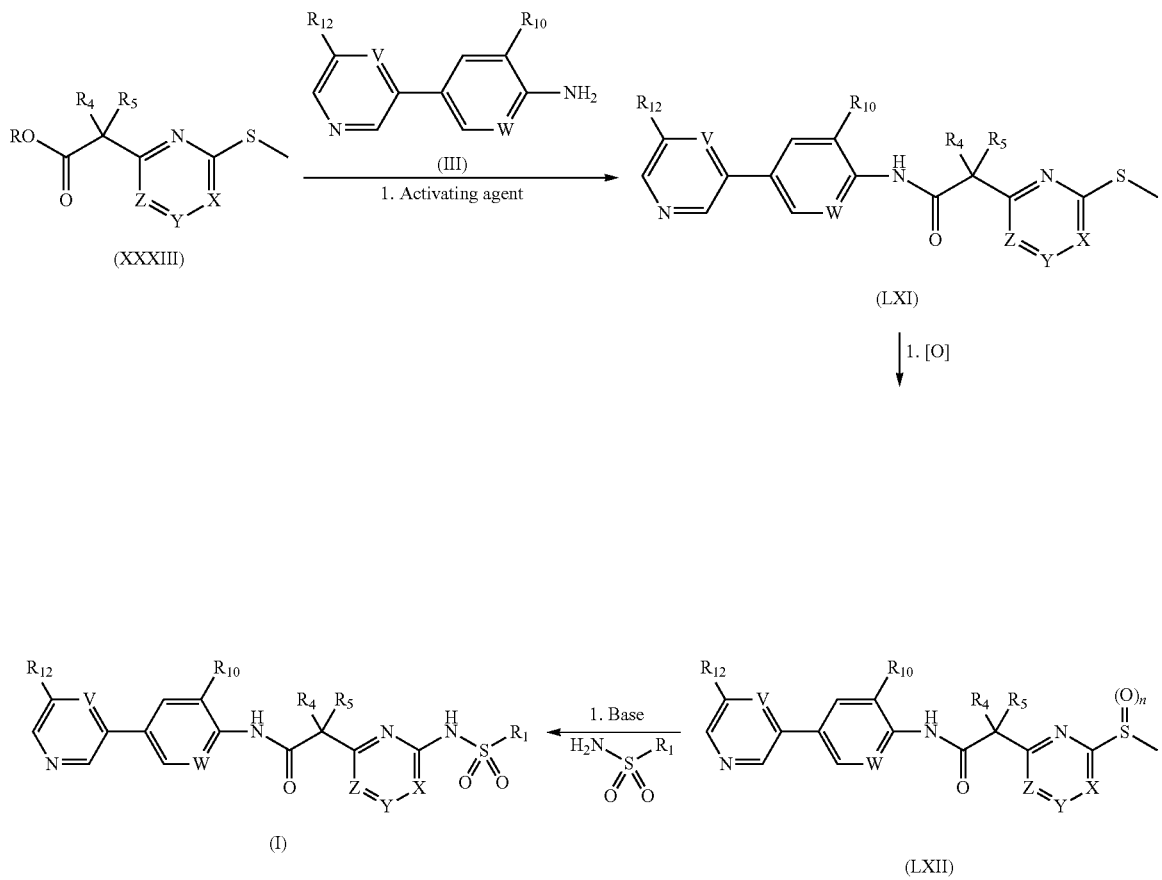

n = 1 sulfoxide
n = 2 sulfone

R is H, $C_{1-4}$alkyl (e.g. methyl and ethyl) or benzyl. In general, and as illustrated in Scheme 3b, compounds of formula (I) wherein $R_1$, X, Y, Z, V, W, $R_{10}$ and $R_{12}$ are as defined above, and for example, $R_4$ and $R_5$ together with the carbon atom to which they are attached form a $C_{3-6}$ heterocycloalkyl ring may be prepared in three steps from compounds of formula (XXXIII). For example, compounds P231, P232, P233, P234, P245, P246, P247, P250, P262 and P263 may be made using this route. Compounds of formula (LXI) may be obtained by a strong base-mediated amide formation between compounds (XXXIII) and (III) at room temperature using bases such as iPrMgCl, LiHMDS or KOtBu. Thioethers of the general formula (LXI) may be transformed to sulfoxides (n=1) or sulfones (n=2) (LXII) in the presence of an oxidising agent such as mCPBA. Displacement of the sulfoxide or sulfone group with a primary sulfonamide (VI) in the presence of a base such as $Cs_2CO_3$ and a solvent such as N-methyl pyrrolidone gives compounds of formula (I).

Scheme 3c

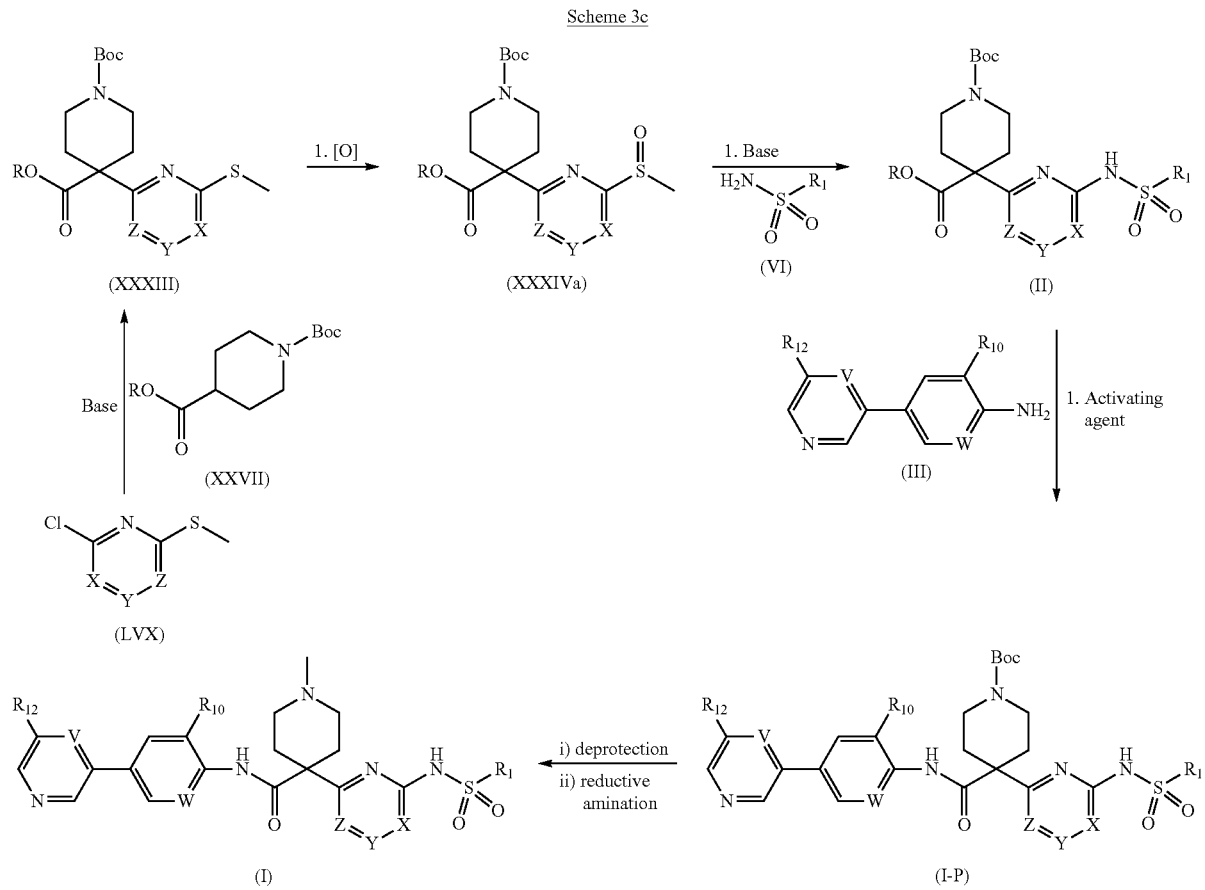

R is H, $C_{1-4}$alkyl (e.g. methyl and ethyl) or benzyl. In general, and as illustrated in Scheme 3c, compounds of formula (I) wherein $R_1$, X, Y, Z, V, W, $R_4$, $R_5$, $R_{10}$ and $R_{12}$ are as defined above, may be prepared in five steps from compounds of formula (LVX). For example, P319 may be made using this route. An intermediate of formula (XXXVII) may be coupled to a compound of formula (LVX) in the presence of a base such as LiHMDS to give a compound of formula (XXXIII). Thioethers of the general formula (XXXIII) may be transformed to sulfoxides (XXXIVa) in the presence of an oxidising agent such as mCPBA. Displacement of the sulfoxide group with a primary sulfonamide (VI) in the presence of a base such as $Cs_2CO_3$ and a solvent such as N-methyl pyrrolidone gives compounds of formula (II). Compounds of formula (I) may be obtained by a strong base-mediated amide formation between compounds (II) and (III) at room temperature using bases such as iPrMgCl, LiHMDS or KOtBu, followed by removal of the Boc group using a strong acid such as TFA, and a reductive amination under standard conditions to give a compound of formula (I).

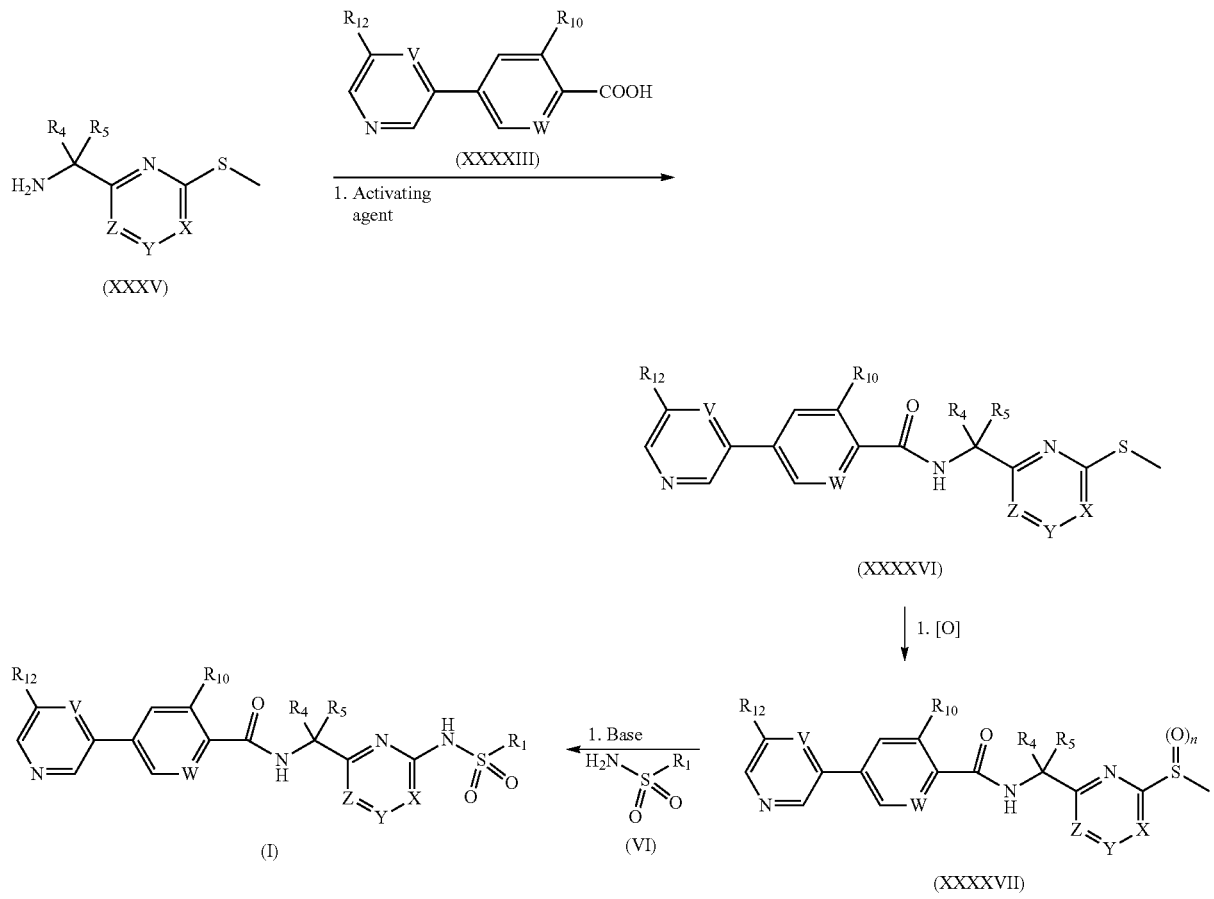

Scheme 3d wherein R is H, $C_{1-4}$alkyl (e.g. methyl and ethyl) or benzyl. In general, and as illustrated in Scheme 3d, compounds of formula (I) wherein $R_1$, X, Y, Z, V, W, $R_{10}$ and $R_{12}$ are as defined above, and for example, $R_4$ and $R_5$ together with the carbon atom to which they are attached form a $C_6$heterocycloalkyl ring or a $C_3$cycloalkyl ring may be prepared in three steps from compounds of formula (XXXXV), which in turn are accessed by methods shown in the Example section. For example, compounds P249 and P257 may be prepared using this route. Compounds of formula (XXXXVI) may be obtained by a strong base-mediated amide formation between compounds (XXXXIII) and (XXXXV) at room temperature using bases such as iPrMgCl, LiHMDS or KOtBu. Thioethers of the general formula (XXXXVI) may be transformed to sulfoxides (n=1) or sulfones (n=2) (XXXXVII) in the presence of an oxidising agent such as mCPBA. Displacement of the sulfoxide or sulfone group with a primary sulfonamide (VI) in the presence of a base such as $Cs_2CO_3$ and a solvent such as N-methyl pyrrolidone gives compounds of formula (I).

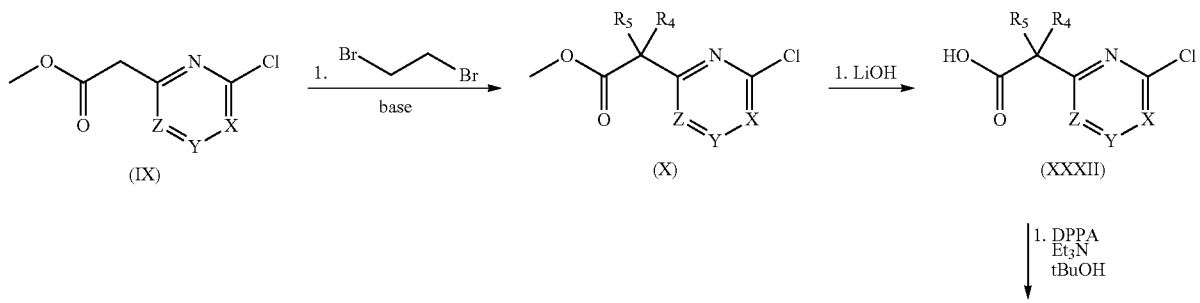

Scheme 4

-continued

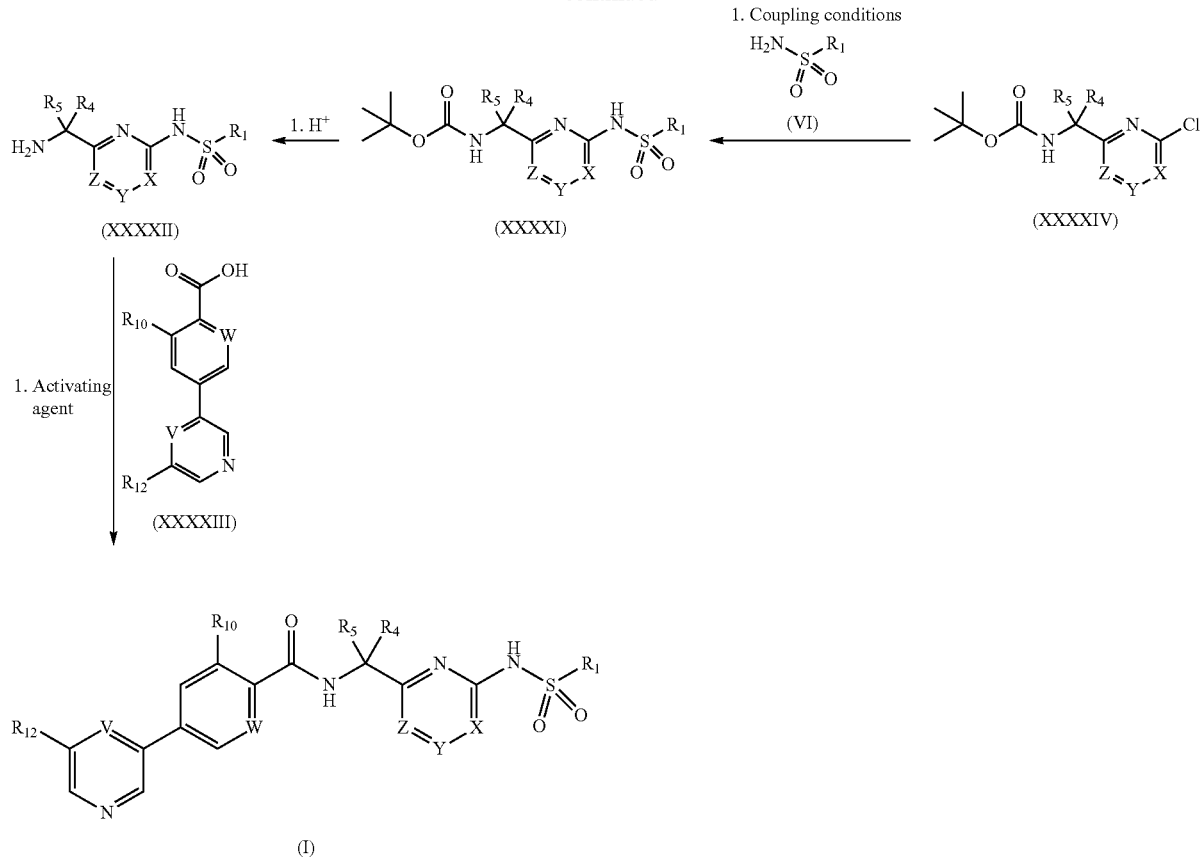

Compounds of general formula (I) where $R_1$, V, W, $R_{10}$, $R_{12}$ are defined above, X is N, Y is CH and Z is CH and $R_4$ and $R_5$ together with the carbon to which they are attached form a $C_3$cycloalkyl or $C_6$heterocycloalkyl may be obtained by a six step process, as shown in Scheme 4. For example, compounds P249 and P257 may be prepared using this route. Firstly, the derivative (IX) can be reacted with an alkyl halide to give compounds of general formula (X) wherein $R_4$ and $R_5$ join for form a $C_3$cycloalkyl ring. Alternatively, derivative (IX) can be reacted with a heteroalkyl bis-halide (e.g. Br—$CH_2CH_2OCH_2CH_2$—Br) to give compounds of general formula (X) where $R_4$ and $R_5$ can be joined to form a $C_6$heterocycloalkyl ring as defined above. Carboxylic acid (XXXII) can be obtained by hydrolysis of methyl ester (X) using an alkali metal base such as lithium hydroxide in a solvent mixture such as THF/MeOH. Curtius rearrangement can be carried out, for example, using diphenylphosphoryl azide in the presence of triethylamine and tert-butanol to yield carbamates such as (XXXXIV). The corresponding sulfonamide (XXXXI) may then be accessed by a palladium catalysed sulfamination employing conditions previously reported in Scheme 1. Amide coupling conditions may then be employed to convert the compounds of formula (XXXXII) to amides of general formula (I) by employing a coupling reagent together with a biaryl carboxylic acid (XXXXIII), prepared according to Scheme 5.

Scheme 5

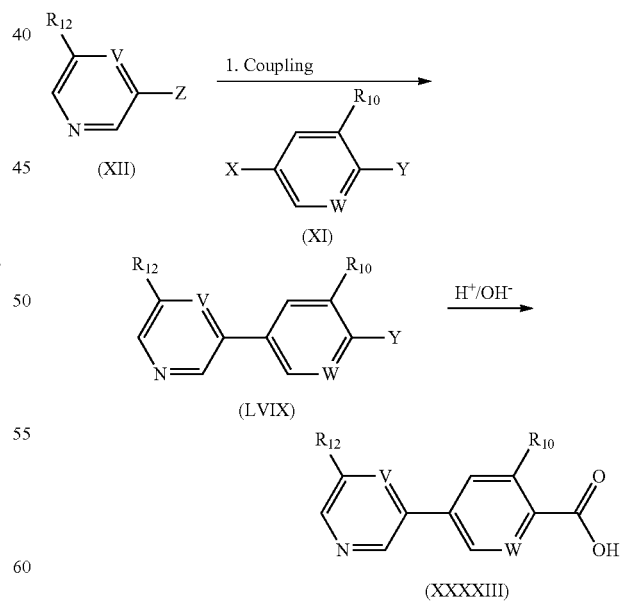

Z = Br, Cl
X = B(OH)$_2$, B(pin)
Y = CO$_2$t-Bu, CO$_2$Me, CN

Intermediates of formula (XXXXIII) wherein W, V, $R_{10}$ and $R_{12}$, may be synthesised as shown in Scheme 5 by coupling under Suzuki conditions of an aromatic halide of general formula (XII) to a boronate of general formula (XI) wherein X denotes a dihydroxyboryl or dialkyloxyboryl group, such as a 4,4,5,5-tetramethyl-1,3,3,2-dioxaborolan-2-yl group. The couplings according to the Suzuki method are performed, for example, by heating in the presence of a catalyst such as [1,1'-bis(diphenylphosphino)ferrocene]dichloropalladium(II). $CH_2Cl_2$ adduct and an inorganic base such as cesium carbonate in a solvent mixture of dioxane and water under an inert atmosphere such as a nitrogen atmosphere to give compounds of formula (LVIX). The carboxylic acids of general formula (XXXXIII) are obtained by either deprotection of the t-butyl ester using a strong acid, such as TFA in a solvent of $CH_2Cl_2$, hydrolysis of the methyl ester using an alkali metal hydroxide such as NaOH in a solvent mixture such as THF/MeOH or hydrolysis of the nitrile using a strong acid such as concentrated HCl.

Intermediates of the Invention

The present invention also relates to novel intermediates in the synthesis of compounds of formula (I) such as compounds of formula (II) to (LVIX). Particular intermediates of interest are those of the following general formulae, wherein the variable groups and associated preferences are as defined previously for compounds of formula (I):

a compound of formula (II):

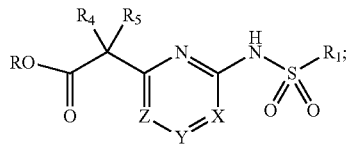

(II)

wherein R is H, $C_{1-4}$alkyl (e.g. methyl and ethyl) or benzyl;

a compound of formula (XXXIII):

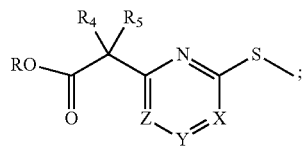

(XXXIII)

wherein R is H, $C_{1-4}$alkyl (e.g. methyl and ethyl) or benzyl;

a compound of formula (XXXIV):

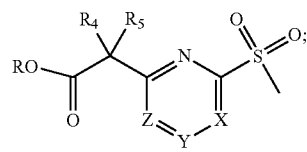

(XXXIV)

wherein R is H, $C_{1-4}$alkyl (e.g. methyl and ethyl) or benzyl;

a compound of formula (XXXIVa):

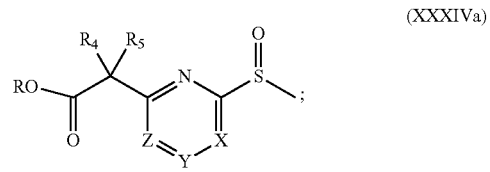

(XXXIVa)

wherein R is H, $C_{1-4}$alkyl (e.g. methyl and ethyl) or benzyl;

a compound of formula (LXI):

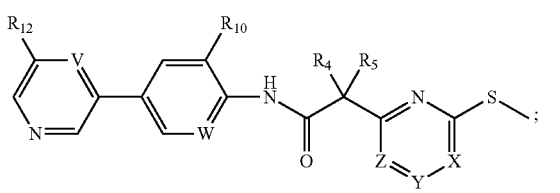

(LXI)

wherein all variables in (LXI) are defined elsewhere herein;

a compound of formula (LXII):

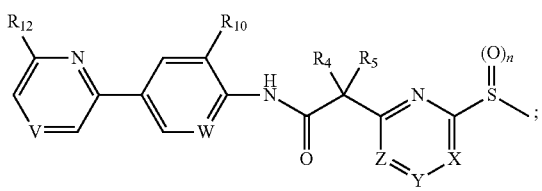

(LXII)

wherein all variables in (LXII) are defined elsewhere herein;

a compound of formula (XXXI):

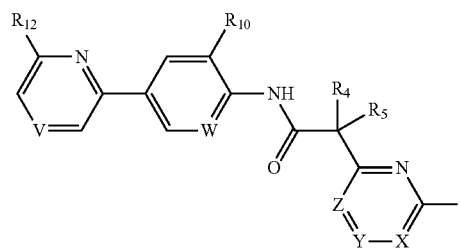

(XXXXII)

wherein all variables in (XXXI) are defined elsewhere herein;

a compound of formula (XXXXII):

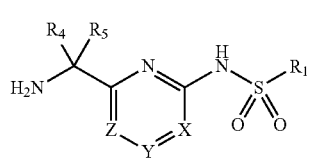

(XXXXII)

wherein all variables in (XXXXII) are defined elsewhere herein.

Also provided is a compound selected from the group consisting of:
a compound of formula (II-a):

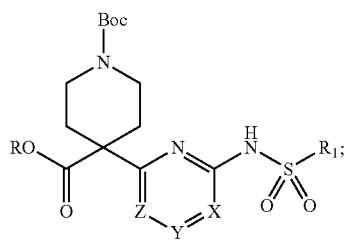

(II-a)

wherein R is H, $C_{1-4}$alkyl (e.g. methyl and ethyl) or benzyl, and X, Y, Z and $R_1$ are as defined in herein;
a compound of formula (XXXIII-a):

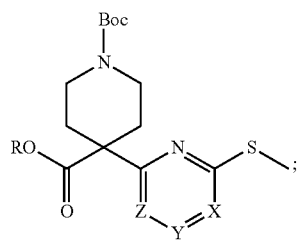

(XXXIII-a)

wherein R is H, $C_{1-4}$alkyl (e.g. methyl and ethyl) or benzyl, and X, Y and Z are as defined in herein; and
a compound of formula (XXXIVa-a):

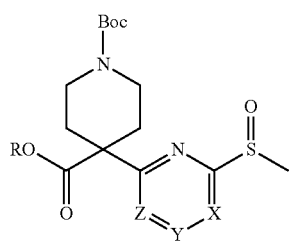

(XXXIVa-a)

wherein R is H, $C_{1-4}$alkyl (e.g. methyl and ethyl) or benzyl, and X, Y and Z are as defined in herein;
or a salt, such as a pharmaceutically acceptable salt thereof.

Also provided are compounds of formula (I-P):

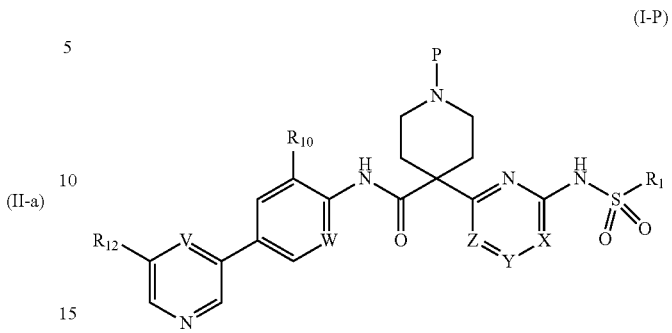

(I-P)

wherein P is a suitable nitrogen protecting group such as Boc and the remaining variables are as defined herein; or a salt, such as a pharmaceutically acceptable salt thereof.
Also provided are compounds of formula (I-DP):

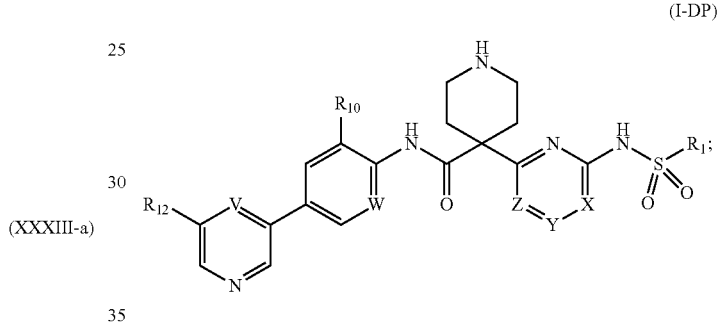

(I-DP)

wherein all variables are as defined herein; or a salt, such as a pharmaceutically acceptable salt thereof.
Included as an aspect of the invention are all intermediates described in the examples, including:
Intermediates INTC180 to INTC183;
Intermediate INTC185;
Intermediate INTC189;
Intermediates INTC193 to INTC196;
Intermediate INTC200;
Intermediate INTC202;
Intermediate INTC204;
Intermediate INTC206;
Intermediate INTC209;
Intermediate INTC211;
Intermediate INTC213;
Intermediate INTC217;
Intermediates INTC219 to INCT222;
Intermediates INTC241 to INTC243; and
Intermediates INTC246 and INTC247.
Included as an aspect of the invention are salts such as pharmaceutically acceptable salts of any one of the intermediates disclosed herein, such as any one of compounds of formulae (II)-(LXI).
Therapeutic Methods
Compounds of formula (I) of the present invention have utility as inhibitors of CTPS1.
Therefore, the invention also provides a compound of formula (I), or a pharmaceutically acceptable salt and/or solvate (e.g. salt) and/or derivative thereof, for use as a medicament, in particular in the treatment or prophylaxis of a disease or disorder wherein an inhibitor of CTPS1 is beneficial, for example those diseases and disorders mentioned herein below.

The invention provides a method for the treatment or prophylaxis of a disease or disorder wherein an inhibitor of CTPS1 is beneficial, for example those diseases and disorders mentioned herein below, which comprises administering to a subject in need thereof an effective amount of a compound of formula (I) or a pharmaceutically acceptable salt and/or solvate (e.g. salt) and/or derivative thereof.

The invention also provides the use of a compound of formula (I), or a pharmaceutically acceptable salt and/or solvate thereof (e.g. salt) and/or derivative, in the manufacture of a medicament for the treatment or prophylaxis of a disease or disorder wherein an inhibitor of CTPS1 is beneficial, for example those diseases and disorders mentioned herein below.

More suitably, the disease or disorder wherein an inhibitor of CTPS1 is beneficial is a disease or disorder wherein a reduction in T-cell and/or B-cell proliferation would be beneficial.

The invention also provides a compound of formula (I), or a pharmaceutically acceptable salt and/or solvate (e.g. salt) and/or derivative thereof, for use in the inhibition of CTPS1 in a subject.

The invention provides a method for the inhibition of CTPS1 in a subject, which comprises administering to the subject an effective amount of a compound of formula (I) or a pharmaceutically acceptable salt and/or solvate (e.g. salt) and/or derivative thereof.

The invention also provides the use of a compound of formula (I), or a pharmaceutically acceptable salt and/or solvate thereof (e.g. salt) and/or derivative, in the manufacture of a medicament for the inhibition of CTPS1 in a subject.

The invention also provides a compound of formula (I), or a pharmaceutically acceptable salt and/or solvate (e.g. salt) and/or derivative thereof, for use in the reduction of T-cell and/or B-cell proliferation in a subject.

The invention provides a method for the reduction of T-cell and/or B-cell proliferation in a subject, which comprises administering to the subject an effective amount of a compound of formula (I) or a pharmaceutically acceptable salt and/or solvate (e.g. salt) and/or derivative thereof.

The invention also provides the use of a compound of formula (I), or a pharmaceutically acceptable salt and/or solvate thereof (e.g. salt) and/or derivative, in the manufacture of a medicament for the reduction of T-cell and/or B-cell proliferation in a subject.

More suitably, the disease or disorder wherein an inhibitor of CTPS1 is beneficial is a disease or disorder wherein a reduction in T-cell and/or B-cell proliferation would be beneficial.

The term 'treatment' or 'treating' as used herein includes the control, mitigation, reduction, or modulation of the disease state or its symptoms.

The term 'prophylaxis' or 'preventing' is used herein to mean preventing symptoms of a disease or disorder in a subject or preventing recurrence of symptoms of a disease or disorder in an afflicted subject and is not limited to complete prevention of an affliction.

Suitably, the disease or disorder is selected from rejection of transplanted cells and tissues, Graft-related diseases or disorders, allergies and autoimmune diseases.

In one embodiment the disease or disorder is the rejection of transplanted cells and tissues. The subject may have been transplanted with a graft selected from the group consisting of heart, kidney, lung, liver, pancreas, pancreatic islets, brain tissue, stomach, large intestine, small intestine, cornea, skin, trachea, bone, bone marrow (or any other source of hematopoietic precursor cells and stem cells including hematopoietic cells mobilized from bone marrow into peripheral blood or umbilical cord blood cells), muscle, or bladder. The compounds of the invention may be of use in preventing or suppressing an immune response associated with rejection of a donor tissue, cell, graft or organ transplant in a subject.

In a further embodiment the disease or disorder is a Graft-related disease or disorder. Graft-related diseases or disorders include graft versus host disease (GVHD), such as GVHD associated with bone marrow transplantation, and immune disorders resulting from or associated with rejection of organ, tissue, or cell graft transplantation (e.g., tissue or cell allografts or xenografts), including, e.g., grafts of skin, muscle, neurons, islets, organs, parenchymal cells of the liver, etc, and Host-Versus-Graft-Disease (HVGD). The compounds of the invention may be of use in preventing or suppressing acute rejection of such transplant in the recipient and/or for long-term maintenance therapy to prevent rejection of such transplant in the recipient (e.g., inhibiting rejection of insulin-producing islet cell transplant from a donor in the subject recipient suffering from diabetes). Thus the compounds of the invention have utility in preventing Host-Versus-Graft-Disease (HVGD) and Graft-Versus-Host-Disease (GVHD).

A CTPS1 inhibitor may be administered to the subject before, after transplantation and/or during transplantation. In some embodiments, the CTPS1 inhibitor may be administered to the subject on a periodic basis before and/or after transplantation.

In another embodiment, the disease or disorder is an allergy.

In additional embodiments the immune related disease or disorder is an autoimmune disease.

As used herein, an "autoimmune disease" is a disease or disorder directed at a subject's own tissues. Examples of autoimmune diseases include, but are not limited to Addison's Disease, Adult-onset Still's disease, Alopecia Areata, Alzheimer's disease, Anti-neutrophil Cytoplasmic Antibodies (ANCA)-Associated Vasculitis, Ankylosing Spondylitis, Antiphospholipid Syndrome (Hughes' Syndrome), Aplastic Anemia, Arthritis, Asthma, Atherosclerosis, Atherosclerotic plaque, Atopic Dermatitis, Autoimmune Hemolytic Anemia, Autoimmune Hepatitis, Autoimmune Hypophysitis (Lymphocytic Hypophysitis), Autoimmune Inner Ear Disease, Autoimmune Lymphoproliferative Syndrome, Autoimmune Myocarditis, Autoimmune Neutropenia, Autoimmune Oophoritis, Autoimmune Orchitis, Auto-Inflammatory Diseases requiring an immunosuppressive treatment, Azoospermia, Bechet's Disease, Berger's Disease, Bullous Pemphigoid, Cardiomyopathy, Cardiovascular disease, Celiac disease including Refractory Celiac Disease (type I and type II), Chronic Fatigue Immune Dysfunction Syndrome (CFIDS), Chronic Idiopathic Polyneuritis, Chronic Inflammatory Demyelinating Polyneuropathy (CIPD), Chronic Relapsing Polyneuropathy (Guillain-Barré syndrome), Churg-Strauss Syndrome (CSS), Cicatricial Pemphigoid, Cold Agglutinin Disease (CAD), chronic obstructive pulmonary disease (COPD), CREST Syndrome, Cryoglobulin Syndromes, Cutaneous Lupus, Dermatitis Herpetiformis, Dermatomyositis, Eczema, Epidermolysis Bullosa Acquisita, Essential Mixed Cryoglobulinemia, Evan's Syndrome, Exophthalmos, Fibromyalgia, Goodpasture's Syndrome, Grave's disease, Hemophagocytic Lymphohistiocytosis (HLH) (including Type 1 Hemophagocytic Lymphohistiocytosis), Histiocytosis/Histiocytic Disorders, Hashimoto's Thyroiditis, Idiopathic Pulmonary Fibrosis, Idiopathic Thrombocytopenia Purpura (ITP), IgA Nephropathy, Immunoproliferative Diseases or Disorders, Inflammatory Bowel Disease (IBD), Interstitial Lung Disease, Juvenile Arthritis, Juvenile Idiopathic Arthritis (JIA), Kawasaki's Disease, Lambert-Eaton Myasthenic Syndrome, Lichen Planus, Localized Scleroderma, Lupus Nephritis, Meniere's Disease, Microangiopathic Hemoytic Anemia, Microscopic Polyangitis, Miller Fischer Syndrome/Acute Disseminated Encephalomyeloradiculopathy, Mixed Connective Tissue Disease, Multiple Sclerosis (MS), Muscular Rheumatism, Myalgic Encephalomyelitis (ME), Myasthenia Gravis, Ocular Inflammation, Pemphigus *Foliaceus*, Pemphigus Vulgaris, Pernicious Anemia, Polyarteritis Nodosa, Polychondritis, Polyglandular Syndromes (Whitaker's syndrome), Polymyalgia Rheumatica, Polymyositis, Primary Agammaglobulinemia, Primary Biliary Cirrhosis/Autoimmune Cholangiopathy, Primary Glomerulonephritis, Primary Sclerosing Cholangitis, Psoriasis, Psoriatic Arthritis, Pure Red Cell Anemia, Raynaud's Phenomenon, Reiter's Syndrome/Reactive Arthritis, Relapsing Polychondritis, Restenosis, Rheumatic Fever, Rheumatic Disease, Rheumatoid Arthritis, Sarcoidosis, Schmidt's Syndrome, Scleroderma/Systemic Sclerosis, Sjörgen's Syndrome, Stiff-Man Syndrome, The Sweet Syndrome (Febrile Neutrophilic Dermatosis), Systemic Lupus Erythematosus (SLE), Systemic Scleroderma, Takayasu Arteritis, Temporal Arteritis/Giant Cell Arteritis, Thyroiditis, Type 1 diabetes, Type 2 diabetes, Uveitis, Vasculitis, Vitiligo, Wegener's Granulomatosis, and X-linked lymphoproliferative disease.

Of particular interest are diseases and disorders which are mainly driven by T-cell activation and proliferation, including:

diseases and disorders which are not linked to alloreactivity including:
Alopecia areata, atopic dermatitis, eczema, psoriasis, lichen planus, psoriatic arthritis, vitiligo;
Uveitis;
Ankylosing spondylitis, Reiter's syndrome/reactive arthritis;
Aplastic anemia, autoimmune lymphoproliferative syndrome/disorders, hemophagocytic lymphohistiocytosis;
Type 1 diabetes; and
Refractory celiac disease;
Acute rejection of grafted tissues and transplanted organs; acute graft versus host disease (GVHD) after transplantation of bone marrow cells or any other source of allogenic cells including hematopoietic precursors cells and/or stem cells.

Also of interest are diseases and disorders which are driven by both T- and B-cell activation and proliferation, with an important involvement of B-cells, including:

diseases and disorders for which the involvement of pathogenic auto-antibodies is well characterized, including:
Allergy;
Cicatricial pemphigoid, bullous pemphigoid, epidermolysis bullosa acquisita, pemphigus *foliaceus*, pemphigus vulgaris, dermatitis herpetiformis;
ANCA-associated vasculitis and microscopic polyangitis, vasculitis, Wegener's granulomatosis; Churg-Strauss syndrome (CSS), polyarteritis nodosa, cryoglobulin syndromes and essential mixed cryglobulinemia;
Systemic lupus erythematosus (SLE), antiphospholipid syndrome (Hughes' syndrome), cutaneous lupus, lupus nephritis, mixed connective tissue disease;
Thyroiditis, Hashimoto thyroiditis, Grave's disease, exophthalmos;
Autoimmune hemolytic anemia, autoimmune neutropenia, ITP, pernicious anaemia, pure red cell anaemia, micro-angiopathic hemolytic anemia;
Primary glomerulonephritis, Berger's disease, Goodpasture's syndrome, IgA nephropathy; and
Chronic idiopathic polyneuritis, chronic inflammatory demyelinating polyneuropathy (CIPD), chronic relapsing polyneuropathy (Guillain-Barré syndrome), Miller Fischer syndrome, Stiff man syndrome, Lambert-Eaton myasthenic syndrome, myasthenia gravis.

diseases and disorders for which the involvement of B-cells is less clearly characterized (although sometimes illustrated by the efficacy of anti-CD20 monoclonal antibodies or intravenous immunoglobulin infusions) and may not correspond or be limited to the production of pathogenic antibodies (nevertheless, non-pathogenic antibodies are sometimes described or even often present and used as a diagnosis biomarker), including:
Addison's disease, autoimmune oophoritis and azoospermia, polyglandular syndromes (Whitaker's syndrome), Schmidt's syndrome;
Autoimmune myocarditis, cardiomyopathy, Kawasaki's disease;
Rheumatoid arthritis, Sjögren's syndrome, mixed connective tissue disease, polymyositis and dermatomyositis; polychondritis;
Primary glomerulonephritis;
Multiple sclerosis;
Autoimmune hepatitis, primary biliary cirrhosis/autoimmune cholangiopathy,
Hyper acute rejection of transplanted organs;
Chronic rejection of graft or transplants;
Chronic Graft versus Host reaction/disease after transplantation of bone marrow cells or hematopoietic precursor cells.

Additionally of interest are diseases and disorders for which the mechanism is shared between activation/proliferation of T-cells and activation/proliferation of innate immune cells and other inflammatory cellular subpopulations (including myeloid cells such as macrophages or granulocytes) and resident cells (such as fibroblasts and endothelial cells), including:
COPD, idiopathic pulmonary fibrosis, interstitial lung disease, sarcoidosis;
Adult onset Still's disease, juvenile idiopathic arthritis, Systemic sclerosis, CREST syndrome where B cells and pathogen antibodies may also play a role; the Sweet syndrome; Takayasu arteritis, temporal arteritis/giant cell arteritis;
Ulcerative cholangitis, inflammatory bowel disease (IBD) including Crohn's disease and ulcerative colitis, primary sclerosing cholangitis.

Also of interest are diseases and disorders for which the mechanism remains poorly characterized but involves the activation and proliferation of T-cells, including:
Alzheimer's disease, cardiovascular syndrome, type 2 diabetes, restenosis, chronic fatigue immune dysfunction syndrome (CFIDS).
Autoimmune Lymphoproliferative disorders, including:
Autoimmune Lymphoproliferative Syndrome and X-linked lymphoproliferative disease.

Suitably the disease or disorder is selected from: inflammatory skin diseases such as psoriasis or lichen planus;

acute and/or chronic GVHD such as steroid resistant acute GVHD; acute lymphoproliferative syndrome; systemic lupus erythematosus, lupus nephritis or cutaneous lupus; or transplantation. In addition, the disease or disorder may be selected from myasthenia gravis, multiple sclerosis, and scleroderma/systemic sclerosis.

The compounds of formula (I) may be used in the treatment of cancer.

Thus, in one embodiment there is provided a compound of formula (I), or a pharmaceutically acceptable salt and/or solvate thereof and/or derivative thereof, for use in the treatment of cancer.

Further, there is provided a method for treating cancer in a subject, by administering to a subject in need thereof a compound of formula (I) or a pharmaceutically acceptable salt and/or solvate thereof and/or derivative thereof.

Additionally provided is the use of a compound of formula (I), or a pharmaceutically acceptable salt and/or solvate thereof and/or derivative thereof, in the manufacture of a medicament for the treatment of cancer in a subject.

Suitably the cancer is a haematological cancer, such as Acute myeloid leukemia, Angioimmunoblastic T-cell lymphoma, B-cell acute lymphoblastic leukemia, Sweet Syndrome, T-cell Non-Hodgkins lymphoma (including natural killer/T-cell lymphoma, adult T-cell leukaemia/lymphoma, enteropathy type T-cell lymphoma, hepatosplenic T-cell lymphoma and cutaneous T-cell lymphoma), T-cell acute lymphoblastic leukemia, B-cell Non-Hodgkins lymphoma (including Burkitt lymphoma, diffuse large B-cell lymphoma, Follicular lymphoma, Mantle cell lymphoma, Marginal Zone lymphoma), Hairy Cell Leukemia, Hodgkin lymphoma, Lymphoblastic lymphoma, Lymphoplasmacytic lymphoma, Mucosa-associated lymphoid tissue lymphoma, Multiple myeloma, Myelodysplastic syndrome, Plasma cell myeloma, Primary mediastinal large B-cell lymphoma, chronic myeloproliferative disorders (such as chronic myeloid leukemia, primary myelofibrosis, essential thrombocytemia, polycytemia vera) or chronic lymphocytic leukemia.

Alternatively, the cancer is a non-haematological cancer, such as selected from the group consisting of bladder cancer, breast, melanoma, neuroblastoma, malignant pleural mesothelioma, and sarcoma.

In addition, compounds of formula (I) may be used in enhancing recovery from vascular injury or surgery and reducing morbidity and mortality associated with neointima and restenosis in a subject. For example, the compounds of formula (I) may be used in preventing, reducing, or inhibiting neointima formation. A medical device may be treated prior to insertion or implantation with an effective amount of a composition comprising a compound of formula (I) in order to prevent, reduce, or inhibit neointima formation following insertion or implantation of the device or graft into the subject. The device can be a device that is inserted into the subject transiently, or a device that is implanted permanently. In some embodiments, the device is a surgical device.

Examples of medical devices include, but are not limited to, needles, cannulas, catheters, shunts, balloons, and implants such as stents and valves.

Suitably the subject is a mammal, in particular the subject is a human.

Pharmaceutical Compositions For use in therapy the compounds of the invention are usually administered as a pharmaceutical composition. The invention also provides a pharmaceutical composition comprising a compound of formula (I), or a pharmaceutically acceptable salt and/or solvate (e.g. salt) and/or derivative thereof, and a pharmaceutically acceptable carrier or excipient.

In one embodiment, there is provided a pharmaceutical composition comprising a compound of formula (I), or a pharmaceutically acceptable salt and/or solvate (e.g. salt) and/or derivative thereof, for use in the treatment or prophylaxis of a disease or disorder as described herein.

In a further embodiment, there is provided a method for the prophylaxis or treatment of a disease or disorder as described herein, which comprises administering to a subject in need thereof an effective amount of a pharmaceutical composition comprising a compound of formula (I) or a pharmaceutically acceptable salt and/or solvate (e.g. salt) and/or derivative thereof.

The invention also provides the use of a pharmaceutical composition comprising a compound of formula (I), or a pharmaceutically acceptable salt and/or solvate thereof (e.g. salt) and/or derivative thereof, in the manufacture of a medicament for the treatment or prophylaxis of a disease or disorder as described herein.

The compounds of formula (I) or their pharmaceutically acceptable salts and/or solvates and/or derivatives thereof may be administered by any convenient method, e.g. by oral, parenteral, buccal, sublingual, nasal, rectal or transdermal administration, and the pharmaceutical compositions adapted accordingly.

The compounds of formula (I) or their pharmaceutically acceptable salts and/or solvates and/or derivatives thereof may be administered topically, for example to the eye, gut or skin. Thus, in an embodiment there is provided a pharmaceutical composition comprising a compound of the invention optionally in combination with one or more topically acceptable diluents or carriers.

A pharmaceutical composition of the invention may be delivered topically to the skin.

Compositions suitable for transdermal administration include ointments, gels and patches. Such a pharmaceutical composition may also suitably be in the form of a cream, lotion, foam, powder, paste or tincture.

The pharmaceutical composition may suitably include vitamin D3 analogues (e.g. calcipotriol and maxacalcitol), steroids (e.g. fluticasone propionate, betamethasone valerate and clobetasol propionate), retinoids (e.g. tazarotene), coal tar and dithranol. Topical medicaments are often used in combination with each other (e.g. a vitamin D3 and a steroid) or with further agents such as salicylic acid.

A pharmaceutical composition of the invention may be delivered topically to the eye. Such a pharmaceutical composition may suitably be in the form of eye drops or an ointment.

A pharmaceutical composition of the invention may be delivered topically to the gut. Such a pharmaceutical composition may suitably be delivered orally, such as in the form of a tablet or a capsule, or rectally, such as in the form of a suppository.

Suitably, delayed release formulations are in the form of a capsule.

The compounds of formula (I) or their pharmaceutically acceptable salts and/or solvates and/or derivatives thereof which are active when given orally can be formulated as liquids or solids, e.g. as syrups, suspensions, emulsions, tablets, capsules or lozenges.

A liquid formulation will generally consist of a suspension or solution of the active ingredient (such as a compound of formula (I) or a pharmaceutically acceptable salt and/or solvate (e.g. salt) and/or derivative thereof) in a suitable liquid carrier(s) e.g. an aqueous solvent such as water, ethanol or glycerine, or a non-aqueous solvent, such as polyethylene glycol or an oil. The formulation may also contain a suspending agent, preservative, flavouring and/or colouring agent.

A composition in the form of a tablet can be prepared using any suitable pharmaceutical carrier(s) routinely used for preparing solid formulations, such as magnesium stearate, starch, lactose, sucrose and cellulose.

A composition in the form of a capsule can be prepared using routine encapsulation procedures, e.g. pellets containing the active ingredient (such as a compound of formula (I) or a pharmaceutically acceptable salt and/or solvate (e.g. salt) and/or derivative thereof) can be prepared using standard carriers and then filled into a hard gelatin capsule; alternatively a dispersion or suspension can be prepared using any suitable pharmaceutical carrier(s), e.g. aqueous gums, celluloses, silicates or oils and the dispersion or suspension then filled into a soft gelatin capsule.

Typical parenteral compositions consist of a solution or suspension of the active ingredient (such as a compound of formula (I) or a pharmaceutically acceptable salt and/or solvate (e.g. salt) and/or derivative thereof) in a sterile aqueous carrier or parenterally acceptable oil, e.g. polyethylene glycol, polyvinyl pyrrolidone, lecithin, *arachis* oil or sesame oil. Alternatively, the solution can be lyophilised and then reconstituted with a suitable solvent just prior to administration.

Compositions for nasal administration may conveniently be formulated as aerosols, drops, gels and powders. Aerosol formulations typically comprise a solution or fine suspension of the active ingredient in a pharmaceutically acceptable aqueous or non-aqueous solvent and are usually presented in single or multidose quantities in sterile form in a sealed container which can take the form of a cartridge or refill for use with an atomising device. Alternatively the sealed container may be a disposable dispensing device such as a single dose nasal inhaler or an aerosol dispenser fitted with a metering valve. Where the dosage form comprises an aerosol dispenser, it will contain a propellant which can be a compressed gas e.g. air, or an organic propellant such as a fluoro-chloro-hydrocarbon or hydrofluorocarbon. Aerosol dosage forms can also take the form of pump-atomisers.

Compositions suitable for buccal or sublingual administration include tablets, lozenges and pastilles where the active ingredient is formulated with a carrier such as sugar and acacia, tragacanth, or gelatin and glycerin.

Compositions for rectal administration are conveniently in the form of suppositories containing a conventional suppository base such as cocoa butter.

Suitably, the composition is in unit dose form such as a tablet, capsule or ampoule.

The composition may for example contain from 0.1% to 100% by weight, for example from 10 to 60% by weight, of the active material, depending on the method of administration. The composition may contain from 0% to 99% by weight, for example 40% to 90% by weight, of the carrier, depending on the method of administration. The composition may contain from 0.05 mg to 2000 mg, for example from 1.0 mg to 500 mg, of the active material, depending on the method of administration. The composition may contain from 50 mg to 1000 mg, for example from 100 mg to 400 mg of the carrier, depending on the method of administration. The dose of the compound used in the treatment or prophylaxis of the aforementioned disorders will vary in the usual way with the seriousness of the disorders, the weight of the sufferer, and other similar factors. However, as a general guide suitable unit doses may be 0.05 mg to 1000 mg, more suitably 1.0 mg to 500 mg, and such unit doses may be administered more than once a day, for example two or three a day. Such therapy may extend for a number of weeks or months.

The invention provides, in a further aspect, a combination comprising a compound of formula (I) or a pharmaceutically acceptable, salt, solvate and/or derivative thereof (e.g. a combination comprising a compound of formula (I) or a pharmaceutically acceptable derivative thereof) together with a further pharmaceutically acceptable active ingredient or ingredients.

The invention provides a compound of formula (I), for use in combination with a further pharmaceutically acceptable active ingredient or ingredients.

When the compounds are used in combination with other therapeutic agents, the compounds may be administered separately, sequentially or simultaneously by any convenient route.

Optimal combinations may depend on the disease or disorder. Possible combinations include those with one or more active agents selected from the list consisting of: 5-aminosalicylic acid, or a prodrug thereof (such as sulfasalazine, olsalazine or bisalazide); corticosteroids (e.g. prednisolone, methylprednisolone, or budesonide); immunosuppressants (e.g. cyclosporin, tacrolimus, sirolimus, methotrexate, azathioprine mycophenolate mofetil, leflunomide, cyclophosphamide, 6-mercaptopurine or anti-lymphocyte (or thymocyte) globulins); anti-TNF-alpha antibodies (e.g., infliximab, adalimumab, certolizumab pegol or golimumab); anti-IL12/IL23 antibodies (e.g., ustekinumab); anti-IL6 or anti-IL6R antibodies, anti-IL17 antibodies or small molecule IL12/IL23 inhibitors (e.g., apilimod); Anti-alpha-4-beta-7 antibodies (e.g., vedolizumab); MAdCAM-1 blockers (e.g., PF-00547659); antibodies against the cell adhesion molecule alpha-4-integrin (e.g., natalizumab); antibodies against the IL2 receptor alpha subunit (e.g., daclizumab or basiliximab); JAK inhibitors including JAK1 and JAK3 inhibitors (e.g., tofacitinib, baricitinib, R348); Syk inhibitors and prodrugs thereof (e.g., fostamatinib and R-406); Phosphodiesterase-4 inhibitors (e.g., tetomilast); HMPL-004; probiotics; Dersalazine; semapimod/CPSI-2364; and protein kinase C inhibitors (e.g. AEB-071).

For cancer, the further pharmaceutically acceptable active ingredient may be selected from anti-mitotic agents such as vinblastine, paclitaxel and docetaxel; alkylating agents, for example cisplatin, carboplatin, dacarbazine and cyclophosphamide; antimetabolites, for example 5-fluorouracil, cytosine arabinoside and hydroxyurea; intercalating agents for example adriamycin and bleomycin; topoisomerase inhibitors for example etoposide, topotecan and irinotecan; thymidylate synthase inhibitors for example raltitrexed; PI3 kinase inhibitors for example idelalisib; mTor inhibitors for example everolimus and temsirolimus; proteasome inhibitors for example bortezomib; histone deacetylase inhibitors for example panobinostat or vorinostat; and hedgehog pathway blockers such as vismodegib.

The further pharmaceutically acceptable active ingredient may be selected from tyrosine kinase inhibitors such as, for example, axitinib, dasatinib, erlotinib, imatinib, nilotinib, pazopanib and sunitinib.

Anticancer antibodies may be included in a combination therapy and may be selected from the group consisting of olaratumab, daratumumab, necitumumab, dinutuximab, traztuzumab emtansine, pertuzumab, obinutuzumab, brentuximab, ofatumumab, panitumumab, catumaxomab, bevacizumab, cetuximab, tositumomab, traztuzumab, gentuzumab ozogamycin and rituximab.

Compounds or pharmaceutical compositions of the invention may also be used in combination with radiotherapy.

Some of the combinations referred to above may conveniently be presented for use in the form of a pharmaceutical formulation and thus pharmaceutical formulations comprising a combination as defined above together with a pharmaceutically acceptable carrier or excipient comprise a further aspect of the invention. The individual components of such combinations may be administered either sequentially or simultaneously in separate or combined pharmaceutical formulations. The individual components of combinations may also be administered separately, through the same or different routes.

When a compound of formula (I) or a pharmaceutically acceptable derivative thereof is used in combination with a second therapeutic agent active against the same disease state the dose of each compound may differ from that when the compound is used alone. Appropriate doses will be readily appreciated by those skilled in the art.

Medical Devices

In an embodiment, compounds of the invention or pharmaceutical compositions comprising said compounds may be formulated to permit incorporation into the medical device, thus providing application of the compound or composition directly to the site to prevent or treat conditions disclosed herein.

In an embodiment, the compounds of the invention or pharmaceutical composition thereof is formulated by including it within a coating onto the medical device. There are various coatings that can be utilized such as, for example, polymer coatings that can release the compound over a prescribed time period. The compound, or a pharmaceutical composition thereof, can be embedded directly within the medical device. In some embodiments, the compound is coated onto or within the device in a delivery vehicle such as a microparticle or liposome that facilitates its release and delivery. In some embodiments, the compound or pharmaceutical composition is miscible in the coating.

In some embodiments, the medical device is a vascular implant such as a stent. Stents are utilized in medicine to prevent or eliminate vascular restrictions. The implants may be inserted into a restricted vessel whereby the restricted vessel is widened. Excessive growth of the adjacent cells following vascular implantation results in a restriction of the vessel particularly at the ends of the implants which results in reduced effectiveness of the implants. If a vascular implant is inserted into a human artery for the elimination of for example an arteriosclerotic stenosis, intima hyperplasia can occur within a year at the ends of the vascular implant and results in renewed stenosis ("restenosis").

Accordingly, in some embodiments, the stents are coated or loaded with a composition including a compound of the invention or pharmaceutical composition thereof and optionally a targeting signal, a delivery vehicle, or a combination thereof. Many stents are commercially available or otherwise know in the art.

In some embodiments, the stent is a drug-eluting stent. Various drug eluting stents that simultaneously deliver a therapeutic substance to the treatment site while providing artificial radial support to the wall tissue are known in the art. Endoluminal devices including stents are sometimes coated on their outer surfaces with a substance such as a drug releasing agent, growth factor, or the like. Stents have also been developed having a hollow tubular structure with holes or ports cut through the sidewall to allow drug elution from a central lumen. Although the hollow nature of the stent allows the central lumen to be loaded with a drug solution that is delivered via the ports or holes in the sidewall of the stent, the hollow tubular structure may not have suitable mechanical strength to provide adequate scaffolding in the vessel.

In some embodiments, the devices are also coated or impregnated with a compound of the invention, or pharmaceutical composition thereof and one or more additional therapeutic agents, including, but not limited to, antiplatelet agents, anticoagulant agents, anti-inflammatory agents, antimicrobial agents, antimetabolic agents, additional antineointima agents, additional antiproliferative agents, immunomodulators, antiproliferative agents, agents that affect migration and extracellular matrix production, agents that affect platelet deposition or formation of thrombis, and agents that promote vascular healing and re-endothelialization, such as those and others described in Sousa et aL. (2003) and Salu et aL. (2004).

Examples of antithrombin agents include, but are not limited to, Heparin (including low molecular heparin), R-Hirudin, Hirulog, Argatroban, Efegatran, Tick anticoagulant peptide, and Ppack.

Examples of antiproliferative agents include, but are not limited to, Paclitaxel (Taxol), QP-2 Vincristin, Methotrexat, Angiopeptin, Mitomycin, BCP 678, Antisense c-myc, ABT 578, Actinomycin-D, RestenASE, 1-Chlor-deoxyadenosin, PCNA Ribozym, and Celecoxib.

Examples of anti-restenosis agents include, but are not limited to, immunomodulators such as Sirolimus (Rapamycin), Tacrolimus, Biorest, Mizoribin, Cyclosporin, Interferon-γ Ib, Leflunomid, Tranilast, Corticosteroide, Mycophenolic acid and Biphosphonate.

Examples of anti-migratory agents and extracellular matrix modulators include, but are not limited to Halofuginone, Propyl-hydroxylase-Inhibitors, C-Proteinase-Inhibitors, MMP-Inhibitors, Batimastat, Probucol.

Examples of antiplatelet agents include, but are not limited to, heparin.

Examples of wound healing agents and endothelialization promoters include vascular epithelial growth factor ("VEGF"), 17-Estradiol, Tkase-Inhibitors, BCP 671, Statins, nitric oxide ("NO")-Donors, and endothelial progenitor cell ("EPC")-antibodies.

Besides coronary applications, drugs and active agents may be incorporated into the stent or stent coating for other indications. For example, in urological applications, antibiotic agents may be incorporated into the stent or stent coating for the prevention of infection. In gastroenterological and urological applications, active agents may be incorporated into the stent or stent coating for the local treatment of carcinoma. It may also be advantageous to incorporate in or on the stent a contrast agent, radiopaque markers, or other additives to allow the stent to be imaged in vivo for tracking, positioning, and other purposes. Such additives could be added to the absorbable composition used to make the stent or stent coating, or absorbed into, melted onto, or sprayed onto the surface of part or all of the stent. Preferred additives for this purpose include silver, iodine and iodine labelled compounds, barium sulfate, gadolinium oxide, bismuth derivatives, zirconium dioxide, cadmium, tungsten, gold tantalum, bismuth, platinum, iridium, and rhodium. These additives may be, but are not limited to, micro- or nano-sized particles or nano particles. Radio-opacity may be determined by fluoroscopy or by x-ray analysis.

A compound of the invention and one or more additional agents, or pharmaceutical composition thereof, can be incorporated into the stent, either by loading the compound and one or more additional agents, or pharmaceutical composition thereof into the absorbable material prior to processing, and/or coating the surface of the stent with the agent(s). The rate of release of agent may be controlled by a number of methods including varying the following: the ratio of the absorbable material to the compound and one or more additional agents, or pharmaceutical composition, the molecular weight of the absorbable material, the composition of the compound and one or more additional agents, or pharmaceutical composition, the composition of the absorbable polymer, the coating thickness, the number of coating layers and their relative thicknesses, and/or the compound and one or more additional agents, or pharmaceutical composition concentration. Top coats of polymers and other materials, including absorbable polymers, may also be applied to active agent coatings to control the rate of release. For example, P4HB can be applied as a top coat on a metallic stent coated with P4HB including an active agent to retard the release of the active agent.

The invention is further exemplified by the following non-limiting examples.

EXAMPLES

Abbreviations used herein are defined below. Any abbreviations not defined are intended to convey their generally accepted meaning.

Abbreviations
Ac acetyl (C(O)CH$_3$)
AcOH glacial acetic acid
AlMe$_3$ trimethylaluminium
aq aqueous
Ar Aromatic ring
BEH ethylene bridged hybrid
Bis(pinacolato)diboron; 4,4,4',4',5,5,5',5'-Octamethyl-2,2'-bi-1,3,2-dioxaborolane
Bz benzyl (CH$_2$-phenyl)
Boc tert-butyloxycarbonyl protecting group
Cs$_2$CO$_3$ Cesium carbonate
CSH charged surface hybrid
d doublet
DABAL-Me$_3$ adduct of trimethylaluminum and 1,4-diazabicyclo[2.2.2]octane
DCM dichloromethane
DIPEA N,N-diisopropylethylamine
dioxane 1,4-dioxane
DMAP 4-dimethylaminopyridine
DME dimethoxyethane
DMF N,N-dimethylformamide
DMSO dimethyl sulfoxide
DMP Dess-Martin Periodinane
DPPA diphenylphosphoryl azide
dppf 1,1'-bis(diphenylphosphino)ferrocene
(ES$^+$) electrospray ionisation, positive mode
(ES$^-$) electrospray ionisation, negative mode
ESI electrospray ionisation
Et ethyl
EtI Ethyl iodide
EtOAc ethyl acetate
EtOH ethanol
g grams
Hal halogen
HATU 1-[bis(dimethylamino)methylene]-1H-1,2,3-triazolo[4,5-b]pyridinium 3-oxid hexafluorophosphate
HPLC high performance liquid chromatography
hr(s) hour(s)
IC$_{50}$ 50% inhibitory concentration
Pr iso-propyl
iPrMgCl iso-propyl magnesium chloride
K$_2$CO$_3$ potassium carbonate
LCMS liquid chromatography-mass spectrometry
LiHMDS lithium hexamethyldisilazide
LiOH lithium hydroxide
(M+H)$^+$ protonated molecular ion
(M−H)$^-$ unprotonated molecular ion
M molar concentration
mCPBA Meta-chloroperoxybenzoic acid
mL milliliter
mm millimeter
mmol millimole
Me methyl
MeCN acetonitrile
MeI iodomethane
MeOH methanol
MesCl methanesulfonyl chloride
MHz megahertz
min(s) minute(s)
MSD mass selective detector
m/z mass-to-charge ratio
N$_2$ nitrogen gas
NH$_3$ ammonia
NH$_4$Cl ammonium chloride
NaH sodium hydride
NaHCO$_3$ sodium bicarbonate
NaBH(OAc)$_3$ Sodium triacetoxyborohydride
nm nanometer
NMR nuclear magnetic resonance (spectroscopy)
NSFI N-fluorobenzenesulfonimide
P4HB poly-4-hydroxybutyrate
PDA photodiode array
Pd 170 chloro(crotyl)(2-dicyclohexylphosphino-2',4',6'-triisopropybiphenyl)palladium(II) or XPhos Pd(crotyl) Cl
Pd 174 allyl(2-di-tert-butylphosphino-2',4',6'-triisopropyl-1,1'-biphenyl)palladium(II) triflate or [tBuXPhos-Pd(allyl)]OTf
[Pd(allyl)Cl$_2$]$_2$ bis(allyl)dichlorodipalladium
PdCl$_2$(dppf) [1,1'-bis(diphenylphosphino)ferrocene]dichloropalladium(II)
Pd(PPh$_3$)$_4$ tetrakis(triphenylphosphine)palladium(0)
PMB 4-methoxybenzyl
prep HPLC preparative high performance liquid chromatography
Ph phenyl
pos/neg positive/negative
q quartet
RF/MS RapidFire Mass Spectrometry
RT room temperature
Rt retention time
RP reverse phase
s singlet
S$_N$Ar nucleophilic aromatic substitution
sat saturated
SCX solid supported cation exchange (resin)
Selectfluor N-chloromethyl-N'-fluorotriethylenediammonium bis(tetrafluoroborate)
t triplet
tBu tert-butyl
T3P 2,4,6-tripropyl-1,3,5,2,4,6-trioxatriphosphorinane-2,4,6-trioxide
TBME tert-butyl methyl ether
TEA Triethylamine
TFA Trifluoroacetic acid

[t-BuXPhos allyl(2-di-tert-butylphosphino-2',4',6'-triisopropyl-1,1'-Pd(allyl)]OTf biphenyl)palladium(II) triflate
THF tetrahydrofuran
TMP 2,2,6,6-tetramethylpiperidinyl
TMSOK potassium trimethylsilanolate
TTIP titanium tetraisopropoxide
UPLC ultra performance liquid chromatography
UV ultraviolet
v/v volume/volume
VWD variable wave detector
wt weight
um micrometer
uL microliter
° C. degrees Celsius General Procedures All starting materials and solvents were obtained either from commercial sources or prepared according to the literature. Unless otherwise stated all reactions were stirred. Organic solutions were routinely dried over anhydrous magnesium sulfate. Hydrogenations were performed on a Thales H-cube flow reactor under the conditions stated.

Column chromatography was performed on pre-packed silica (230-400 mesh, 40-63 um) cartridges using the amount indicated. SCX was purchased from Supelco and treated with 1M hydrochloric acid prior to use. Unless stated otherwise the reaction mixture to be purified was first diluted with MeOH and made acidic with a few drops of AcOH. This solution was loaded directly onto the SCX and washed with MeOH. The desired material was then eluted by washing with 0.7 M $NH_3$ in MeOH.

Preparative Reverse Phase High Performance Liquid Chromatography
Prep HPLC
Acidic Prep Waters X-Select CSH column C18, 5 um (19×50 mm), flow rate 28 mL min$^{-1}$ eluting with a $H_2O$-MeCN gradient containing 0.1% v/v formic acid over 6.5 min using UV detection at 254 nm.

Basic Prep

Waters X-Bridge Prep column C18, 5 um (19×50 mm), flow rate 28 mL min$^{-1}$ eluting with a 10 mM $NH_4HCO_3$-MeCN gradient over 6.5 min using UV detection at 254 nm.

Analytical Methods
Reverse Phase HPLC Conditions for the LCMS Analytical Methods
HPLC Acidic: Acidic LCMS 4 Minute (5-95%)

Analytical LCMS was carried out using a Waters X-Select CSH C18, 2.5 um, 4.6×30 mm column eluting with a gradient of 0.1% Formic acid in MeCN in 0.1% Formic acid in water. The gradient from 5-95% 0.1% Formic acid in MeCN occurs between 0.00-3.00 minutes at 2.5 mL/min with a flush from 3.01-3.5 minutes at 4.5 mL/min. A column re-equilibration to 5% MeCN is from 3.60-4.00 minutes at 2.5 mL/min. UV spectra of the eluted peaks were measured using an Agilent 1260 Infinity VWD at 254 nm. Mass spectra were measured using an Agilent 6120 MSD running with positive/negative switching.

HPLC Basic: Basic LCMS 4 Minute (5-95%)

Analytical LCMS was carried out using a Waters X-Select BEH C18, 2.5 um, 4.6×30 mm column eluting with a gradient of MeCN in aqueous 10 mM ammonium bicarbonate. The gradient from 5-95% MeCN occurs between 0.00-3.00 minutes at 2.5 mL/min with a flush from 3.01-3.5 minutes at 4.5 mL/min. A column re-equilibration to 5% MeCN is from 3.60-4.00 minutes at 2.5 mL/min. UV spectra of the eluted peaks were measured using an Agilent 1260 Infinity VWD at 254 nm. Mass spectra were measured using an Agilent 6120 MSD running with positive/negative switching.

Reverse Phase HPLC Conditions for the UPLC Analytical Methods
UPLC Acidic: Acidic UPLC 3 Minute Analytical UPLC/MS was carried out using a Waters Acquity CSH C18, 1.7 um, 2.1×30 mm column eluting with a gradient of 0.1% Formic acid in MeCN in 0.1% Formic acid in water. The gradient is structured with a starting point of 5% MeCN held from 0.0-0.11 minutes. The gradient from 5-95% occurs between 0.11-2.15 minutes with a flush from 2.15-2.56 minutes. A column re-equilibration to 5% MeCN is from 2.56-2.83 minutes. UV spectra of the eluted peaks were measured using an Acquity PDA and mass spectra were recorded using an Acquity QDa detector with ESI pos/neg switching.

Acidic UPLC 2 Acidic UPLC 1 Minute

Analytical UPLC/MS was carried out using a Waters Acquity CSH C18, 1.7 um, 2.1×30 mm column eluting with a gradient of 0.1% Formic acid in MeCN in 0.1% Formic acid in water. The gradient is structured with a starting point of 5% MeCN held from 0.0-0.08 minutes. The gradient from 5-95% occurs between 0.08-0.70 minutes with a flush from 0.7-0.8 minutes. A column re-equilibration to 5% MeCN is from 0.8-0.9 minutes. UV spectra of the eluted peaks were measured using an Acquity PDA and mass spectra were recorded using an Acquity QDa detector with ESI pos/neg switching.

UPLC Basic: Basic UPLC 3 Minute

Analytical UPLC/MS was carried out using a Waters Acquity BEH C18, 1.7 um, 2.1×30 mm column eluting with a gradient of MeCN in aqueous 10 mM Ammonium Bicarbonate. The gradient is structured with a starting point of 5% MeCN held from 0.0-0.11 minutes. The gradient from 5-95% occurs between 0.11-2.15 minutes with a flush from 2.15-2.56 minutes. A column re-equilibration to 5% MeCN is from 2.56-2.83 minutes. UV spectra of the eluted peaks were measured using an Acquity PDA and mass spectra were recorded using an Acquity QDa detector with ESI pos/neg switching.

Basic UPLC 2 Basic UPLC 1 Minute

Analytical UPLC/MS was carried out using a Waters Acquity BEH C18, 1.7 um, 2.1×30 mm column eluting with a gradient of MeCN in aqueous 10 mM Ammonium Bicarbonate. The gradient is structured with a starting point of 5% MeCN held from 0.0-0.08 minutes. The gradient from 5-95% occurs between 0.08-0.70 minutes with a flush from 0.7-0.8 minutes. A column re-equilibration to 5% MeCN is from 0.8-0.9 minutes. UV spectra of the eluted peaks were measured using an Acquity PDA and mass spectra were recorded using an Acquity QDa detector with ESI pos/neg switching.

Column temperature is 40° C. in all runs. Injection volume is 3 uL and the flow rate is 0.77 mL/min. PDA scan from 210-400 nm on all runs.

$^1$H NMR Spectroscopy $^1$H NMR spectra were acquired on a Bruker Avance III spectrometer at 400 MHz or Bruker Avance III HD spectrometer at 500 MHz using residual undeuterated solvent as reference and unless specified otherwise were run in DMSO-d6.

Preparation of Intermediates

Known synthetic intermediates were procured from commercial sources or were obtained using published literature procedures. Additional intermediates were prepared by the representative synthetic processes described herein.

Any one of Methods 1, 2 or 11 (referred to later herein) or B, C, E, F, J, P, Q or R may be used in the synthesis of the compounds of formula (I). For example, a scheme which is shown using a compound wherein X=N, Y=CH and Z=CH may also be used in the synthesis of compounds wherein X, Y and Z are as defined in the claims.

Preparation of Bi-Ester Intermediates 1-(tert-Butyl) 3-methyl 2-(2-chloropyrimidin-4-yl) malonate INTC1

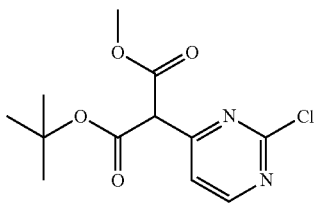 [SMILES: COC(=O)C(C(=O)OC(C)(C)C)c1ccnc(Cl)n1]

NaH (60 wt % in mineral oil, 5.10 g, 128 mmol) was added portionwise to an ice-cooled, stirred solution of tert-butyl methyl malonate (20.5 mL, 121 mmol) in THF (160 mL). The reaction was stirred at 0° C. for 20 mins then at RT for 60 mins until evolution of hydrogen ceased. 2,4-Dichloropyrimidine (10 g, 67.1 mmol) was then added and the resulting mixture was stirred at 70° C. for 3 hrs. The reaction was allowed to cool, partitioned between NH$_4$Cl (sat. aq, 500 mL) and EtOAc (500 mL), the two phases were separated and the organic layer was passed through a phase separator. The crude product was purified by chromatography on silica gel (220 g column, 0-30% EtOAc/iso-hexane) to afford 1-tert-butyl 3-methyl 2-(2-chloropyrimidin-4-yl) malonate (13.1 g, 44.3 mmol, 66% yield) as a clear pale yellow oil; Rt 2.09 mins (H PLC acidic); m/z 230 (M+H-tBu)+(ES$^+$) and 287 (M+H)+(ES$^+$); $^1$H NMR (400 MHz, DMSO-d6) δ 8.83 (d, J=5.1 Hz, 1H), 7.65 (d, J=5.1 Hz, 1H), 5.21 (s, 1H), 3.73 (s, 3H), 1.42 (s, 9H).

Decarboxylation of Chloro-Pyrimidines

Methyl 2-(2-chloropyrimidin-4-yl)acetate INTC4

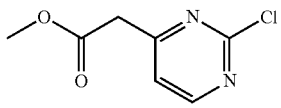

TFA (55.3 mL, 717 mmol) was added dropwise to an ice-cooled, stirred solution of 1-tert-butyl 3-methyl 2-(2-chloropyrimidin-4-yl)malonate INTC1 (12.1 g, 42.2 mmol) in DCM (50 mL). The reaction was stirred at 25° C. for 1 hr and then concentrated in vacuo. The residue was dissolved in EtOAc (200 mL), and basified with NaHCO$_3$ (200 mL), the organic layer was isolated and passed through a phase separator, the solvent was removed in vacuo. The crude product was purified by chromatography on silica gel (220 g cartridge, 0-50% EtOAc/iso-hexane) to afford methyl 2-(2-chloropyrimidin-4-yl)acetate (7.12 g, 37.8 mmol, 90% yield) as a pale yellow oil. Rt 1.16 mins (HPLC acidic); m/z 187 (M+H)+(ES$^+$); 1H NMR (500 MHz, DMSO-d6) δ 8.76 (d, J=5.0 Hz, 1H), 7.60 (d, J=5.0 Hz, 1H), 3.96 (s, 2H), 3.66 (s, 3H).

Method B: Alkylation

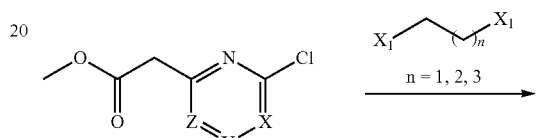

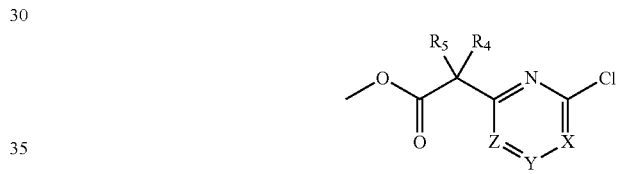

Base (2.5-5 eq) was added to an ice-cooled, stirred mixture of methyl 2-(2-chloropyrimidin-4-yl)acetate (1 eq) in appropriate polar aprotic solvent such as DMF or acetone (10 volumes). After 20 min, alkyl halide (1-5 eq) was added. The reaction vessel was stirred at 0° C. for 30 mins then at RT for 2 hrs. The reaction was quenched with NH$_4$Cl (aq) or 1M HCl (aq), stirred for 20 mins then extracted with EtOAc. The organic phases were dried (phase separator) and concentrated.

The crude product was purified by normal phase chromatography.

TABLE 1

The following intermediates were made according to Method B.

| INTC | Name/Structure (All examples containing chiral centres are racemates unless stated) | Synthesis Method, [LCMS Method], m/z (M + H)$^+$, (Rt/min) | $^1$H NMR Chemical Shift Data (DMSO-d6 unless stated) | Base, RX, solvent |
|---|---|---|---|---|
| INTC13 | methyl 1-(2-chloropyrimidin-4-yl)cyclopropane-1-carboxylate | Method B using INTC4, [UPLC acidic], 213, (1.05). | 8.78-8.62 (m, 1H), 7.94-7.81 (m, 1H), 3.68 (s, 3H), 1.70-1.56 (m, 4H). | NaOH, BrCH$_2$CH$_2$Br DMF |

Heterocycle Formation Via Alkylation

Methyl 4-(2-chloropyrimidin-4-yl)tetrahydro-2H-pyran-4-carboxylate INTC52

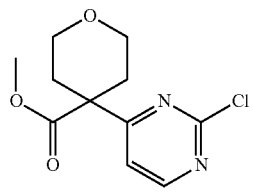 [SMILES: COC(=O)C1(c2ccnc(Cl)n2)CCOCC1]

To a solution of methyl 2-(2-chloropyrimidin-4-yl)acetate INTC4 (2.0 g, 10.7 mmol) in DMF (10 mL, 10.7 mmol) at 0° C. was added NaOH (0.986 g, 24.6 mmol). The reaction mixture was stirred at 0° C. for 20 mins then 1-bromo-2-(2-bromoethoxy)ethane (1.8 mL, 12.9 mmol) was added. The reaction was stirred at RT for 23 hrs. The reaction mixture was acidified using 1M HCl (aq, 53.6 mL, 53.6 mmol) before extracting with DCM (70 mL). The phases were separated using a phase separator cartridge and the aqueous was extracted with further DCM (2×50 mL). The combined organics were concentrated in vacuo. The crude product was purified by chromatography on silica gel (80 g column, 0-50% EtOAc/iso-hexane) to afford methyl 4-(2-chloropyrimidin-4-yl)tetrahydro-2H-pyran-4-carboxylate (1.83 g, 5.57 mmol, 52% yield) as a yellow oil. Rt 1.56 min (HPLC, acidic); m/z 257 ($^{35}$Cl M+H)+(ES+); $^1$H NMR (500 MHz, DMSO-d6) δ8.80 (d, J=5.3 Hz, 1H), 7.69 (d, J=5.3 Hz, 1H), 3.72-3.67 (m, 2H), 3.66 (s, 3H), 3.55-3.50 (m, 2H), 2.33-2.22 (m, 2H), 2.16-2.06 (m, 2H).

Heterocycle Formation Via Enolate S$_N$AR 1-tert-Butyl 4-methyl 4-(2-chloropyrimidin-4-yl)piperidine-1,4-dicarboxylate INTC66

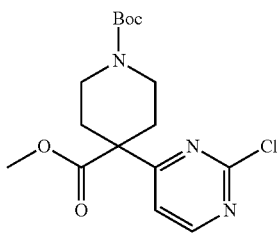 [SMILES: COC(=O)C1(c2ccnc(Cl)n2)CCN(C(=O)OC(C)(C)C)CC1]

LiHMDS (1.61 mL, 1.61 mmol) was added in one portion to an ice-cooled, stirred solution of 1-tert-butyl 4-methyl piperidine-1,4-dicarboxylate (340 mg, 1.40 mmol) and 2,4-dichloropyrimidine (200 mg, 1.34 mmol) in THF (10 mL). The reaction mixture was allowed to warm up to RT and stirred for 2 hrs. The reaction was quenched by addition of NaH$_2$PO$_4$ (aq, 1M, 3 mL). The product was extracted with DCM (2×10 mL). The combined organic extracts were dried via a hydrophobic phase separator and concentrated in vacuo. The crude product was purified by chromatography on silica gel (24 g column, 0-50% EtOAc/iso-hexane) to afford 1-tert-butyl 4-methyl 4-(2-chloropyrimidin-4-yl)piperidine-1,4-dicarboxylate (315 mg, 0.66 mmol, 49% yield) as a colourless oil. Rt 2.29 min (HPLC, acidic); m/z 255 ($^{35}$Cl M-Boc+H)+ (ES+); $^1$H NMR (500 MHz, DMSO-d6) δ 8.79 (d, J=5.3 Hz, 1H), 7.68 (d, J=5.3 Hz, 1H), 3.69-3.59 (m, 5H), 3.13 (s, 2H), 2.26-2.22 (m, 2H), 2.06-2.00 (m, 2H), 1.40 (s, 9H).

Method C: Formation of Sulfonamides from Aromatic Halides

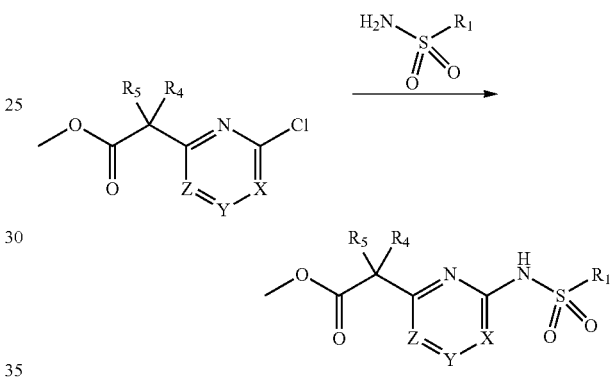

2-Chloropyrimidine intermediate (1 eq), sulfonamide (1.2 eq) and base (2 eq) were dissolved in dioxane (40 volumes). The mixture was degassed (N$_2$, 5 mins) then catalyst (5 mol %) was added, as required. The resulting mixture was heated under nitrogen at 90° C. for 2 hrs. The mixture was filtered, washing with EtOAc or DCM and the resulting filtrate was concentrated.

The crude product was purified by normal phase chromatography or trituration using a suitable solvent.

TABLE 2

The following intermediates were made according to Method C.

| INTC | Name/Structure (All examples containing chiral centres are racemates unless stated) | Synthesis Method, [LCMS Method], m/z (M + H)+, (Rt/min) | $^1$H NMR Chemical Shift Data (DMSO-d6 unless stated) | Catalyst, Base, Solvent |
|---|---|---|---|---|
| INTC28 | methyl 1-(2-(cyclopropanesulfonamido)pyrimidin-4-yl)cyclopropane-1-carboxylate | Method C using INTC13, [UPLC acidic], 298 (0.93). | 11.19 (s, 1H), 8.57-8.43 (m, 1H), 7.52-7.32 (m, 1H), 3.67 (s, 3H), 3.20-3.08 (m, 1H), 1.68-1.52 (m, 4H), 1.15-0.98 (m, 4H). | Pd 174, Cs$_2$CO$_3$, dioxane |

TABLE 2-continued

The following intermediates were made according to Method C.

| INTC | Name/Structure (All examples containing chiral centres are racemates unless stated) | Synthesis Method, [LCMS Method], m/z (M + H)+, (Rt/min) | $^1$H NMR Chemical Shift Data (DMSO-d6 unless stated) | Catalyst, Base, Solvent |
|---|---|---|---|---|
| INTC53 | methyl 4-(2-(cyclopropanesulfonamido)pyrimidin-4-yl)tetrahydro-2H-pyran-4-carboxylate | Method C using INTC52, [UPLC acidic], 342 (0.88). | 11.30 (s, 1H), 8.61 (d, J = 5.3 Hz, 1H), 7.20 (d, J = 5.3 Hz, 1H), 3.79-3.71 (m, 2H), 3.67 (s, 3H), 3.52-3.48 (m, 2H), 3.25-3.15 (m, 1H), 2.24-2.21 (m, 2H), 2.13-2.03 (m, 2H), 1.08-1.01 (m, 2H), 0.91-0.87 (m, 2H). | Pd 174, Cs$_2$CO$_3$, dioxane |
| INTC219 | methyl 4-(2-(methylsulfonamido)pyrimidin-4-yl)tetrahydro-2H-pyran-4-carboxylate | Method C using INTC52, [UPLC acidic], 316 (1.20). | 11.37 (s, 1H), 8.61 (d, J = 5.3 Hz, 1H), 7.21 (d, J = 5.3 Hz, 1H), 3.79-3.71 (m, 2H), 3.67 (s, 3H), 3.52-3.45 (m, 2H), 3.36- (s, 3H), 2.27-2.19 (m, 2H), 2.12-2.03 (m, 2H). | Cs$_2$CO$_3$, NMP |
| INTC220 | methyl 1-(2-(cyclopropanesulfonamido)pyrimidin-4-yl)cyclohexane-1-carboxylate | Method C using INTC180, [HPLC acidic], 340 (1.99). | 11.24 (s, 1H), 8.57 (d, J = 5.3 Hz, 1H), 7.16 (d, J = 5.3 Hz, 1H), 3.64 (s, 3H), 3.27-3.19 (m, 1H), 2.25-2.15 (m, 3H), 1.94-1.76 (m, 3H), 1.66-1.50 (m, 2H), 1.48-1.23 (m, 2H), 1.14-1.08 (m, 2H), 1.08-1.02 (m, 2H). | Cs$_2$CO$_3$, NMP |
| INTC221 | methyl 1-(2-(methylsulfonamido)pyrimidin-4-yl)cyclohexane-1-carboxylate | Method C using INTC180, [UPLC acidic], 314 (1.14). | 11.29 (s, 1H), 8.58 (d, J = 5.3 Hz, 1H), 7.17 (d, J = 5.3 Hz, 1H), 3.64 (s, 3H), 3.36 (s, 3H), 2.25-2.19 (m, 2H), 1.88-1.80 (m, 2H), 1.65-1.54 (m, 3H), 1.45-1.26 (m, 3H). | Cs$_2$CO$_3$, NMP |
| INTC222 | ethyl 1-(6-(cyclopropanesulfonamido)pyrazin-2-yl)cyclohexane-1-carboxylate | Method C using INTC181, [HPLC acidic], 354 (2.15). | No data collected. | Cs$_2$CO$_3$, NMP |

TABLE 2-continued

The following intermediates were made according to Method C.

| INTC | Name/Structure (All examples containing chiral centres are racemates unless stated) | Synthesis Method, [LCMS Method], m/z (M + H)+ (Rt/min) | $^1$H NMR Chemical Shift Data (DMSO-d6 unless stated) | Catalyst, Base, Solvent |
|---|---|---|---|---|
| INTC77 | 1-tert-butyl 4-methyl 4-(2-(cyclopropanesulfonamido)pyrimidin-4-yl)piperidine-1,4-dicarboxylate 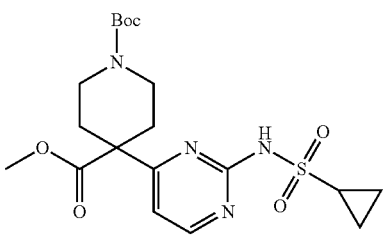 | Method C using INTC66, [HPLC acidic], 385 (M − tBu + H) (2.08). | 11.30 (s, 1H), 8.59 (d, J = 5.3 Hz, 1H), 7.19 (d, J = 5.3 Hz, 1H), 3.74-3.67 (m, 1H), 3.67 (s, 3H), 3.24-3.15 (m, 1H), 2.53-2.48 (m, 2H), 2.26-2.19 (m, 3H), 2.03-1.92 (m, 2H), 1.40 (s, 9H), 1.15-1.08 (m, 2H), 1.08-1.00 (m, 2H). | Pd 174, Cs$_2$CO$_3$, dioxane |

Tetrahydropyran-Derivative Via Thioether

Methyl 4-(2-(methylthio)pyrimidin-4-yl)tetrahydro-2H-pyran-4-carboxylate INTC178

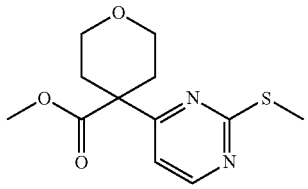

To a solution of 4-chloro-2-(methylthio)pyrimidine (0.55 g, 3.42 mmol) and methyl tetrahydro-2H-pyran-4-carboxylate (494 mg, 3.42 mmol) in THF (5 mL) at 30° C. was added LiHMDS (1 M in THF) (4.11 mL, 4.11 mmol) dropwise. The reaction mixture was stirred at 30° C. for 5 min then was poured into water (100 mL) and extracted with EtOAc (2×200 mL). The organic extract was washed with brine (1×100 mL), dried (MgSO$_4$), filtered and solvent removed in vacuo to afford methyl 4-(2-(methylthio)pyrimidin-4-yl)tetrahydro-2H-pyran-4-carboxylate (915 mg, 3.24 mmol, 95% yield) as a pale yellow oil. Rt 1.74 min (HPLC acidic); m/z 269 (M+H)+ (ES+); $^1$H NMR (500 MHz, DMSO-d6) δ 8.62 (d, J=5.3 Hz, 1H), 7.27 (d, J=5.3 Hz, 1H), 3.76-3.70 (m, 2H), 3.67 (s, 3H), 3.54-3.46 (m, 2H), 2.49 (s, 3H), 2.27-2.20 (m, 2H), 2.14-2.04 (m, 2H).

Methyl 4-(2-(methylsulfonyl)pyrimidin-4-yl)tetrahydro-2H-pyran-4-carboxylate INTC179

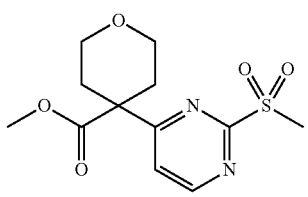

mCPBA (1.60 g, 7.13 mmol) was added portionwise into a stirring solution of methyl 4-(2-(methylthio)pyrimidin-4-yl)tetrahydro-2H-pyran-4-carboxylate INTC178 (915 mg, 3.24 mmol) in DCM (50 mL) and the resulting reaction mixture was stirred at RT for 3 hrs. The reaction mixture was poured into sat. NaHCO$_3$ (aq, 200 mL) and extracted with DCM (3×100 mL). The organic extract was sequentially washed with sat. NaHCO$_3$ (aq, 100 mL) and brine (100 mL), dried (MgSO$_4$), filtered and solvent removed in vacuo to afford methyl 4-(2-(methylsulfonyl)pyrimidin-4-yl)tetrahydro-2H-pyran-4-carboxylate (1.10 g, 3.30 mmol, quant. yield) as thick gum. Rt 1.20 min (HPLC acidic); m/z 301 (M+H)+ (ES+); $^1$H NMR (500 MHz, DMSO-d6) δ 9.09 (d, J=5.3 Hz, 1H), 7.95 (d, J=5.3 Hz, 1H), 3.77-3.70 (m, 2H), 3.68 (s, 3H), 3.60-3.49 (m, 2H), 3.42 (s, 3H), 2.34-2.24 (m, 2H), 2.23-2.13 (m, 2H).

Methyl 4-(2-(cyclopropanesulfonamido)pyrimidin-4-yl)tetrahydro-2H-pyran-4-carboxylate INTC53

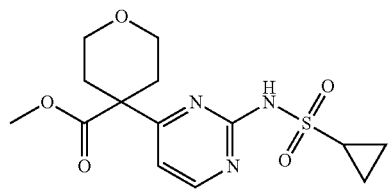 [SMILES: COC(=O)C1(c2ccnc(NS(=O)(=O)C3CC3)n2)CCOCC1]

To a solution of methyl 4-(2-(methylsulfonyl)pyrimidin-4-yl)tetrahydro-2H-pyran-4-carboxylate INTC179 (1.0 g, 3.33 mmol) and cyclopropanesulfonamide (0.52 g, 4.33 mmol) in NMP (100 mL) was added cesium carbonate (3.25 g, 9.99 mmol) and heated to 90° C. for 1 hr. The reaction mixture was cooled to RT and diluted with water (100 mL) and the mixture was washed with MTBE (2×100 mL) and the aqueous was slowly acidified to pH 3 using dilute HCl (20 mL). The resulting precipitate was filtered to afford methyl 4-(2-(cyclopropanesulfonamido)pyrimidin-4-yl)tetrahydro-2H-pyran-4-carboxylate (755 mg, 2.21 mmol, 66% yield) as a colourless solid. Rt. 0.88 (UPLC, acidic), m/z 342 (M+H)+ (ES+); $^1$H NMR (500 MHz, DMSO-d6) δ 11.30 (s, 1H), 8.60 (d, J=5.3 Hz, 1H), 7.20 (d, J=5.3 Hz, 1H), 3.79-3.72 (m, 2H), 3.67 (s, 3H), 3.52-3.44 (m, 2H), 3.25-3.14 (m, 1H), 2.30-2.17 (m, 2H), 2.12-2.04 (m, 2H), 1.14-1.01 (m, 4H).

Method J: Hydrolysis

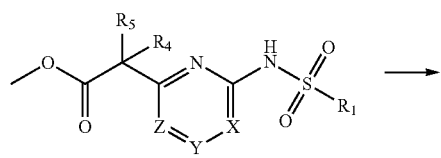

2M LiOH (aq, 2 eq) was added into a solution of ester (1 eq) in MeOH (3 volumes) and THF (3 volumes) and the resulting reaction mixture was stirred at 50° C. for 2 hrs. The solvent was removed under reduced pressure and then was acidified with 1M HCl (aq) until pH 3. The solution was extracted with EtOAc, the organic phase was passed through a phase separator and the solvent was removed. The compound was used crude or purified by reverse phase chromatography.

Alkylation

Methyl 1-(2-chloropyrimidin-4-yl)cyclopropanecarboxylate INTC146 [equivalent to INTC13]

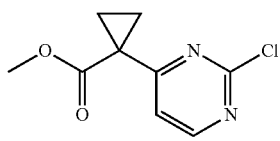

To a solution of methyl 2-(2-chloropyrimidin-4-yl)acetate (3 g, 16.08 mmol) in DMF (40 mL) was added NaOH (1.93 g, 48.2 mmol). The resulting mixture was allowed to stir for 15 min at RT before 1,2-dibromoethane (2.77 mL, 32.2 mmol) was added dropwise and allowed to stir at RT for 3 hrs. The mixture was poured into sat. NH4Cl (aq, 100 mL) and diluted with EtOAc (40 mL). The phases were separated and the aqueous phase was extracted with EtOAc (2×40 mL). The combined organic layers were dried (Na2SO4), filtered, and the solvent was removed in vacuo. The crude product was purified by chromatography on silica gel (120 g column, 0-50% EtOAc/iso-hexane) to afford methyl 1-(2-chloropyrimidin-4-yl)cyclopropanecarboxylate (1.78 g, 8.12 mmol, 51% yield) as a colourless oil. Rt 1.05 min (UPLC, basic); m/z 213 (M+H)+ (ES+); $^1$H NMR (500 MHz, DMSO-d6) δ 8.70 (d, J=5.2 Hz, 1H), 7.88 (d, J=5.2 Hz, 1H), 3.67 (s, 3H), 1.68-1.63 (m, 2H), 1.59 (dt, J=5.1, 2.9 Hz, 2H).

Hydrolysis 1-(2-Chloropyrimidin-4-yl)cyclopropanecarboxylic acid INTC147

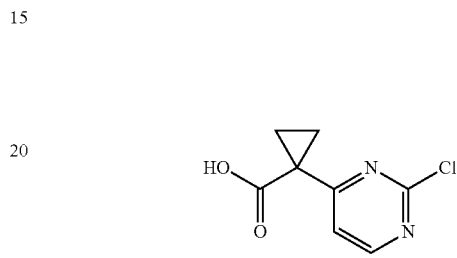

Prepared by Method J using methyl 1-(2-chloropyrimidin-4-yl)cyclopropanecarboxylate INTC146 to afford 1-(2-chloropyrimidin-4-yl)cyclopropanecarboxylic acid (quantitative yield) as a colourless solid. Rt 0.83 min (UPLC acidic); m/z 199 (M+H)+ (ES+). No NMR data recorded.

Curtius tert-Butyl (1-(2-chloropyrimidin-4-yl)cyclopropyl)carbamate INTC148

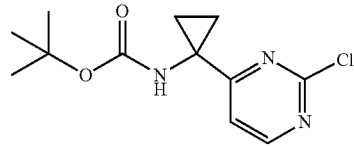 [SMILES: CC(C)(C)OC(=O)NC1(c2ccnc(Cl)n2)CC1]

To a solution of 1-(2-chloropyrimidin-4-yl)cyclopropanecarboxylic acid INTC147 (1.85 g, 9.31 mmol) in tert-butanol (15 mL) and toluene (15 mL) were successively added Et3N (1.49 mL, 10.3 mmol) and DPPA (2.23 mL, 9.78 mmol). The resulting mixture was allowed to stir at 90° C. for 4 hrs. The mixture was cooled to RT and diluted with sat. NaHCO3 (aq, 50 mL) and EtOAc (30 mL). The phases were separated and the aqueous layer was extracted with EtOAc (3×20 mL). The combined organic layers were dried (Na2SO4), filtered, and the solvent was removed in vacuo. The crude product was purified by chromatography on silica gel (120 g column, 0-50% EtOAc/iso-hexane) to afford tert-butyl (1-(2-chloropyrimidin-4-yl)cyclopropyl)carbamate (1.02 g, 3.33 mmol, 36% yield) as a colourless solid. Rt 1.26 min (UPLC acidic); m/z 270 (M+H)+ (ES+). $^1$H NMR (500 MHz, DMSO-d6) δ 8.63 (d, J=5.3 Hz, 1H), 7.91 (s, 1H), 7.38 (d, J=5.3 Hz, 1H), 1.42 (s, 9H), 1.35-1.21 (m, 4H).

Formation of Sulfonamides from Aromatic Halides

TABLE 3

The following intermediate was made according to Method C which is described above.

| INTC | Name/Structure (All examples containing chiral centres are racemates unless stated) | Synthesis Method, [LCMS Method], m/z (M + H)+, (Rt/min) | 1H NMR Chemical Shift Data (DMSO-d6 unless stated) | Catalyst, Base, Solvent |
|---|---|---|---|---|
| INTC153 | tert-Butyl (1-(2-(cyclopropanesulfonamido)pyrimidin-4-yl)cyclopropyl)carbamate | Method C using INTC148, [UPLC acidic], 355 (1.11). | 11.07 (s, 1H), 8.45 (s, 1H), 7.83 (s, 1H), 6.99 (s, 1H), 3.16-3.03 (m, 1H), 1.42 (s, 9H), 1.12-1.01 (m, 4H), 0.95-0.84 (m, 4H). | Pd 174, Cs₂CO₃, dioxane |

Deprotection: Boc

N-(4-(1-Aminocyclopropyl)pyrimidin-2-yl)cyclopropanesulfonamide hydrochloride INTC156

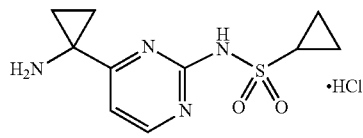 [SMILES: NC1(c2ccnc(NS(=O)(=O)C3CC3)n2)CC1 ; Cl]

To a solution of tert-butyl (1-(2-(cyclopropanesulfonamido)pyrimidin-4-yl)cyclopropyl)carbamate INTC153 (200 mg, 0.564 mmol) in dioxane (2 mL) was added HCl (4 M in dioxane) (1.41 mL, 5.64 mmol) and the resulting solution was stirred at RT for 18 hrs. The solvent was removed in vacuo to afford N-(4-(1-aminocyclopropyl)pyrimidin-2-yl)cyclopropanesulfonamide hydrochloride (164 mg, 0.564 mmol, quantitative yield) as a slightly yellow solid which was used without any further purification. Rt 0.39 min (UPLC acidic); m/z 255 (M+H)+ (ES+). No NMR data collected.

Amine Intermediate Preparation

Method E: Suzuki Coupling of Halo Anilines with Heteroaromatic Boronates

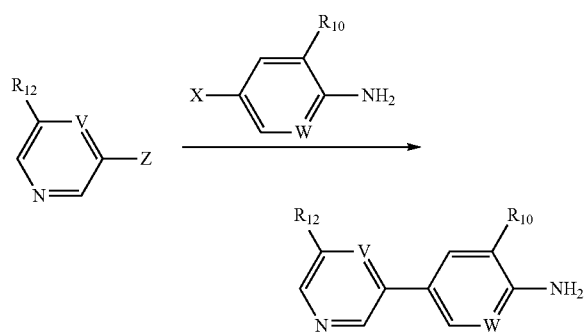

Z = B(OH)₂, B(pin)
X = Br, Cl

A solution of Ar1-X (1 eq) and Ar2-Z (1 eq) in solvent (3 volumes) and base (2.5 eq) was degassed (N₂, 5 min) and heated to 40° C. whereupon Pd catalyst (3 mol %) was added and the reaction mixture further degassed (N₂, 5 min) before being heated to 90° C. for 90 mins. The reaction mixture was allowed to cool to RT. In general, the desired compound was purified by column chromatography.

Method F: Suzuki Coupling of Heteroaromatic Halides with Aniline Boronates

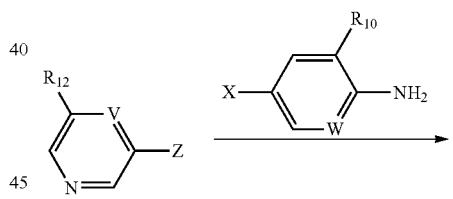

Z = Br, Cl
X = B(OH)₂, B(pin)

Pd catalyst (5 mol %) was added to a degassed (N₂, 5 mins) solution of Ar1-X (1 eq), Ar2-Z (1 eq) and base (3 eq, 6.85 mmol) in solvent (3 volumes). The solution was then degassed further (N₂, 5 mins) and then heated to 90° C. for 2 hrs then allowed to cool to RT. In general, the desired compound was purified by column chromatography.

Anilines

TABLE 4

The following intermediates were made according to Methods E or F.

| INTD | Name/Structure (All examples containing chiral centres are racemates unless stated) | Synthesis Method, [LCMS Method], m/z (M + H)+, (Rt/min) | ¹H NMR Chemical Shift Data (DMSO-d6 unless stated) | Catalyst, Base, Solvent |
|---|---|---|---|---|
| INTD27 | 4-(6-ethoxypyrazin-2-yl)-2-methylaniline | Method F, [UPLC basic], 230, (1.27). | 8.60 (s, 1H), 8.00 (s, 1H), 7.80-7.63 (m, 2H), 6.75-6.61 (m, 1H), 5.35 (s, 2H), 4.51-4.33 (m, 2H), 2.13 (s, 3H), 1.45-1.31 (m, 3H). | PdCl$_2$(dppf), K$_3$PO$_4$, dioxane |
| INTD33 | 5-(6-ethoxypyrazin-2-yl)pyridin-2-amine | Method F, [UPLC basic], 217, (0.98). | 8.70 (dd, J = 2.5, 0.8 Hz, 1H), 8.64 (s, 1H), 8.10-8.06 (m, 2H), 6.54 (dd, J = 8.7, 0.8 Hz, 1H), 6.41 (s, 2H), 4.43 (q, J = 7.0 Hz, 2H), 1.38 (t, J = 7.0 Hz, 3H). | PdCl$_2$(dppf), Cs$_2$CO$_3$, dioxane |
| INTD54 | 5-(6-cyclopropylpyrazin-2-yl)pyridin-2-amine | Method F, No LCMS data | 8.82 (s, 1H), 8.66 (d, J = 2.5 Hz, 1H), 8.41 (s, 1H), 8.05 (dd, J = 8.7, 2.5 Hz, 1H), 6.53 (d, J = 8.7 Hz, 1H), 6.38 (s, 2H), 2.22-2.15 (m, 1H), 1.07-1.01 (m, 4H). | PdCl$_2$(dppf), K$_2$CO$_3$, dioxane |
| INTD57 | 5'-chloro-[3,3'-bipyridin]-6-amine | Method E, [HPLC acidic], 205, (0.48). | 8.79 (d, J = 2.2 Hz, 1H), 8.49 (d, J = 2.2 Hz, 1H), 8.37 (d, J = 2.5 Hz, 1H), 8.15-8.13 (m, 1H), 7.82 (dd, J = 8.7, 2.5 Hz, 1H), 6.54 (dd, J = 8.7, 0.7 Hz, 1H), 6.28 (s, 2H). | PdCl$_2$(dppf), K$_3$PO$_4$, dioxane |

(5-(6-Ethoxypyrazin-2-yl)pyridin-2-yl)methanol INTD84

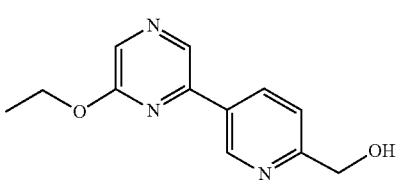 [SMILES: CCOc1cncc(-c2ccc(CO)nc2)n1]

A suspension of (5-bromopyridin-2-yl)methanol (1.00 g, 5.32 mmol), Bispin (1.5 g, 5.91 mmol) and KOAc (1.6 g, 16.0 mmol) in dioxane (20 mL) was heated to 30° C. then degassed (N$_2$). PdCl$_2$(dppf)-CH$_2$Cl$_2$ (0.217 g, 0.266 mmol) was added and the reaction mixture was heated to 90° C. for 2 hrs. The reaction mixture was cooled to 40° C. whereupon 2-chloro-6-ethoxypyrazine (900 mg, 5.68 mmol), Cs$_2$CO$_3$ (3.47 g, 10.6 mmol) and water (5 mL) were added. The mixture was degassed (N$_2$), then PdCl$_2$(dpp)-CH$_2$Cl$_2$ (0.217 g, 0.266 mmol) was added and the mixture was again degassed (N$_2$). The reaction mixture was then heated to 90° C. for 18 hrs. The reaction mixture was part concentrated (to approx. 5 mL) then taken up with water (20 mL) and EtOAc (50 mL) and passed through celite, eluting with EtOAc (20 mL). The phases were then diluted with water (20 mL) and partitioned. The organic phase was washed with brine (30 mL), dried (Na$_2$SO$_4$), filtered and concentrated onto silica (5 g). The crude product was purified by chromatography on silica (40 g cartridge, 0-100% EtOAc/iso-hexanes) to afford (5-(6-ethoxypyrazin-2-yl)pyridin-2-yl)methanol (675 mg, 2.86 mmol, 54% yield) as a brown solid. Rt 1.24 min (HPLC, acidic); m/z 232 (M+H)⁺ (ES⁺); ¹H NMR (500 MHz, DMSO-d6) δ 9.27-9.09 (m, 1H), 8.87 (s, 1H), 8.49 (dd, J=8.2, 2.3 Hz, 1H), 8.29 (s, 1H), 7.62 (d, J=8.2 Hz, 1H), 5.53 (t, J=5.9 Hz, 1H), 4.64 (d, J=5.9 Hz, 2H), 4.50 (q, J=7.1 Hz, 2H), 1.41 (t, J=7.1 Hz, 3H).

5-(6-Ethoxypyrazin-2-yl)picolinaldehyde INTD85

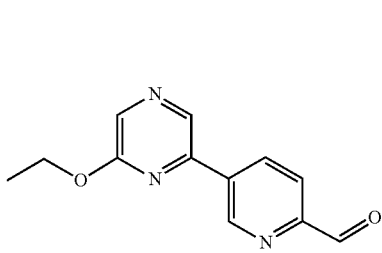 [SMILES: CCOc1cncc(-c2ccc(C=O)nc2)n1]

A solution of (5-(6-ethoxypyrazin-2-yl)pyridin-2-yl)methanol INTD84 (375 mg, 3.18 mmol) in CH₂Cl₂ (15 mL) was treated with manganese dioxide (3 g, 34.5 mmol). The reaction was stirred for 4 hrs at RT then filtered through celite and concentrated onto silica (4 g). The crude product was purified by chromatography on silica (24 g cartridge, 0-100% EtOAc/iso-hexanes) to afford 5-(6-ethoxypyrazin-2-yl)picolinaldehyde (309 mg, 1.32 mmol, 42% yield) as a colourless solid. Rt 1.85 min (HPLC, acidic); m/z 230 (M+H)⁺ (ES⁺); ¹H NMR (500 MHz, DMSO-d₆) δ10.07 (d, J=0.8 Hz, 1H), 9.55 (dd, J=2.2, 0.9 Hz, 1H), 9.03 (s, 1H), 8.73 (ddd, J=8.1, 2.2, 0.8 Hz, 1H), 8.39 (s, 1H), 8.08 (dd, J=8.1, 0.9 Hz, 1H), 4.53 (q, J=7.0 Hz, 2H), 1.42 (t, J=7.0 Hz, 3H).

5-(6-ethoxypyrazin-2-yl)picolinic acid INTD86

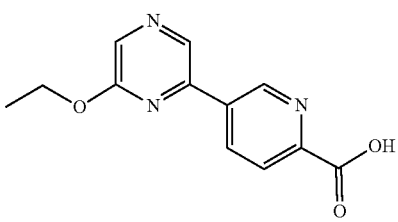 [SMILES: CCOc1cncc(-c2ccc(C(=O)O)nc2)n1]

A solution of 5-(6-ethoxypyrazin-2-yl)picolinaldehyde INTD85 (302 mg, 1.32 mmol) in DMF (5 mL) was treated with oxone (1.02 g, 1.66 mmol). The reaction mixture was stirred at RT for 4 days. The reaction mixture was diluted with water (10 mL) and filtered. The filtrate was then taken up in EtOAc (10 mL) and heated to 40° C. to afford a free flowing suspension. This was then treated dropwise with iso-hexanes (10 mL), cooled to RT and filtered to afford 5-(6-ethoxypyrazin-2-yl)picolinic acid (240 mg, 0.93 mmol, 71% yield) as a colourless solid. Rt 1.45 min (HPLC, acidic); m/z 246 (M+H)⁺ (ES⁺); ¹H NMR (500 MHz, DMSO-d₆) δ13.31 (s, 1H), 9.46-9.38 (m, 1H), 8.98 (s, 1H), 8.64 (dd, J=8.1, 2.3 Hz, 1H), 8.36 (s, 1H), 8.17 (dd, J=8.1, 0.8 Hz, 1H), 4.51 (q, J=7.0 Hz, 2H), 1.42 (t, J=7.0 Hz, 3H).

Carbocycle Formation Via Alkylation

Methyl 1-(2-chloropyrimidin-4-yl)cyclohexanecarboxylate INTC180

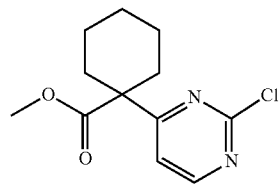 [SMILES: COC(=O)C1(c2ccnc(Cl)n2)CCCCC1]

To a solution of methyl 2-(2-chloropyrimidin-4-yl)acetate (0.98 g, 4.73 mmol) in MeCN (0.25 mL) at RT was added cesium carbonate (3.08 g, 9.45 mmol) portionwise. The reaction mixture was heated to 60° C. 1,5-Dibromopentane (0.77 mL, 5.67 mmol) was added dropwise to the reaction over 15 mins and the reaction was heated at 70° C. for 2 hrs then cooled to RT. The reaction mixture was diluted with water (100 mL), and MTBE (100 mL). The phases were separated. The combined organics were dried (MgSO₄), filtered and concentrated in vacuo. The crude product was purified by chromatography on silica gel (24 g cartridge, 0-50% EtOAc/iso-hexanes) to afford methyl 1-(2-chloropyrimidin-4-yl)cyclohexanecarboxylate (858 mg, 71%) as a colourless oil; Rt 2.23 mins (HPLC acidic); m/z 255 (M+H)⁺ (ES⁺). ¹H NMR (500 MHz, DMSO-d6) δ 8.76 (d, J=5.2 Hz, 1H), 7.63 (d, J=5.2 Hz, 1H), 3.64 (s, 3H), 2.24-2.16 (m, 2H), 1.97-1.88 (m, 2H), 1.60-1.49 (m, 4H), 1.49-1.26 (m, 2H).

Ethyl 1-(6-chloropyrazin-2-yl)cyclohexane-1-carboxylate INTC181

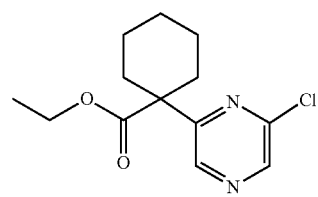 [SMILES: CCOC(=O)C1(c2cncc(Cl)n2)CCCCC1]

Prepared as for INTC180 using ethyl 2-(6-chloropyrazin-2-yl)acetate (0.82 g, 4.09 mmol) and stirring at 70° C. for 3 hrs to afford ethyl 1-(6-chloropyrazin-2-yl)cyclohexanecarboxylate (423 mg, 1.49 mmol, 37% yield) as a colourless solid; Rt 2.55 mins (HPLC acidic); m/z 269 (M+H)⁺ (ES⁺). ¹H NMR (500 MHz, DMSO-d6) δ 8.76 (s, 1H), 8.72 (s, 1H), 4.11 (q, J=7.1 Hz, 2H), 2.30-2.20 (m, 2H), 2.02-1.94 (m, 2H), 1.60-1.41 (m, 5H), 1.39-1.29 (m, 1H), 1.12 (t, J=7.1 Hz, 3H).

N-(5-(6-Ethoxypyrazin-2-yl)pyridin-2-yl)-4-(2-(methylthio)pyrimidin-4-yl)tetrahydro-2H-pyran-4-carboxamide INTC182

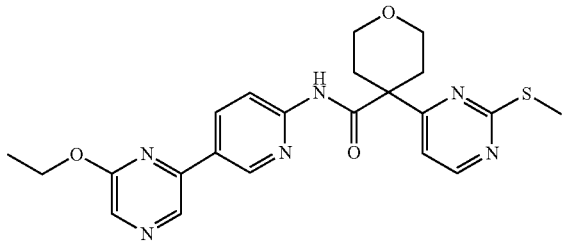 [SMILES: CCOc1cncc(-c2ccc(NC(=O)C3(c4ccnc(SC)n4)CCOCC3)nc2)n1]

Prepared using Method 11 using methyl 4-(2-(methylthio)pyrimidin-4-yl)tetrahydro-2H-pyran-4-carboxylate INTC178 (1.0 eq), 5-(6-ethoxypyrazin-2-yl)pyridin-2-amine INTD33 (1.0 eq) and iPrMgCl (2.0 eq) to afford N-(5-(6-ethoxypyrazin-2-yl)pyridin-2-yl)-4-(2-(methylthio)pyrimidin-4-yl)tetrahydro-2H-pyran-4-carboxamide (5.5 g, 11.67 mmol, 48% yield) as a pale yellow solid; Rt 2.35 mins (HPLC acidic); m/z 453 (M+H)$^+$ (ES$^+$). $^1$H NMR (500 MHz, DMSO-d6) δ 10.20 (s, 1H), 9.05 (dd, J=2.5, 0.8 Hz, 1H), 8.85 (s, 1H), 8.64 (d, J=5.3 Hz, 1H), 8.51 (dd, J=8.8, 2.5 Hz, 1H), 8.26 (s, 1H), 8.21 (dd, J=8.7, 0.8 Hz, 1H), 7.33 (d, J=5.3 Hz, 1H), 4.48 (q, J=7.0 Hz, 2H), 3.77-3.70 (m, 2H), 3.65-3.58 (m, 2H), 2.54-2.44 (m, 5H, obscured by DMSO peak), 2.25-2.17 (m, 2H), 1.40 (t, J=7.0 Hz, 3H).

Method P: SNAR Using 4-Chloro-2-(Methylthio)-Heterocycles

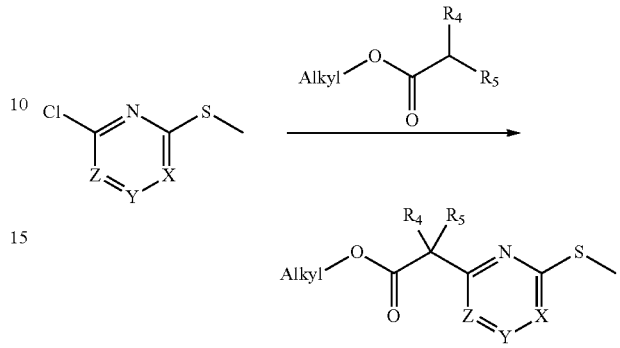

A solution of hetero-aromatic chloride (1 eq) and ester (1 eq) in THF (5-20 volumes) was warmed to 30° C. to which was added LiHMDS (1.25 eq 1-1.5M in THF). The reaction mixture was stirred at this temperature for up to 3 hrs, then was poured into water and extracted with EtOAc. The organic extract was washed with brine, dried (MgSO$_4$), filtered and the solvent removed in vacuo to afford the desired compound. If required, the crude product was purified by normal phase chromatography.

TABLE 5

The following intermediates were made according to Method P.

| INTC | Name/Structure (All examples containing chiral centres are racemates unless stated) | Synthesis Method, [LCMS Method], m/z (M + H)$^+$, (Rt/min) | $^1$H NMR Chemical Shift Data (DMSO-d6 unless stated) |
|---|---|---|---|
| INTC183 | methyl 1-(2-(methylthio)pyrimidin-4-yl)cyclobutane-1-carboxylate | Method P, [HPLC acidic], 239 (2.04). | No data collected |
| INTC185 | methyl 4-(4-(methylthio)pyrimidin-2-yl)tetrahydro-2H-pyran-4-carboxylate | Method P, [HPLC acidic], 269 (1.77). | 8.46 (d, J = 5.6 Hz, 1H), 7.35 (d, J = 5.6 Hz, 1H), 3.74-3.66 (m, 2H), 3.64 (s, 3H), 3.56-3.49 (m, 2H), 2.52 (s, 3H) 2.28-2.13 (m, 4H). |
| INTC189 | methyl 4-(2-(methylthio)pyrimidin-4-yl)tetrahydro-2H-thiopyran-4-carboxylate | Method P, [HPLC acidic], 285 (2.15). | 8.62 (d, J = 5.2 Hz, 1H), 7.23 (d, J = 5.2 Hz, 1H), 3.68 (s, 3H), 2.75-2.66 (m, 3H), 2.66-2.58 (m, 3H), 2.49 (s, 3H), 2.22-2.12 (m, 2H). |

TABLE 5-continued

The following intermediates were made according to Method P.

| INTC | Name/Structure (All examples containing chiral centres are racemates unless stated) | Synthesis Method, [LCMS Method], m/z (M + H)+, (Rt/min) | 1H NMR Chemical Shift Data (DMSO-d6 unless stated) |
|---|---|---|---|
| INTC241 | 1-(tert-Butyl) 4-methyl 4-(4-(methylthio)pyrimidin-2-yl)piperidine-1,4-dicarboxylate | Method P, [UPLC Acidic], (M − tBu) + H 312 (1.57). | 8.45 (d, J = 5.5 Hz, 1H), 7.35 (d, J = 5.5 Hz, 1H), 3.64 (s, 3H), 3.62-3.55 (m, 2H), 2.53-2.47 (m, 2H), 2.21-2.09 (m, 4H), 1.40 (s, 9H). 3H not observed, obscured by DMSO peak. |

Lithium 4-(2-(methylthio)pyrimidin-4-yl)tetrahydro-2H-pyran-4-carboxylate INTC193

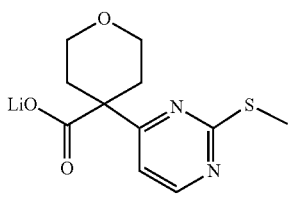

To a solution of methyl 4-(2-(methylthio)pyrimidin-4-yl)tetrahydro-2H-pyran-4-carboxylate (2 g, 7.45 mmol) INTC178 in THF (10 mL) was added a solution of lithium hydroxide, $H_2O$ (0.38 g, 8.94 mmol) in water (5 mL). The resulting mixture was stirred at room temperature for 7 days. The reaction mixture was diluted with EtOAc (5 mL) and water (5 mL) the phases were separated and the aqueous was washed with further EtOAc (5 mL). The aqueous phase was concentrated in vacuo to give lithium 4-(2-(methylthio)pyrimidin-4-yl)tetrahydro-2H-pyran-4-carboxylate (1.85 g, 6.75 mmol, 91% yield) as a colourless solid, which was used without further purification. Rt 0.48 mins (UPLC 2, acidic); m/z 255 $(CO_2H+H)^+$ $(ES^+)$. No 1H NMR data collected.
Curtius tert-Butyl (4-(2-(methylthio)pyrimidin-4-yl)tetrahydro-2H-pyran-4-yl)carbamate INTC194

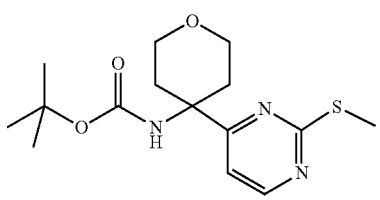 [SMILES: CSc1nccc(C2(NC(=O)OC(C)(C)C)CCOCC2)n1]

Prepared as for INTC148 using lithium 4-(2-(methylthio)pyrimidin-4-yl)tetrahydro-2H-pyran-4-carboxylate (2.5 g, 8.65 mmol) INTC193 and T3P (50 wt % in EtOAc) (0.78 mL, 10.38 mmol), heating at 90° C. for 18 hrs to afford tert-butyl (4-(2-(methylthio)pyrimidin-4-yl)tetrahydro-2H-pyran-4-yl)carbamate (214 mg, 0.605 mmol, 7% yield) as a colourless oil; Rt 1.22 mins (UPLC acidic); m/z 326 $(M+H)^+$ $(ES^+)$. 1H NMR (500 MHz, DMSO-d6) δ 8.58 (d, J=5.3 Hz, 1H), 7.51 (s, 1H), 7.12 (d, J=5.3 Hz, 1H), 3.78-3.56 (m, 4H), 2.52 (s, 3H), 2.09-2.00 (m, 4H), 1.37 (s, 9H).

4-(2-(Methylthio)pyrimidin-4-yl)tetrahydro-2H-pyran-4-amine, HCl INTC195

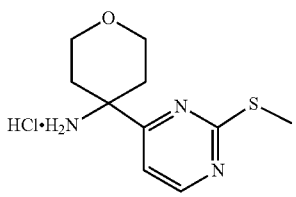

Prepared as for INTC156 using tert-butyl (4-(2-(methylthio)pyrimidin-4-yl)tetrahydro-2H-pyran-4-yl)carbamate INTC194 to afford 4-(2-(methylthio)pyrimidin-4-yl)tetrahydro-2H-pyran-4-amine, HCl (210 mg, 0.698 mmol, quantitative yield) as a colourless solid; Rt 0.43 mins (UPLC basic); m/z 226 $(M+H)^+$ $(ES^+)$. 1H NMR (500 MHz, DMSO-d6) δ 8.92-8.81 (m, 2H), 8.78 (d, J=5.3 Hz, 1H), 7.59 (d, J=5.3 Hz, 1H), 3.95-3.86 (m, 2H), 3.59-3.49 (m, 2H), 2.59 (s, 3H), 2.41-2.33 (m, 2H), 2.04-1.96 (m, 2H).

Amide Formation 5-(6-Ethoxypyrazin-2-yl)-N-(4-(2-(methylthio)py-rimidin-4-yl)tetrahydro-2H-pyran-4-yl)picolinamide INTC196

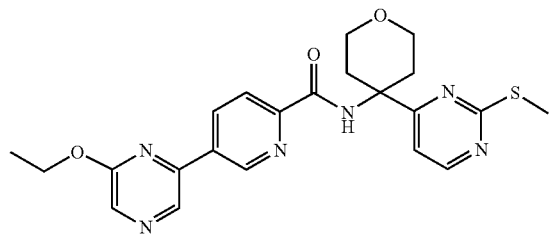 [SMILES: CCOc1cncc(-c2ccc(C(=O)NC3(c4ccnc(SC)n4)CCOCC3)nc2)n1]

Prepared using Method 1 using 4-(2-(methylthio)pyrimidin-4-yl)tetrahydro-2H-pyran-4-amine hydrochloride INTC195 (1.0 equiv.) and 5-(6-ethoxypyrazin-2-yl)picolinic acid INTD86 (1.1 equiv) to afford 5-(6-ethoxypyrazin-2-yl)-N-(4-(2-(methylthio)pyrimidin-4-yl)tetrahydro-2H-pyran-4-yl)picolinamide (35% yield) as a colourless oil. Rt 0.66 min (UPLC acidic); m/z 454 (M+H)$^+$ (ES$^+$). $^1$H NMR (500 MHz, DMSO-d6) δ 9.45 (dd, J=2.2, 0.8 Hz, 1H), 9.01-8.97 (m, 2H), 8.69 (dd, J=8.2, 2.2 Hz, 1H), 8.56 (d, J=5.3 Hz, 1H), 8.38 (s, 1H), 8.09 (dd, J=8.2, 0.8 Hz, 1H), 7.23 (d, J=5.3 Hz, 1H), 4.53 (q, J=7.0 Hz, 2H), 3.87-3.81 (m, 2H), 3.71-3.63 (m, 2H), 3.17 (d, J=5.2 Hz, 3H), 2.41-2.35 (m, 2H), 2.28-2.18 (m, 2H), 1.43 (t, J=7.0 Hz, 3H).

Method Q: Oxidation of thioethers to sulfones or sulfoxides

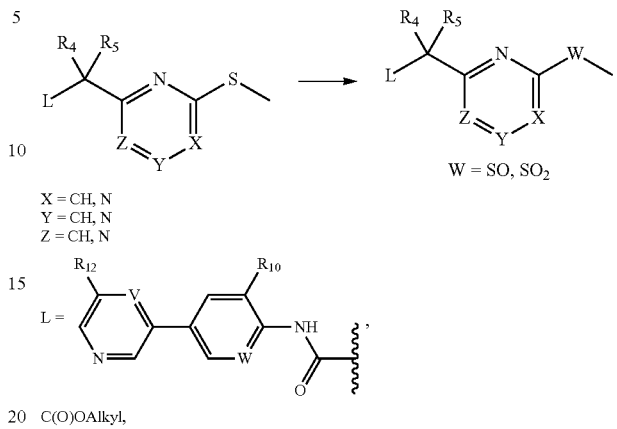

X = CH, N
Y = CH, N
Z = CH, N

C(O)OAlkyl, mCPBA (2.2 eq) was portionwise to a stirred solution of thioether (1 eq) in DCM (20-50 volumes) maintaining the internal temperature at RT. The resulting mixture was stirred at RT for a further 3 hrs. The reaction mixture was poured into sat. aq. Na$_2$SO$_3$ and extracted with DCM. The organic extract was sequentially washed with sat. aq. NaHCO$_3$ and brine, dried (MgSO$_4$), filtered and solvent removed in vacuo to afford the desired compound.

TABLE 6

The following intermediates were made according to Method Q.

| INTC | Name/Structure (All examples containing chiral centres are racemates unless stated) | Synthesis Method, [LCMS Method], m/z (M + H)$^+$, (Rt/min) | $^1$H NMR Chemical Shift Data (DMSO-d6 unless stated) |
|---|---|---|---|
| INTC200 | methyl 1-(2-(methylsulfonyl)pyrimidin-4-yl)cyclobutane-1-carboxylate | Method Q using INTC183, [HPLC acidic], 271 (1.45). | 8.61 (d, J = 5.2 Hz, 1H), 7.21 (d, J = 5.2 Hz, 1H), 3.64 (s, 3H), 3.32 (s, 3H), 2.69-2.61 (m, 2H), 2.61-2.53 (m, 2H), 2.02-1.86 (m, 2H). |
| INTC202 | methyl 4-(4-(methylsulfonyl)pyrimidin-2-yl)tetrahydro-2H-pyran-4-carboxylate | Method Q using INTC185, [HPLC acidic], 301 (1.33). | 9.26 (d, J = 5.0 Hz, 1H), 8.02 (d, J = 5.0 Hz, 1H), 3.72-3.63 (m, 5H), 3.62-3.55 (m, 2H), 3.38 (s, 3H), 2.39-2.18 (m, 4H). |

TABLE 6-continued

The following intermediates were made according to Method Q.

| INTC | Name/Structure (All examples containing chiral centres are racemates unless stated) | Synthesis Method, [LCMS Method], m/z (M + H)+, (Rt/min) | 1H NMR Chemical Shift Data (DMSO-d6 unless stated) |
|---|---|---|---|
| INTC204 | N-(5-(6-ethoxypyrazin-2-yl)pyridin-2-yl)-4-(2-(methylsulfonyl)pyrimidin-4-yl)tetrahydro-2H-pyran-4-carboxamide 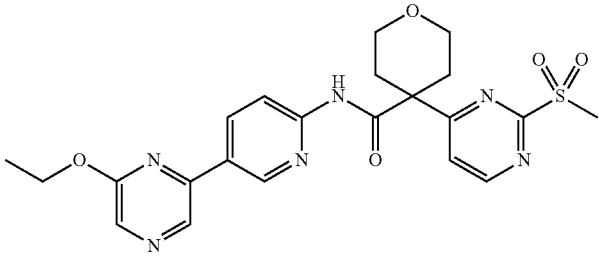 | Method Q using INTC182, [HPLC acidic], 485 (1.94). | 10.40 (s, 1H), 9.09 (d, J = 5.3 Hz, 1H), 9.04 (dd, J = 2.4, 0.8 Hz, 1H), 8.85 (s, 1H), 8.52 (dd, J = 8.7, 2.5 Hz, 1H), 8.26 (s, 1H), 8.22 (dd, J = 8.8, 0.8 Hz, 1H), 7.94 (d, J = 5.3 Hz, 1H), 4.48 (q, J = 7.0 Hz, 2H), 3.82-3.73 (m, 2H), 3.69-3.60 (m, 2H), 3.42 (s, 3H), 2.55-2.47 (m, 2H, obscured by DMSO peak), 2.33-2.22 (m, 2H), 1.40 (t, J = 7.0 Hz, 3H). |
| INTC206 | 5-(6-ethoxypyrazin-2-yl)-N-(4-(2-(methylsulfonyl)pyrimidin-4-yl)tetrahydro-2H-pyran-4-yl)picolinamide 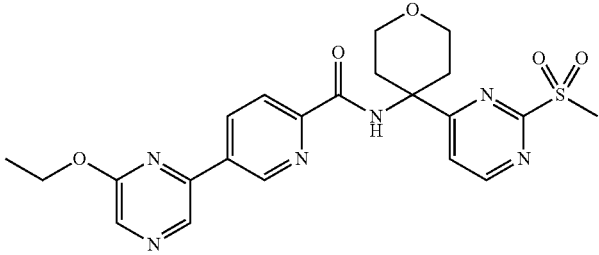 | Method Q using INTC196, [UPLC 2, acidic], 486 (0.57). | 9.46 (d, J = 2.2 Hz, 1H), 9.17 (s, 1H), 9.05-8.98 (m, 2H), 8.72-8.64 (m, 1H), 8.38 (s, 1H), 8.08 (d, J = 8.1 Hz, 1H), 7.86 (d, J = 5.3 Hz, 1H), 4.52 (q, J = 7.0 Hz, 2H), 3.90-3.83 (m, 2H), 3.74-3.66 (m, 2H), 3.43 (s, 3H), 2.45-2.39 (m, 2H), 2.33-2.23 (m, 2H), 1.45-1.37 (m, 3H). |
| INTC209 | methyl 4-(2-(methylsulfonyl)pyrimidin-4-yl)tetrahydro-2H-thiopyran-4-carboxylate 1,1-dioxide 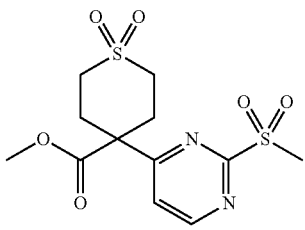 | Method Q using INTC189, [UPLC acidic 2], 349 (0.38). | 8.62 (d, J = 5.2 Hz, 1H), 7.23 (d, J = 5.2 Hz, 1H), 3.68 (s, 3H), 2.75-2.66 (m, 3H), 2.66-2.58 (m, 3H), 2.49 (s, 3H), 2.22-2.12 (m, 2H). |

TABLE 6-continued

The following intermediates were made according to Method Q.

| INTC | Name/Structure (All examples containing chiral centres are racemates unless stated) | Synthesis Method, [LCMS Method], m/z (M + H)+, (Rt/min) | 1H NMR Chemical Shift Data (DMSO-d6 unless stated) |
|---|---|---|---|
| INTC242 | 1-(tert-Butyl) 4-methyl 4-(4-(methylsulfinyl)pyrimidin-2-yl)piperidine-1,4-dicarboxylate 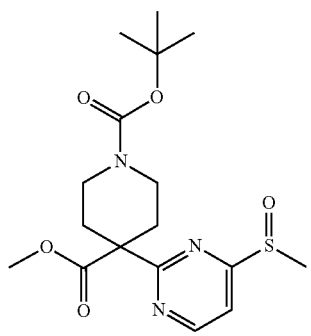 | Method Q using INTC241, [UPLC Acidic], (M − Boc) + H 284 (0.57) | No NMR recorded |

TABLE 7

The following intermediates were made according to Method R which is described below.

| INTC | Name/Structure (All examples containing chiral centres are racemates unless stated) | Synthesis Method, [LCMS Method], m/z (M + H)+, (Rt/min) | 1H NMR Chemical Shift Data (DMSO-d6 unless stated) | Base, Solvent |
|---|---|---|---|---|
| INTC211 | methyl 1-(2-(cyclopropanesulfonamido)pyrimidin-4-yl)cyclobutane-1-carboxylate | Method R using INTC200 [HPLC acidic], 312 (1.63). | 11.28 (s, 1H), 8.59 (d, J = 5.2 Hz, 1H), 7.15 (d, J = 5.2 Hz, 1H), 3.64 (s, 3H), 3.23-3.15 (m, 1H), 2.70-2.60 (m, 2H), 2.59-2.52 (m, 2H), 2.03-1.86 (m, 2H), 1.15-1.00 (m, 4H). | Cs2CO3, NMP |
| INTC213 | methyl 4-(4-(cyclopropanesulfonamido)pyrimidin-2-yl)tetrahydro-2H-pyran-4-carboxylate 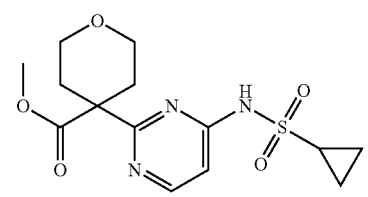 | Method R using INTC202, [HPLC acidic], 342 (1.42). | 11.30 (s,1H), 8.53 (d, J = 5.7 Hz, 1H), 6.83 (d, J = 5.7 Hz, 1H), 3.76-3.68 (m, 2H), 3.64 (s, 3H), 3.55-3.47 (m, 2H), 3.20-3.05 (m, 1H), 2.33-2.08 (m, 4H), 1.26-1.02 (m, 4H). | Cs2CO3, NMP |

TABLE 7-continued

The following intermediates were made according to Method R which is described below.

| INTC | Name/Structure (All examples containing chiral centres are racemates unless stated) | Synthesis Method, [LCMS Method], m/z (M + H)+, (Rt/min) | $^1$H NMR Chemical Shift Data (DMSO-d6 unless stated) | Base, Solvent |
|---|---|---|---|---|
| INTC217 | methyl 4-(2-(cyclopropanesulfonamido)pyrimidin-4-yl)tetrahydro-2H-thiopyran-4-carboxylate 1,1-dioxide | Method R using INTC209, [HPLC acidic], 390 (1.28). | 11.39 (s, 1H), 8.63 (d, J = 5.3 Hz, 1H), 7.24 (d, J = 5.3 Hz, 1H), 3.70 (s, 3H), 3.23-3.13 (m, 5H), 2.68-2.55 (m, 4H), 1.15-1.09 (m, 2H), 1.09-0.99 (m, 2H). | Cs$_2$CO$_3$, NMP |
| INTC243 | 1-(tert-Butyl) 4-methyl 4-(4-(cyclopropanesulfonamido)pyrimidin-2-yl)piperidine-1,4-dicarboxylate | Method R using INTC242 and cyclopropyl sulfonamide, [HPLC Acidic], (M − Boc) + H 341, (2.03) | 11.31 (s, 1H), 8.51 (d, J = 5.7 Hz, 1H), 6.82 (d, J = 5.7 Hz, 1H), 3.66-3.59 (m, 4H), 3.15-3.06 (m, 4H), 2.18-2.05 (m, 4H), 1.40 (s, 10H), 1.15-1.05 (m, 4H). | Cs$_2$CO$_3$, NMP |

4-(4-(Cyclopropanesulfonamido)pyrimidin-2-yl)-N-(5-(6-ethoxypyrazin-2-yl)pyridin-2-yl)piperidine-4-carboxamide hydrochloride INTC247

This compound was prepared by Boc-deprotection with HCl of INTC246, [HPLC Acidic], 521, (1.30).

Preparation of Examples

Amide Formation

Method 1: Amide Coupling Using HATU

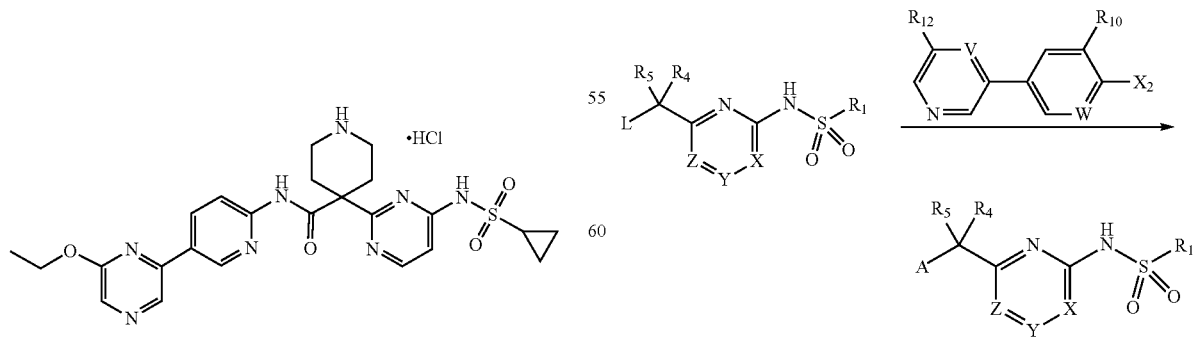

L = CO$_2$H or CO$_2$K and X$_2$ = NH$_2$; or
L = NH$_2$ and X$_2$ = CO$_2$H or CO$_2$K A = 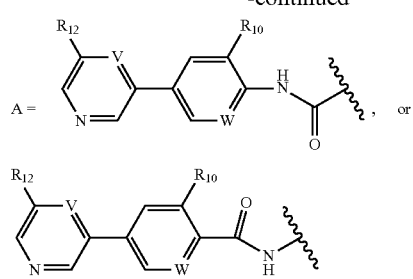, or To a stirred suspension of the acid or the potassium salt (1 eq, $X_2=CO_2H$ or $CO_2K$) and DIPEA (6 eq) in DMF (15 vol) the aniline or amine (1 eq) and HATU (1.5 eq) were added. The reaction was stirred at RT for 18 hrs then concentrated in vacuo. MeOH and 2M NaOH (aq) were added. The mixture was stirred for 30 min then concentrated in vacuo. The aqueous phase acidified to pH 6 with 1M HCl (aq) and the product extracted into DCM. The organics were combined, dried (phase separator) and concentrated in vacuo.

The crude product was purified by reverse or normal phase chromatography or a combination of both.

Method 2: AlMe$_3$ Mediated Amide Coupling from Ester

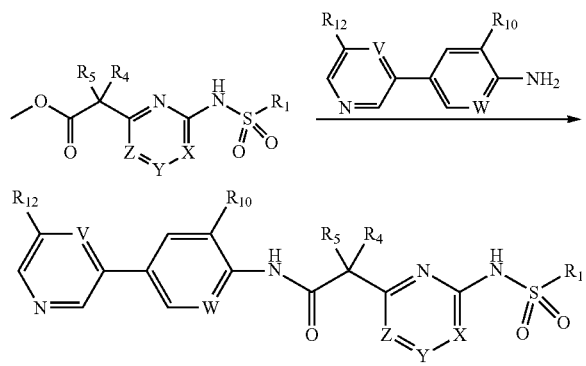

To an ice cooled solution of aniline (2 eq) in toluene (40 volumes) was added AlMe$_3$ (2.0 M in heptane, 2 eq). The mixture was stirred at this temperature for 5 mins then at RT for 10 mins.

To this solution was added ester (1 eq) in one portion and the resultant mixture heated and stirred at 80° C. for 2 hrs. The reaction mixture was cooled in an ice bath and carefully quenched with MeOH (10 volumes). After stirring for 20 mins the mixture was diluted in a mixture of DCM/MeOH (10 volumes), filtered through celite and the filtrate concentrated. The crude product was purified by reverse or normal phase chromatography.

Method 11: i-PrMgCI Mediated Amide Coupling from Ester

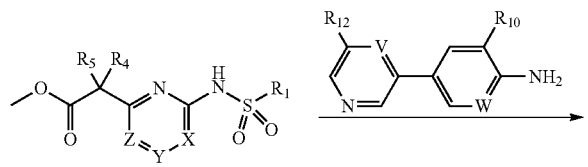

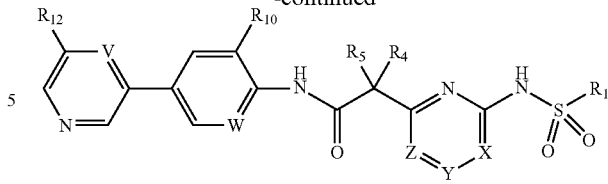

To an ice cooled solution of aniline (1.1 eq) in THF (10-50 volumes) was added i-PrMgCI (2.0 M in THF, 2.0 eq) dropwise over 5-15 mins to maintain an internal temperature of less than 10° C. The reaction mixture was warmed to RT over 45 mins, then a solution of ester (1.0 eq) in THF (5-20 volumes) was added dropwise over 5-15 min. The reaction mixture was stirred at ambient temperature for 5-15 mins then further i-PrMgCI (2.0 M in THF, 2.0 eq) was added dropwise over 5-20 min. The reaction mixture was stirred at RT for 30 mins and then the solution was slowly poured into 1M HCl (aq) and extracted with EtOAc. The organics were combined, dried (phase separator) and concentrated in vacuo. The crude product was purified by reverse or normal phase chromatography or a combination of both.

Method R: Formation of Sulfonamides from Aromatic Sulfones

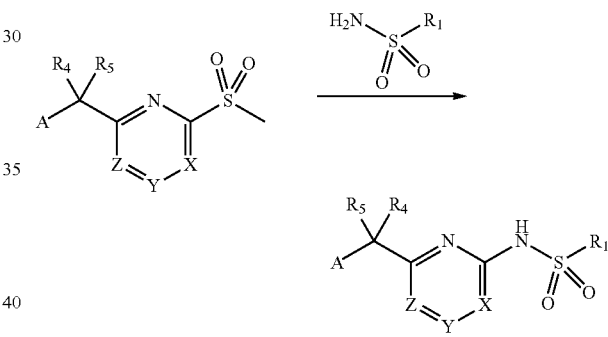

A = 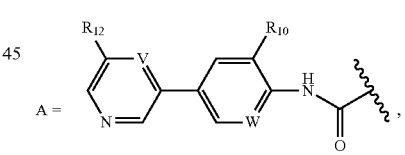,

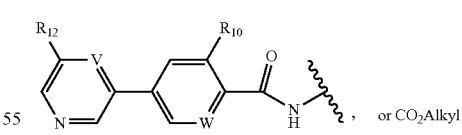, or CO$_2$Alkyl

To a solution of sulfone (1.0 eq) and primary sulfonamide (1.1-2.0 eq) in polar aprotic solvent such as NMP (5-100 volumes) was added an inorganic base (3 eq) such as cesium carbonate and heated to 40-90° C. for 1-3 hrs. The reaction mixture was cooled to RT and diluted with water (50-100 volumes) and the mixture was washed with MTBE (100 volumes) and the aqueous was slowly acidified to pH 5 or lower using an appropriate acid such as HCl. The resulting precipitate was filtered to afford desired sulfonamide product.

4-(2-(Cyclopropanesulfonamido)pyrimidin-4-yl)-N-(5-(6-ethoxypyrazin-2-yl)pyridin-2-yl)-1-methylpiperidine-4-carboxamide P231

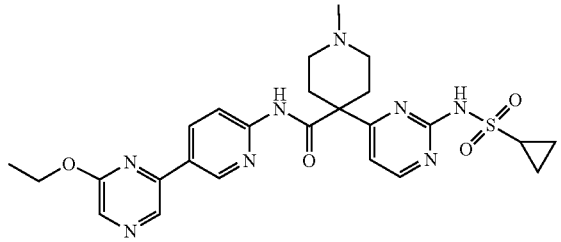 [SMILES: CCOc1cncc(-c2ccc(NC(=O)C3(c4ccnc(NS(=O)(=O)C5CC5)n4)CCN(C)CC3)nc2)n1]

To a solution of 4-(2-(cyclopropanesulfonamido)pyrimidin-4-yl)-N-(5-(6-ethoxypyrazin-2-yl)pyridin-2-yl)piperidine-4-carboxamide, HCl P140 (0.1 g, 0.178 mmol) in DCM (2 mL) was added AcOH (0.1 mL, 1.75 mmol) and formaldehyde (0.1 mL, 1.34 mmol). The reaction mixture was stirred at RT for 1 hr then NaBH(OAc)$_3$ (0.113 g, 0.535 mmol) was added and stirring continued for 20 hrs. The reaction mixture was concentrated in vacuo and was purified by chromatography on RP Flash C18 (12 g column, 25-60% MeCN/Water 0.1% formic acid) to afford 4-(2-(cyclopropanesulfonamido)pyrimidin-4-yl)-N-(5-(6-ethoxypyrazin-2-yl)pyridin-2-yl)-1-methylpiperidine-4-carboxamide (28 mg, 0.051 mmol, 29% yield) as a colourless solid. Rt 0.83 min (UPLC, acidic); m/z 539 (M+H)$^+$ (ES$^+$); $^1$H NMR (500 MHz, DMSO-d6) δ 9.97 (s, 1H), 9.02 (d, J=2.4 Hz, 1H), 8.83 (s, 1H), 8.54-8.46 (m, 2H), 8.25 (s, 1H), 8.21-8.14 (m, 1H), 7.12-7.07 (m, 1H), 4.48 (q, J=7.1 Hz, 2H), 3.24-3.17 (m, 1H), 2.50-2.43 (m, 4H), 2.39-2.25 (m, 2H), 2.25-2.16 (m, 2H), 2.15 (s, 3H), 1.40 (t, J=7.0 Hz, 3H), 1.03-0.97 (m, 2H), 0.87-0.80 (m, 2H), One exchangeable proton not observed.

4-(2-(Cyclopropanesulfonamido)pyrimidin-4-yl)-N-(5-(6-ethoxypyrazin-2-yl)pyridin-2-yl)-1-isopropylpiperidine-4-carboxamide P232

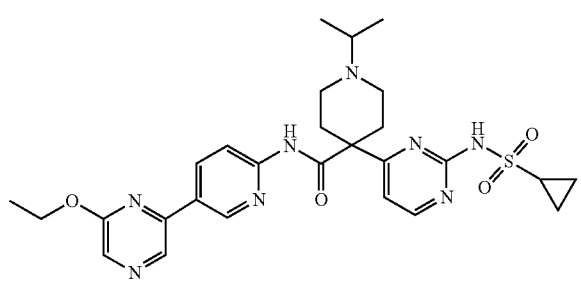 [SMILES: CCOc1cncc(-c2ccc(NC(=O)C3(c4ccnc(NS(=O)(=O)C5CC5)n4)CCN(C(C)C)CC3)nc2)n1]

Prepared as for P231 using 4-(2-(cyclopropanesulfonamido)pyrimidin-4-yl)-N-(5-(6-ethoxypyrazin-2-yl)pyridin-2-yl)piperidine-4-carboxamide, HCl P140 and acetone to afford 4-(2-(cyclopropanesulfonamido)pyrimidin-4-yl)-N-(5-(6-ethoxypyrazin-2-yl)pyridin-2-yl)-1-isopropylpiperidine-4-carboxamide (20% yield) as a colourless solid. Rt 0.88 min (UPLC, acidic); m/z 567 (M+H)$^+$ (ES$^+$); $^1$H NMR (500 MHz, DMSO-d6) δ 9.78 (s, 1H), 9.02 (d, J=2.4 Hz, 1H), 8.81 (s, 1H), 8.46 (dd, J=8.7, 2.4 Hz, 1H), 8.23 (s, 1H), 8.19 (d, J=5.0 Hz, 1H), 8.10 (d, J=8.7 Hz, 1H), 6.53 (s, 1H), 4.47 (q, J=7.0 Hz, 2H), 3.03-2.99 (m, 1H), 2.62-2.54 (m, 1H), 2.45-2.37 (m, 2H), 2.34-2.29 (m, 3H), 2.28-2.17 (m, 2H), 1.39 (t, J=7.0 Hz, 3H), 0.91 (d, J=6.5 Hz, 6H), 0.81-0.76 (m, 2H), 0.63-0.58 (m, 2H). One exchangeable proton not observed, one proton obscured by DMSO peak.

4-(2-(Cyclopropanesulfonamido)pyrimidin-4-yl)-N4-(5-(6-ethoxypyrazin-2-yl)pyridin-2-yl)-N1-isopropylpiperidine-1,4-dicarboxamide P233

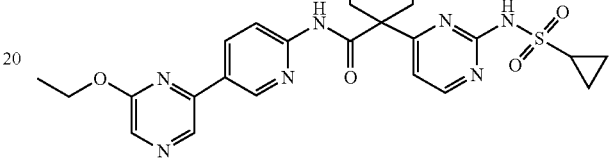

To a solution of 4-(2-(cyclopropanesulfonamido)pyrimidin-4-yl)-N-(5-(6-ethoxypyrazin-2-yl)pyridin-2-yl)piperidine-4-carboxamide, HCl P140 (0.1 g, 0.178 mmol) in DCM (2 mL) was added TEA (0.08 mL, 0.57 mmol) and isopropyl isocyanate (0.02 mL, 0.187 mmol). The reaction was stirred at RT for 24 hrs. The reaction mixture was concentrated in vacuo and was purified by chromatography on RP Flash C18 (12 g cartridge, 5-50% MeCN/10 mM Ammonium Bicarbonate) to afford 4-(2-(cyclopropanesulfonamido)pyrimidin-4-yl)-N4-(5-(6-ethoxypyrazin-2-yl)pyridin-2-yl)-N1-isopropylpiperidine-1,4-dicarboxamide (69 mg, 0.111 mmol, 62% yield) as a colourless solid. Rt 1.31 min (UPLC, acidic); m/z 610 (M+H)$^+$ (ES$^+$); $^1$H NMR (500 MHz, DMSO-d6) δ 11.29 (s, 1H), 10.13 (s, 1H), 9.02 (d, J=2.5 Hz, 1H), 8.84 (s, 1H), 8.61 (d, J=5.3 Hz, 1H), 8.50 (dd, J=8.8, 2.5 Hz, 1H), 8.25 (s, 1H), 8.18 (d, J=8.8 Hz, 1H), 7.23 (d, J=5.3 Hz, 1H), 6.18 (d, J=6.5 Hz, 1H), 4.48 (q, J=7.0 Hz, 2H), 3.75 (h, J=6.5 Hz, 1H), 3.68-3.61 (m, 2H), 3.28-3.21 (m, 1H), 3.19-3.11 (m, 2H), 2.46-2.41 (m, 2H), 2.11-2.02 (m, 2H), 1.40 (t, J=7.0 Hz, 3H), 1.09-1.03 (m, 8H), 0.91-0.84 (m, 2H).

1-Acetyl-4-(2-(cyclopropanesulfonamido)pyrimidin-4-yl)-N-(5-(6-ethoxypyrazin-2-yl)pyridin-2-yl)piperidine-4-carboxamide P234

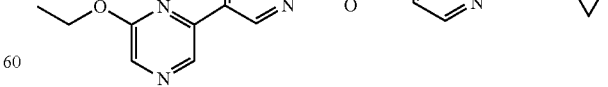

Prepared as for P233 using 4-(2-(cyclopropanesulfonamido)pyrimidin-4-yl)-N-(5-(6-ethoxypyrazin-2-yl)pyridin-2-yl)piperidine-4-carboxamide, HCl P140 and acetic anhydride. The crude material was purified by chromatography on silica gel (12 g cartridge, 0-100% EtOAc/iso-hexanes then flushed with 10% MeOH/DCM) to afford a brown oil, which was dissolved in MeCN (1 mL) and MTBE was added until a precipitate formed. The precipitate was isolated by filtration, washing with further MTBE (2×10 mL) to afford 1-acetyl-4-(2-(cyclopropanesulfonamido)pyrimidin-4-yl)-N-(5-(6-ethoxypyrazin-2-yl)pyridin-2-yl)piperidine-4-carboxamide (51 mg, 0.088 mmol, 24% yield) as a pale brown solid. Rt 1.20 min (UPLC, acidic); m/z 567 (M+H)$^+$ (ES$^+$); $^1$H NMR (500 MHz, DMSO-d6) δ 11.30 (s, 1H), 10.23 (s, 1H), 9.03 (d, J=2.4 Hz, 1H), 8.85 (s, 1H), 8.63 (d, J=5.3 Hz, 1H), 8.51 (dd, J=8.8, 2.4 Hz, 1H), 8.26 (s, 1H), 8.19 (d, J=8.8 Hz, 1H), 7.25 (d, J=5.3 Hz, 1H), 4.48 (q, J=7.0 Hz, 2H), 3.96-3.90 (m, 1H), 3.70-3.64 (m, 1H), 3.49-3.36 (m, 1H), 3.28-3.21 (m, 1H), 3.20-3.14 (m, 1H), 2.47-2.43 (m, 1H), 2.22-2.12 (m, 1H), 2.12-2.05 (m, 1H), 2.02 (s, 3H), 1.40 (t, J=7.0 Hz, 3H), 1.09-1.03 (m, 2H), 0.90-0.83 (m, 2H). One proton obscured by DMSO peak

TABLE 8

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)$^+$, (Rt/Min) | $^1$H NMR Chemical Shift Data (DMSO-d6 unless stated) |
|---|---|---|---|
| INTC 246 | tert-Butyl 4-(4-(cyclopropanesulfonamido)pyrimidin-2-yl)-4-((5-(6-ethoxypyrazin-2-yl)pyridin-2-yl)carbamoyl)piperidine-1-carboxylate | Method 11 using INTC243 and INTD33, [UPLC Acidic], 625, (1.66) | 11.32 (s, 1H), 9.99 (s, 1H), 9.01 (d, J = 2.4 Hz, 1H), 8.84 (s, 1H), 8.58-8.55 (m, 1H), 8.53-8.47 (m, 1H), 8.25 (s, 1H), 8.21 (d, J = 8.8 Hz, 1H), 6.85 (d, J = 5.8 Hz, 1H), 4.48 (q, J = 7.0 Hz, 2H), 3.51-3.48 (m, 2H), 3.38-3.32 (m, 2H), 3.16-3.12 (m, 1H), 2.32-2.29 (m, 4H), 1.41 (s, 9H), 1.40 (t, J = 7.10 Hz, 3H), 1.08 (s, 2H), 0.96-0.91 (m, 2H). |
| P236 | N-(5-(6-ethoxypyrazin-2-yl)pyridin-2-yl)-4-(2-(methylsulfonamido)pyrimidin-4-yl)tetrahydro-2H-pyran-4-carboxamide | Method 2 using INTC219 and INTD33, [HPLC Acidic], 500, (1.92) | 11.38 (s, 1H), 10.14 (s, 1H), 9.03 (d, J = 2.4 Hz, 1H), 8.84 (s, 1H), 8.63 (d, J = 5.3 Hz, 1H), 8.50 (dd, J = 8.8, 2.4 Hz, 1H), 8.26 (s, 1H), 8.20 (d, J = 8.8 Hz, 1H), 7.25 (d, J = 5.3 Hz, 1H), 4.48 (q, J = 7.0 Hz, 2H), 3.76-3.68 (m, 2H), 3.66-3.59 (m, 2H), 3.31 (s, 3H), 2.49-2.41 (m, 2H), 2.29-2.15 (m, 2H), 1.40 (t, J = 7.0 Hz, 3H). |

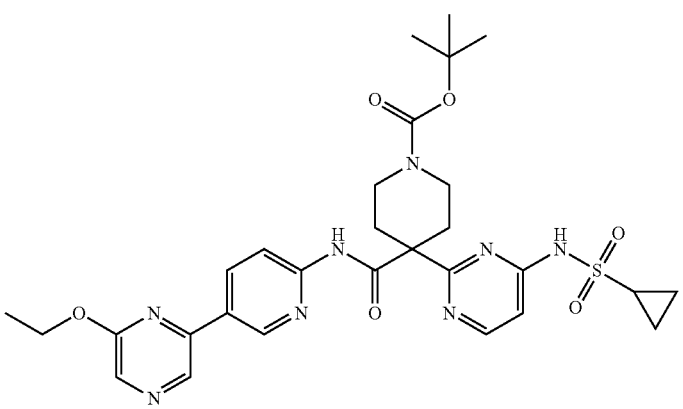

TABLE 8-continued

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)+, (Rt/Min) | $^1$H NMR Chemical Shift Data (DMSO-d6 unless stated) |
|---|---|---|---|
| P237 | 1-(2-(cyclopropanesulfonamido)pyrimidin-4-yl)-N-(5-(6-ethoxypyrazin-2-yl)pyridin-2-yl)cyclohexane-1-carboxamide | Method 2: using INTC220 and INTD33, [UPLC Acidic], 524, (1.62) | 11.27 (s, 1H), 9.92 (s, 1H), 9.04-9.00 (m, 1H), 8.86-8.81 (m, 1H), 8.62-8.58 (m, 1H), 8.52-8.46 (m, 1H), 8.27-8.23 (m, 1H), 8.19 (d, J = 8.7 Hz, 1H), 7.24 (d, J = 5.4 Hz, 1H), 4.48 (q, J = 6.9 Hz, 2H), 3.29-3.22 (m, 1H), 2.46-2.40 (m, 2H), 2.02-1.98 (m, 2H), 1.57-1.54 (m, 5H), 1.45-1.27 (m, 4H), 1.07-1.03 (m, 2H), 0.89-0.85 (m, 2H). |
| P238 | N-(5-(6-ethoxtpyrazin-2-yl)pyridin-2-yl)-1-(2-(methylsulfonamido)pyrimidin-4-yl)cyclohexane-1-carboxamide | Method 2: using INTC221 and INTD33, [UPLC Acidic], 498, (1.52) | 11.33 (s, 1H), 9.89 (s, 1H), 9.03 (dd, J = 2.5, 0.8 Hz, 1H), 8.84 (s, 1H), 8.60 (d, J = 5.3 Hz, 1H), 8.49 (dd, J = 8.8, 2.5 Hz, 1H), 8.25 (s, 1H), 8.19 (dd, J = 8.8, 0.8 Hz, 1H), 7.22 (d, J = 5.3 Hz, 1H), 4.48 (q, J = 7.0 Hz, 2H), 3.36 (s, 3H), 2.45-2.38 (m, 2H), 2.07-2.01 (m, 2H), 1.55 (s, 5H), 1.40 (t, J = 7.0 Hz, 3H), 1.35 (s, 1H). |
| P239 | 1-(6-(cyclopropanesulfonamido)pyrazin-2-yl)-N-(5-(6-ethoxypyrazin-2-yl)pyridin-2-yl)cyclohexane-1-carboxamide | Method 2: using INTC222 and INTD33, [HPLC Acidic], 524, (2.47) | 11.01 (s, 1H), 9.91 (s, 1H), 9.00 (dd, J = 2.4, 0.8 Hz, 1H), 8.83 (s, 1H), 8.48 (dd, J = 8.8, 2.4 Hz, 1H), 8.43 (s, 1H), 8.25 (s, 1H), 8.22-8.14 (m, 2H), 4.48 (q, J = 7.0 Hz, 2H), 3.16-3.07 (m, 1H), 2.57-2.46 (m, 2H (underwater peak)), 2.11-1.97 (m, 2H), 1.58 (s, 5H), 1.44-1.31 (m, 4H), 1.08-0.99 (m, 2H), 0.91-0.76 (m, 2H). |

TABLE 8-continued

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)+, (Rt/Min) | 1H NMR Chemical Shift Data (DMSO-d6 unless stated) |
| --- | --- | --- | --- |
| P240 | 4-(2-(cyclopropanesulfonamido)pyrimidin-4-yl)-N-(4-(6-ethoxypyrazin-2-yl)-2-methylphenyl)tetrahydro-2H-pyran-4-carboxamide | Method 2: using INTC53 and INTD27, [HPLC Acidic], 539, (2.09) | 11.37 (s, 1H), 9.17 (s, 1H), 8.78 (s, 1H), 8.64 (d, J = 5.3 Hz, 1H), 8.21 (s, 1H), 7.98 (d, J = 2.1 Hz, 1H), 7.93 (dd, J = 8.3, 2.1 Hz, 1H), 7.37 (d, J = 8.3 Hz, 1H), 7.24 (d, J = 5.3 Hz, 1H), 4.48 (q, J = 7.0 Hz, 2H), 3.82-3.62 (m, 4H), 3.30-3.25 (m, 1H), 2.48-2.37 (m, 2H), 2.29-2.17 (m, 2H), 2.12 (s, 3H), 1.40 (t, J = 7.0 Hz, 3H), 1.15-1.08 (m, 2H), 1.07-0.96 (m, 2H). |
| P241 | 1-(2-(cyclopropanesulfonamido)pyrimidin-4-yl)-N-(5-(6-ethoxypyrazin-2-yl)pyridin-2-yl)cyclobutane-1-carboxamide | Method 11: using INTC211 and INTD33, [HPLC Acidic], 496, (2.24) | 11.30 (s, 1H), 10.31 (s, 1H), 9.07-8.99 (m, 1H), 8.84 (s, 1H), 8.60 (d, J = 5.3 Hz, 1H), 8.51 (dd, J = 8.8, 2.5 Hz, 1H), 8.29-8.20 (m, 2H), 7.28 (d, J = 5.3 Hz, 1H), 4.48 (q, J = 7.0 Hz, 2H), 3.30-3.23 (m, 1H), 2.89-2.75 (m, 2H), 2.66-2.53 (m, 2H), 2.05-1.84 (m, 2H), 1.40 (t, J = 7.0 Hz, 3H), 1.14-1.02 (m, 2H), 0.97-0.84 (m, 2H). |
| P243 | 4-(4-(cyclopropanesulfonamido)pyrimidin-2-yl)-N-(5-(6-ethoxypyrazin-2-yl)pyridin-2-yl)tetrahydro-2H-pyran-4-carboxamide | Method 11: using INTC213 and INTD33, [HPLC Acidic], 526, (2.09) | 11.33 (s, 1H), 9.91 (s, 1H), 9.01 (dd, J = 2.5, 0.8 Hz, 1H), 8.84 (s, 1H), 8.60 (d, J = 5.7 Hz, 1H), 8.50 (dd, J = 8.8, 2.5 Hz, 1H), 8.30-8.18 (m, 2H), 6.87 (d, J = 5.7 Hz, 1H), 4.48 (q, J = 7.0 Hz, 2H), 3.73-3.61 (m, 4H), 3.19-3.12 (m, 1H), 2.44-2.27 (m, 4H), 1.40 (t, J = 7.0 Hz, 3H), 1.14-1.03 (m, 2H), 0.99-0.88 (m, 2H). |

TABLE 8-continued

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)+, (Rt/Min) | 1H NMR Chemical Shift Data (DMSO-d6 unless stated) |
|---|---|---|---|
| P245 | 4-(2-(cyclopropanesulfonamido)pyrimidin-4-yl)-N-(5-(6-ethoxypyrazin-2-yl)pyridin-2-yl)tetrahydro-2H-pyran-4-carboxamide | Method R: using INTC204, [UPLC Acidic], 554, (1.42) | 11.18 (s, 1H), 10.14 (s, 1H), 9.02 (dd, J = 2.5, 0.8 Hz, 1H), 8.84 (s, 1H), 8.63 (d, J = 5.3 Hz, 1H), 8.51 (dd, J = 8.8, 2.5 Hz, 1H), 8.29-8.18 (m, 2H), 7.27 (d, J = 5.3 Hz, 1H), 4.48 (q, J = 7.0 Hz, 2H), 4.36-4.20 (m, 1H), 3.79-3.72 (m, 2H), 3.66-3.58 (m, 2H), 2.48-2.38 (m, 2H), 2.12-2.11 (m, 2H), 1.93-1.82 (m, 2H), 1.81-1.69 (m, 2H), 1.67-1.52 (m, 2H), 1.43-1.34 (m, 5H). |
| P246 | 4-(2-((1,1-dimethylethyl)sulfonamido)pyrimidin-4-yl)-N-(5-(6-ethoxypyrazin-2-yl)pyridin-2-yl)tetrahydro-2H-pyran-4-carboxamide | Method R: using INTC204, [UPLC Acidic], 542, (1.36) | 10.86 (s, 1H), 9.93 (s, 1H), 9.04 (dd, J = 2.4, 0.8 Hz, 1H), 8.84 (s, 1H), 8.60 (d, J = 5.0 Hz, 1H), 8.50 (dd, J = 8.8, 2.5 Hz, 1H), 8.25 (s, 1H), 8.18 (dd, J = 8.8, 0.8 Hz, 1H), 7.24 (d, J = 5.3 Hz, 1H), 4.48 (q, J = 7.0 Hz, 2H), 3.76-3.58 (m, 4H), 2.45-2.34 (m, 2H), 2.29-2.20 (m, 2H), 1.40 (t, J = 7.0 Hz, 3H), 1.37 (s, 9H). |
| P247 | N-(5-(6-ethoxypyrazin-2-yl)pyridin-2-yl)-4-(2-((1-methylcyclopropane)-1-sulfanamido)pyrimidin-4-yl)tetrahydro-2H-pyran-4-carboxamide | Method R: using INTC204, [UPLC Acidic], 540, (1.36) | 11.13 (s, 1H), 10.04 (s, 1H), 9.03 (d, J = 2.5 Hz, 1H), 8.84 (s, 1H), 8.62 (d, J = 5.3 Hz, 1H), 8.50 (dd, J = 8.8, 2.5 Hz, 1H), 8.25 (s, 1H), 8.20 (d, J = 8.8 Hz, 1H), 7.25 (d, J = 5.3 Hz, 1H), 4.48 (q, J = 7.0 Hz, 2H), 3.75-3.58 (m, 4H), 2.48-2.37 (m, 2H), 2.29-2.15 (m, 2H), 1.53-1.48 (m, 2H), 1.43 (s, 3H), 1.40 (t, J = 7.0 Hz, 3H), 0.89-0.79 (m, 2H). |

TABLE 8-continued

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)+ (Rt/Min) | $^1$H NMR Chemical Shift Data (DMSO-d6 unless stated) |
| --- | --- | --- | --- |
| P249 | N-(4-(2-(cyclopropanesulfonamido)pyrimidin-4-yl)tetrahydro-2H-pyran-4-yl)-5-(6-ethoxypyrazin-2-yl)picolinamide | Method R: using INTC206, [UPLC Acidic], 526, (1.25) | 11.22 (s, 1H), 9.44 (d, J = 2.2 Hz, 1H), 9.00-8.97 (m, 2H), 8.69 (dd, J = 8.2, 2.2 Hz, 1H), 8.53 (s, 1H), 8.39 (s, 1H), 8.08 (d, J = 8.2 Hz, 1H), 7.17 (s, 1H), 4.53 (q, J = 7.0 Hz, 2H), 3.88-3.82 (m, 2H), 3.72-3.63 (m, 2H), 3.27-3.17 (m, 1H), 2.41-2.35 (m, 2H), 2.28-2.19 (m, 2H), 1.43 (t, J = 7.0 Hz, 3H), 1.10-1.06 (m, 2H), 0.96-0.91 (m, 2H). |
| P250 | N-(5-(6-ethoxypyrazin-2-yl)pyridin-2-yl)-4-(2-((2-methylpropyl)sulfonamido)pyrimidin-4-yl)tetrahydro-2H-pyran-4-carboxamide | Method R: using INTC204, [HPLC Acidic], 542, (2.24) | 11.31 (s, 1H), 10.11 (s, 1H), 9.03 (d, J = 2.4 Hz, 1H), 8.84 (s, 1H), 8.63 (d, J = 5.3 Hz, 1H), 8.50 (dd, J = 8.8, 2.4 Hz, 1H), 8.26 (s, 1H), 8.21 (d, J = 8.8 Hz, 1H), 7.26 (d, J = 5.3 Hz, 1H), 4.48 (q, J = 7.0 Hz, 2H), 3.78-3.68 (m, 2H), 3.66-3.58 (m, 2H), 3.45 (d, J = 6.5 Hz, 2H), 2.49-2.40 (m, 2H), 2.27-2.17 (m, 2H), 2.09 (hept, J = 6.6 Hz, 1H), 1.40 (t, J = 7.0 Hz, 3H), 0.94 (d, J = 6.6 Hz, 6H). |
| P252 | 4-(2-(cyclopropanesulfonamido)pyrimidin-4-yl)-N-(5-(6-ethoxypyrazin-2-yl)pyridin-2-yl)tetrahydro-2H-pyran-4-carboxamide | Method 11: using INTC53 and INTD54, [HPLC Acidic], 522, (2.04) | 11.32 (s, 1H), 10.11 (s, 1H), 9.06-8.94 (m, 2H), 8.66-8.56 (m, 2H), 8.47 (dd, J = 8.8, 2.5 Hz, 1H), 8.25-8.12 (m, 1H), 7.25 (d, J = 5.4 Hz, 1H), 3.79-3.68 (m, 2H), 3.69-3.57 (m, 2H), 3.29-3.20 (m, 1H), 2.47-2.40 (m, 2H), 2.32-2.15 (m, 3H), 1.13-1.01 (m, 6H), 0.93-0.82 (m, 2H). |

TABLE 8-continued

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)⁺, (Rt/Min) | ¹H NMR Chemical Shift Data (DMSO-d6 unless stated) |
|---|---|---|---|
| P253 | N-(5'-chloro[3,3'-biphenyl]-6-yl)-4-(2-(cyclopropanesulfonamido)pyrimidin-4-yl)tetrahydro-2H-pyran-4-carboxamide | Method 11: using INTC53 and INTD57, [HPLC Acidic], 515, (1.92) | 11.31 (s, 1H), 10.11 (s, 1H), 8.92 (d, J = 2.0 Hz, 1H), 8.76 (d, J = 2.5 Hz, 1H), 8.66-8.59 (m, 2H), 8.35 (t, J = 2.2 Hz, 1H), 8.27 (dd, J = 8.7, 2.6 Hz, 1H), 8.17 (d, J = 8.7 Hz, 1H), 7.26 (d, J = 5.4 Hz, 1H), 3.79-3.70 (m, 2H), 3.66-3.57 (m, 2H), 3.30-3.23 (m, 1H), 2.49-2.42 (m, 2H), 2.24-2.15 (m, 2H), 1.10-1.02 (m, 2H), 0.96-0.78 (m, 2H). |
| P257 | N-(1-(2-(cyclopropanesulfonamido)pyrimidin-4-yl)cyclopropyl)-5-(6-ethoxypyrazin-2-yl)picolinamide | Method 1: using INTC156 and INTD86, [UPLC Acidic], 482, (1.28) | 11.12 (s, 1H), 9.72 (s, 1H), 9.39 (d, J = 2.2 Hz, 1H), 9.02 (s, 1H), 8.70 (dd, J = 8.2, 2.2 Hz, 1H), 8.43-8.37 (m, 2H), 8.18 (d, J = 8.2 Hz, 1H), 7.01 (d, J = 5.3 Hz, 1H), 4.53 (q, J = 7.1 Hz, 2H), 3.16-3.12 (m, 1H), 1.71-1.64 (m, 2H), 1.52-1.40 (m, 5H), 1.10-1.03 (m, 4H). |
| P259 | 4-(2-(cyclopropanesulfonamido)pyrimidin-4-yl)-N-(5-(6-ethoxypyrazin-2-yl)pyridin-2-yl)tetrahydro-2H-thiopyran-4-carboxamide 1,1-dioxide | Method 11: using INTC217 and INTD33, [UPLC Acidic], 574, (1.23) | 11.39 (s, 1H), 10.45 (s, 1H), 9.03 (d, J = 2.5 Hz, 1H), 8.85 (s, 1H), 8.67-8.61 (m, 1H), 8.55-8.49 (m, 1H), 8.26 (s, 1H), 8.22 (d, J = 8.8 Hz, 1H), 7.24 (d, J = 5.4 Hz, 1H), 4.48 (q, J = 7.0 Hz, 2H), 3.31-3.24 (m, 2H), 3.23-3.17 (m, 2H), 2.91-2.84 (m, 1H), 2.70-2.60 (m, 4H), 1.40 (t, J = 7.0 Hz, 3H), 1.08-1.02 (m, 2H), 0.91-0.83 (m, 2H). |

TABLE 8-continued

Preparation methods and characterisation data of certain intermediates and examples
P236-P263 & P140

| INCT# or P# | Name/Structure (All examples containing chiral centres are racemates unless stated) | Synthesis Method, [LCMS Method], m/z (M + H)+, (Rt/Min) | $^1$H NMR Chemical Shift Data (DMSO-d6 unless stated) |
|---|---|---|---|
| P262 | N-(5-(6-ethoxypyrazin-2-yl)pyridin-2-yl)-4-(2-(ethylsulfonamido)pyrimidin-4-yl)tetrahydro-2H-pyran-4-carboxamide | Method R: using INTC204 [UPLC Acidic], 514, (1.27) | 11.22 (s, 1H), 10.13 (s, 1H), 9.02 (d, J = 2.4 Hz, 1H), 8.83 (s, 1H), 8.62 (d, J = 5.3 Hz, 1H), 8.50 (dd, J = 8.8, 2.4 Hz, 1H), 8.24 (s, 1H), 8.20 (d, J = 8.8 Hz, 1H), 7.25 (d, J = 5.3 Hz, 1H), 4.47 (q, J = 7.0 Hz, 2H), 3.77-3.69 (m, 2H), 3.65-3.56 (m, 2H), 3.52 (q, J = 7.3 Hz, 2H), 2.47-2.40 (m, 2H), 2.22-2.13 (m, 2H), 1.39 (t, J = 7.0 Hz, 3H), 1.13-1.08 (m, 3H). |
| P263 | 4-(2-(cyclopropylmethylsulfonamido)pyrimidin-4-yl)-N-(5-(6-ethoxypyrazin-2-yl)pyridin-2-yl)tetrahydro-2H-pyran-4-carboxamide | Method R: using INTC204 [UPLC Acidic], 540, (1.36) | 11.29 (s, 1H), 10.12 (s, 1H), 9.02 (d, J = 2.5 Hz, 1H), 8.84 (s, 1H), 8.63 (d, J = 5.3 Hz, 1H), 8.49 (dd, J = 8.8, 2.5 Hz, 1H), 8.24 (s, 1H), 8.19 (d, J = 8.8 Hz, 1H), 7.26 (d, J = 5.3 Hz, 1H), 4.47 (q, J = 7.0 Hz, 2H), 3.75-3.67 (m, 2H), 3.64-3.56 (m, 2H), 3.45 (d, J = 7.2 Hz, 2H), 2.48-2.41 (m, 2H), 2.20-2.11 (m, 2H), 1.39 (t, J = 7.0 Hz, 3H), 0.98-0.89 (m, 1H), 0.46-0.38 (m, 2H), 0.12-0.06 (m, 2H). |
| P140 | 4-(2-(cyclopropanesulfonamido)pyrimidin-4-yl)-N-(5-(6-ethoxypyrazin-2-yl)pyridin-2-yl)piperidine-4-carboxamide | Method 2 using INTC77 and INTD33, followed by Boc deprotection with HCl, [UPLC acidic], 525, (0.86) | 11.38 (s, 1H), 10.37 (s, 1H), 9.03 (dd, J = 2.4, 0.8 Hz, 1H), 8.91-8.76 (m, 2H), 8.65 (d, J = 5.3 Hz, 1H), 8.51 (dd, J = 8.8, 2.4 Hz, 1H), 8.25 (s, 1H), 8.18 (dd, J = 8.8, 0.8 Hz, 1H), 7.21 (d, J = 5.3 Hz, 1H), 4.47 (q, J = 7.0 Hz, 2H), 3.32-3.23 (m, 3H), 3.14-3.08 (m, 2H), 2.67-2.60 (m, 2H), 2.43-2.32 (m, 2H), 1.39 (t, J = 7.0 Hz, 3H), 1.10-1.03 (m, 2H), 0.96-0.87 (m, 2H). |

4-(4-(cyclopropanesulfonamido)pyrimidin-2-yl)-N-(5-(6-ethoxypyrazin-2-yl)pyridin-2-yl)-1-methylpiperidine-4-carboxamide P319

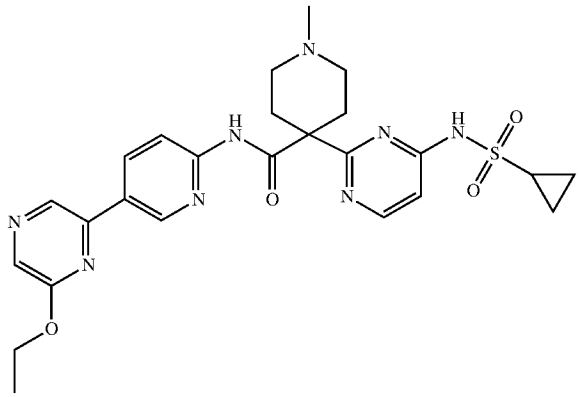 [SMILES: CCOc1cncc(-c2ccc(NC(=O)C3(c4nccc(NS(=O)(=O)C5CC5)n4)CCN(C)CC3)nc2)n1]

To a solution of INTC247 (100 mg, 85% Wt, 1 Eq, 0.15 mmol) in DCM (2 mL) was added AcOH (82 mg, 78 μL, 9 Eq, 1.4 mmol) and formaldehyde (98 mg, 90 μL, 37% Wt, 8 Eq, 1.2 mmol) and the reaction mixture was stirred at RT for 30 min prior to addition of sodium triacetoxyborohydride (3 Eq, 0.45 mmol). The reaction mixture was stirred at RT for 20 hrs. The reaction mixture was concentrated in vacuo and the crude product was purified by chromatograph on silica gel (80 g column, 10-50% MeOH/EtOAc) to afford 4-(4-(cyclopropanesulfonamido)pyrimidin-2-yl)-N-(5-(6-ethoxypyrazin-2-yl)pyridin-2-yl)-1-methylpiperidine-4-carboxamide (65 mg, 0.12 mmol, 78%) as a white solid. Rt 0.86 min (UPLC, acidic); m/z 539 (M+H)$^+$ (ES$^+$); $^1$H NMR (500 MHz, DMSO-d6) δ 9.91 (s, 1H), 9.01 (d, J=2.4 Hz, 1H), 8.83 (s, 1H), 8.49 (dd, J=8.8, 2.4 Hz, 1H), 8.24 (s, 1H), 8.16 (d, J=8.8 Hz, 1H), 8.11 (s, 1H), 6.49 (s, 1H), 4.48 (q, J=7.0 Hz, 2H), 3.30 (s, 3H), 3.20-3.15 (m, 3H), 2.82 (s, 2H), 2.70-2.61 (m, 3H), 2.38-2.35 (m, 1H), 1.40 (t, J=7.0 Hz, 3H), 0.88-0.84 (m, 2H), 0.75-0.72 (m, 2H). 1H not observed.

BIOLOGICAL EXAMPLES

Biological Example 1—Human CTPS1 Enzyme Inhibition

The enzyme inhibitory activities of compounds invented against the target of interest were determined using the ADP-Glo™ Max assay (Promega, UK). Assays for human CTPS1 were performed in 1× assay buffer containing 50 mM Tris, 10 mM MgCl$_2$, 0.01% Tween-20, pH to 8.0 accordingly. Finally, immediately before use, L-cysteine was added to the 1× assay buffer to a final concentration of 2 mM. All reagents are from Sigma-Aldrich unless specified otherwise.

Human full length active C-terminal FLAG-Hiss-tag CTPS1 (UniProtKB—P17812, CTPS1[1-591]-GGDYKDDDDKGGHHHHHHHH (CTPS1[1-591]-SEQ ID NO: 1)) was obtained from Proteros biostructures GmbH.

Assay Procedure

3× human CTPS1 protein was prepared in 1× assay buffer to the final working protein concentration required for the reaction. A 2 uL volume per well of 3× human CTPS1 protein was mixed with 2 uL per well of 3× test compound (compound prepared in 1× assay buffer to an appropriate final 3× compound concentration respective to the concentration response curve designed for the compounds under test) for 10 minutes at 25° C. The enzymatic reaction was then initiated by addition of a 2 uL per well volume of a pre-mixed substrate mix (UltraPure ATP from ADP-Glo™ Max kit (0.31 mM), GTP (0.034 mM), UTP (0.48 mM) and L-glutamine (0.186 mM)) and the mixture was incubated for an appropriate amount of time within the determined linear phase of the reaction at 25° C. under sealed plate conditions with constant agitation at 500 revolutions per minute (rpm). ADP-Glo™ Max reagent was added for 60 minutes (6 μL per well) and subsequently ADP-Glo™ Max development reagent was added for 60 minutes (12 uL per well) prior to signal detection in a microplate reader (EnVision® Multilabel Reader, Perkin Elmer). Following each reagent addition over the course of the assay, assay plates were pulse centrifuged for 30 seconds at 500 rpm.

In all cases, the enzyme converts ATP to ADP and the ADP-Glo™ Max reagent subsequently depletes any remaining endogenous ATP in the reaction system. The ADP-Glo™ Max detection reagent converts the ADP that has been enzymatically produced back into ATP and using ATP as a substrate together with luciferin for the enzyme luciferase, light is generated which produces a detectable luminescence. The luminescent signal measured is directly proportional to the amount of ADP produced by the enzyme reaction and a reduction in this signal upon compound treatment demonstrates enzyme inhibition. The percentage inhibition produced by each concentration of compound was calculated using the equation shown below:

$$\% \text{ Inhibition} = 1 - \frac{(Mean_{Min} - Mean_{Inh})}{(Mean_{Min} - Mean_{Max})} \times 100$$

Percentage inhibition was then plotted against compound concentration, and the 50% inhibitory concentration (IC$_{50}$) was determined from the resultant concentration-response curve.

The data for all compounds of formula (I) tested are presented below.

TABLE 9

Human CTPS1 Enzyme Inhibition data grouped by potency range (++ indicates IC$_{50}$ in the range >0.1 to 1 micromolar, +++ indicates IC$_{50}$ of ≤0.1 micromolar)

| P | CTPS1 |
| --- | --- |
| P231 | ++ |
| P232 | ++ |
| P233 | +++ |
| P234 | +++ |
| P236 | +++ |
| P237 | +++ |
| P238 | +++ |
| P239 | +++ |
| P240 | +++ |
| P241 | +++ |
| P243 | +++ |
| P245 | ++ |
| P246 | ++ |
| P247 | ++ |
| P249 | ++ |
| P250 | ++ |
| P252 | +++ |
| P253 | +++ |
| P257 | ++ |
| P259 | +++ |

TABLE 9-continued

Human CTPS1 Enzyme Inhibition data grouped
by potency range (++ indicates IC$_{50}$ in
the range >0.1 to 1 micromolar, +++ indicates
IC$_{50}$ of ≤0.1 micromolar)

| P | CTPS1 |
|---|---|
| P262 | +++ |
| P263 | ++ |
| P319 | +++ |

All compounds of the invention which have been tested were found to demonstrate inhibition of CTPS1 enzyme in this assay. Consequently, these compounds may be expected to have utility in the inhibition of CTPS1. The compounds of the invention are also expected to have utility as research tools, for example, for use in CTPS assays.

Biological Example 2—RapidFire/MS-Based Enzyme Selectivity Assays

Human CTPS1 Versus CTPS2 Selectivity Assessment by RapidFire/MS Analysis.

The enzyme inhibitory activities against each target isoform of interest may be determined for the compounds of the invention using an optimised RapidFire high-throughput mass spectrometry (RF/MS) assay format. RF/MS assays for both human CTPS1 and CTPS2 may be performed in assay buffer consisting of 50 mM HEPES (Merck), 20 mM MgCl$_2$, 5 mM KCl, 1 mM DTT, 0.01% Tween-20, pH to 8.0 accordingly. Human full-length active C-terminal FLAG-His-tag CTPS1 (UniProtKB—P17812, CTPS1[1-591]-GGDYKDDDDKGGHHHHHHHH (CTPS1[1-591]-SEQ ID NO: 1)) may be obtained from Proteros biostructures GmbH. Human full length active C-terminal FLAG-His-Avi tagged CTPS2 (UniProtKB—Q9NRF8, CTPS2 [1-586]—DYKDDDDKHHHHHHGLNDIFEAQKIEWHE (CTPS2 [1-586]-SEQ ID NO: 2)) may be obtained from Harker Bio.

Assay Procedure

Human CTPS (1 or 2) protein may be prepared in 1× assay buffer to the final working protein concentration required for the reaction. A 2 uL volume per well of 2×CTPS (1 or 2) protein may be mixed with 40 nL of compound using acoustic (ECHO) delivery and incubated for 10 minutes at 25° C. Each isoform enzymatic reaction may be subsequently initiated by addition of 2 uL per well of a 2× substrate mix in assay buffer. For hCTPS1: ATP (0.3 mM), UTP (0.2 mM), GTP (0.07 mM) and L-glutamine (0.1 mM). For hCTPS2: ATP (0.1 mM), UTP (0.04 mM), GTP (0.03 mM) and L-glutamine (0.1 mM). Each mixture may be incubated for an appropriate amount of time per isoform within the determined linear phase of the reaction at 25° C. A 60 uL volume of stop solution (1% formic acid with 0.5 uM $^{13}C_9$-$^{15}N_3$-CTP in H$_2$O) may be added and the plate immediately heat-sealed and centrifuged for 10 minutes at 4,000 rpm. Following centrifugation, plates may be loaded onto the Agilent RapidFire microfluidic solid phase extraction system coupled to an API4000 triple quadrupole mass spectrometer (RF/MS) for analysis.

In all cases, the enzyme converts UTP to CTP. Highly specific and sensitive multiple reaction monitoring (MRM) MS methods may be optimised for the detection of the enzymatic reaction product, CTP, and the stable isotope labelled product standard $^{13}C$-$^{15}N$-CTP. Readout for data analysis may be calculated as the ratio between the peak area of the product CTP and the internal standard $^{3}C_9$-$^{15}N_3$-CTP. For data reporting, the following equation may be used:

$$R = \frac{P}{IS}$$

($R$=ratio/readout,$P$=product signal area,IS=internal standard signal area)

For each screening plate, the means of the negative (DMSO) and positive control values were used for the calculation of the respective assay window (S/B) and Z' values. The median of the respective control values was used for calculation of percent inhibition according to the following equation:

$$I = \frac{R_{neg} - R_{sample}}{[R_{neg} - R_{pos}]} \%$$

($I$=Inhibition,$R_{neg}$=median of negative control readout values,$R_{pos}$=median of positive control readout values,$R_{sample}$=sample readout value)

Percentage inhibition was then plotted against compound concentration, and the 50% inhibitory concentration (IC$_{50}$) was determined from the resultant concentration-response curve.

Fold selectivity between CTPS1 and CTPS2 was subsequently calculated according to the following equation:

$$\text{Fold selectivity} = \frac{CTPS2\ IC_{50}}{CTPS1\ IC_{50}}$$

Certain compounds of formula (I) were tested in the assay above. The data for all compounds tested are presented below.

TABLE 10

Selectivity data split into grouping of 2-30 fold (+),
>30-60 fold (++) or >60 fold (+++)

| P | CTPS1 |
|---|---|
| P231 | +++ |
| P232 | +++ |
| P233 | +++ |
| P234 | +++ |
| P236 | +++ |
| P237 | +++ |
| P238 | +++ |
| P239 | +++ |
| P240 | + |
| P241 | +++ |
| P243 | +++ |
| P245 | +++ |
| P246 | +++ |
| P247 | +++ |
| P249 | +++ |
| P250 | +++ |
| P252 | +++ |
| P253 | ++ |
| P319 | +++ |

All compounds tested in the assay described in Biological Example 2 were found to have at least 2 fold selectivity for CTPS1 over CTPS2, with many compounds having a selectivity for CTPS1 of over 60 fold. In particular, these compounds may be expected to have utility in the treatment of diseases whereby a selective CTPS1 inhibitory compound is beneficial.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

The application of which this description and claims forms part may be used as a basis for priority in respect of any subsequent application. The claims of such subsequent application may be directed to any feature or combination of features described herein. They may take the form of product, composition, process, or use claims and may include, by way of example and without limitation, the claims which follow.

All publications, including but not limited to patents and patent applications, cited in this specification are herein incorporated by reference as if each individual publication were specifically and individually indicated to be incorporated by reference herein as though fully set forth.

REFERENCES

Evans, D. R. & Guy, H. I. Mammalian pyrimidine biosynthesis: fresh insights into an ancient pathway. J. Biol. Chem. 279, 33035-33038 (2004).

Fairbanks, L. D. et al. Importance of ribonucleotide availability to proliferating T-lymphocytes from healthy humans. Disproportionate expansion of pyrimidine pools and contrasting effects of de novo synthesis inhibitors. J. Biol. Chem. 270, 29682-29689 (1995).

Higgins, M. J. et al. Regulation of human cytidine triphosphate synthetase 1 by glycogen synthase kinase 3. J. Biol. Chem. 282, 29493-29503 (2007).

Kursula, P. et al. Structure of the synthetase domain of human CTP synthetase, a target for anticancer therapy. Acta Crystallogr Sect F Struct Biol Cryst Commun. 62 (Pt7): 613-617 (2006).

Lieberman I. Enzymatic amination of uridine triphosphate to cytidine triphosphate. The J. Biol. Chem. 222 (2): 765-75 (1956).

Martin E. et al. CTP synthase 1 deficiency in humans reveals its central role in lymphocytes proliferation. Nature. June 12; 510(7504):288-92 (2014). Erratum in: Nature. July 17; 511(7509):370 (2014).

McCluskey G D et al., Exploring the Potent Inhibition of CTP Synthase by Gemcitabine-5'-Triphosphate. Chembiochem. 17, 2240-2249 (2016).

Ostrander, D. B. et al. Effect of CTP synthetase regulation by CTP on phospholipid synthesis in Saccharomyces cerevisiae. J. Biol. Chem. 273, 18992-19001 (1998).

Sakamoto K. et al. Identification of cytidine-5-triphosphate synthase 1-selective inhibitory peptide from random peptide library displayed on T7 phage. Peptides. 2017; 94:56-63 (2017).

Salu et al. Drug-eluting stents: a new treatment in the prevention of restenosis Part I: experimental studies. Acta Cardiol, 59, 51-61 (2004).

Sousa J. E. et al. Drug-Eluting Stents. Circulation, 107 (2003) 2274 (Part I), 2283 (Part II).

Tang R. et al. CTP synthase 1, a smooth muscle-sensitive therapeutic target for effective vascular repair. Arterioscler Thromb Vasc Biol. 33(10), 1-19, (2013).

van den Berg, A. A. et al. Cytidine triphosphate (CTP) synthetase activity during cell cycle progression in normal and malignant T-lymphocytic cells. Eur. J. Cancer 31, 108-112 (1995).

van Kuilenburg, A. B. P. et al. Identification of a cDNA encoding an isoform of human CTP synthetase. Biochimica et Biophysica Acta 1492548-552 (2000).

The invention claimed is:

1. A compound which is N-(5-(6-ethoxypyrazin-2-yl) pyridin-2-yl)-4-(2-(ethylsulfonamido)pyrimidin-4-yl)tetrahydro-2H-pyran-4-carboxamide:

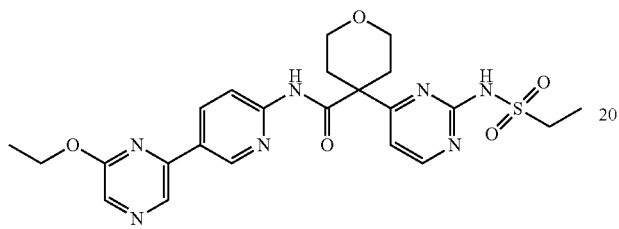

or a salt and/or solvate thereof.

2. The salt according to claim 1 wherein the salt is a pharmaceutically acceptable salt of N-(5-(6-ethoxypyrazin-2-yl) pyridin-2-yl)-4-(2-(ethylsulfonamido)pyrimidin-4-yl) tetrahydro-2H-pyran-4-carboxamide:

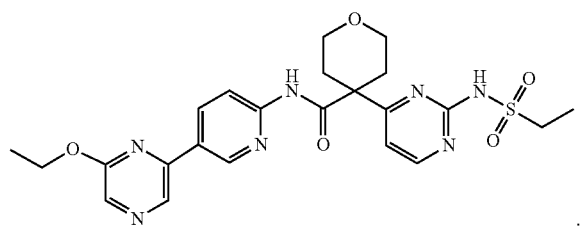 [SMILES: CCOc1cncc(-c2ccc(NC(=O)C3(c4ccnc(NS(=O)(=O)CC)n4)CCOCC3)nc2)n1]

3. The compound according to claim 1 wherein the compound is N-(5-(6-ethoxypyrazin-2-yl) pyridin-2-yl)-4-(2-(ethylsulfonamido)pyrimidin-4-yl)tetrahydro-2H-pyran-4-carboxamide:

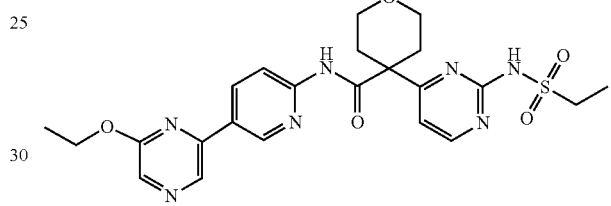

4. A pharmaceutical composition comprising the compound according to claim 3.

5. A pharmaceutical composition comprising the pharmaceutically acceptable salt according to claim 2.

* * * * *